United States Patent
Eichel et al.

(10) Patent No.: US 6,664,972 B2
(45) Date of Patent: *Dec. 16, 2003

(54) METHODS, SYSTEMS AND COMPUTER PROGRAM PRODUCTS FOR COORDINATING PATTERNS OF INTERIOR DESIGN SURFACE TREATMENTS FOR INTERIOR SPACES

(75) Inventors: Lauranne P. Eichel, Chapel Hill, NC (US); Alan S. Kabus, Atlanta, GA (US); Nathan A. Kredich, Charlotte, NC (US); Stephen N. Cole, Durham, NC (US)

(73) Assignee: BlueBolt Networks, Inc., Durham, NC (US)

( * ) Notice: Subject to any disclaimer, the term of this patent is extended or adjusted under 35 U.S.C. 154(b) by 421 days.

This patent is subject to a terminal disclaimer.

(21) Appl. No.: 09/756,811

(22) Filed: Jan. 9, 2001

(65) Prior Publication Data

US 2002/0030689 A1 Mar. 14, 2002

Related U.S. Application Data

(63) Continuation-in-part of application No. 09/481,297, filed on Jan. 11, 2000, now Pat. No. 6,459,435.

(51) Int. Cl.$^7$ ................................................. G09G 5/00
(52) U.S. Cl. ....................................... 345/582; 345/588
(58) Field of Search ................................ 345/581, 582, 345/588, 589

(56) References Cited

U.S. PATENT DOCUMENTS 5,827,430 A  10/1998  Perry, Jr. et al. ........ 210/497.01

(List continued on next page.)

OTHER PUBLICATIONS

Mona™ The Textile Design Explorer, User' Manual, d cube™ Cone Mills Corporation, 1996, p. 1–5 & 8–16.

(List continued on next page.)

Primary Examiner—Matthew Luu
(74) Attorney, Agent, or Firm—Myers Bigel Sibley & Sajovec

(57) ABSTRACT

A storyboard of interior design surface treatments for a commercial and/or residential interior space is generated by obtaining a plurality of arrays of patterns that correspond to user search criteria, from a stored set of patterns for interior design surface treatments. The arrays of patterns are displayed on a computer display. Each array of patterns corresponds to a surface treatment product type, such as floor treatments, upholstery, textiles (fabrics), wall treatments and solid surface materials or laminates (countertops). The product type also can include product subtypes, such as carpet, vinyl composition tile, resilient sheet flooring, porcelain tile and ceramic tile for floor treatments. A plurality of subarrays of patterns then are generated, each subarray corresponding to a surface treatment product type. The plurality of subarrays of patterns are generated in response to selection by a user, generally an interior designer/decorator, architect, facility planner, product dealer and/or general contractor, from the corresponding array of patterns for the corresponding surface treatment type. Finally, at least one pattern from at least two of the subarrays of patterns are combined to produce a storyboard of interior design surface treatments for an interior space. Thus, large numbers of patterns may be considered and combined without the need to peruse a large library of sample books. Moreover, the one or more storyboards may be generated without the need to physically order samples or cut samples from sample books. The subarrays of patterns that are under consideration and/or one or more storyboards, may be viewed on a computer system, and may be emailed and/or printed and sent to a client to allow improved efficiency in the decision-making process. Data mining, standardized patterns and attributes, storyboard enhancements, additional user search criteria, discontinued product handling and locators also may be provided.

172 Claims, 41 Drawing Sheets

U.S. PATENT DOCUMENTS

| | | | |
|---|---|---|---|
| 5,833,790 A | 11/1998 | Hare | 156/240 |
| 5,846,265 A | 12/1998 | McGregor et al. | 8/400 |
| 5,870,771 A | 2/1999 | Oberg | 707/502 |
| 5,893,956 A | 4/1999 | Perry, Jr. et al. | 156/167 |
| 5,933,578 A | 8/1999 | Van de Capelle et al. | 395/109 |
| 5,966,454 A | 10/1999 | Thomas et al. | 382/111 |
| 5,982,924 A | 11/1999 | Power et al. | 382/162 |
| 6,005,969 A | 12/1999 | Thomas et al. | 382/162 |

OTHER PUBLICATIONS

Data Sheet, *Oracle 8i Visual Information Retrieval*, Oracle, Mar. 1999, 8pp.

Home Page, www.homeportfolio.com, Jan. 11, 2000.

Creativepro.com, *Extensis PhotoTools 3.0*, www.extensis.com, Jan. 11, 2000.

Graphic Detail, Inc., Thumbs Up™, www.graphicdetail.com, Jan. 11, 2000.

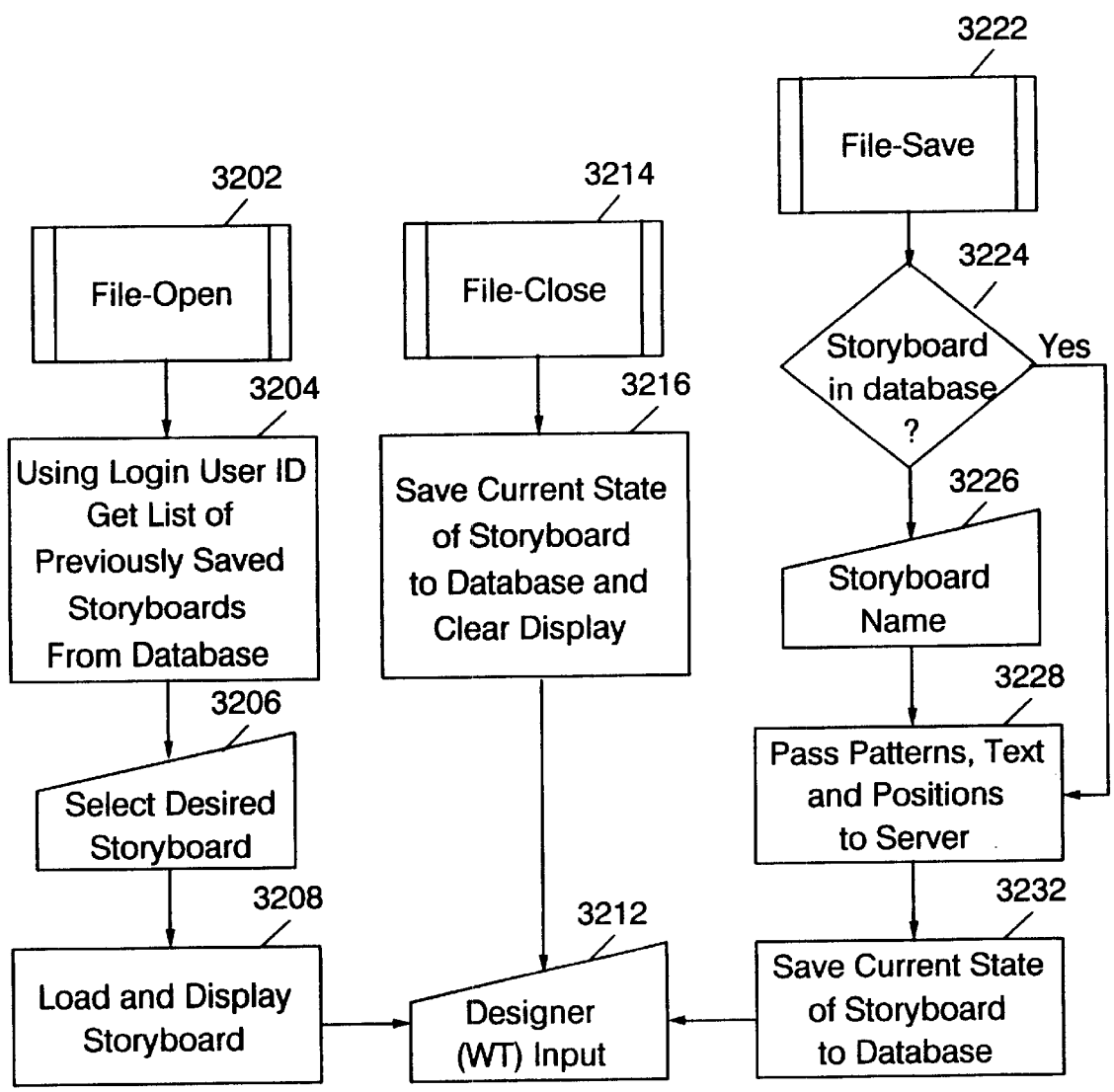

FIG. 40 Product Specifications

Design Firm, Inc.
Project Name

BLUEBOLT ID: 7766
BRAND: Prince Street Technologies
Post Office Drawer 2530
1450 West Avenue
Cartersville, GA 30120-1693
770.606.0507
STYLE NAME: Piece of Cake
STYLE NUMBER: 41176
COLOR NAME: One Hand Tied Behind My Back
COLOR NUMBER: 406151
BRAND SKU: 41176406151

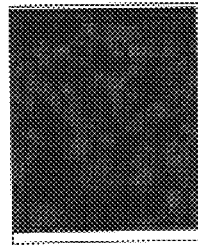

BRAND LOGO ©

PRICE RANGE: Not Available
EXACT CONTENT: 58% DuPont Antron™ Legacy Nylon
42% DuPont Antron™ Lumena Nylon
PRIMARY BACKING: Closed Weave Polyolefin
SECONDARY BACKING: Moisture Proof
ALTERNATE BACKING: Prestige Plus
CONSTRUCTION: Tufted
SURFACE TEXTURE: Textured Loop
FLOOR FORMAT: Broadloom
ALT. FLOOR FORMAT: Not Applicable
WIDTH: 12 ft (3.657m)
ALTERNATE WIDTH: Not Applicable
FACE WEIGHT: 31 oz/sq yd
ALT. FACE WEIGHT: Not Applicable
TOTAL WEIGHT: 81 oz/sq yd
PATTERN REPEAT: 9 in W x 18 in L
GAUGE: 3/16 in
STITCHES PER INCH: 12 per in
PITCH: Not Available
PILE HEIGHT: Not Available
DYE METHOD: Solution Dyed
Yarn Dyed FLAMMABILITY: Passes FF-1-70
SMOKE DENSITY: Not Available STATIC TEST: (AATCC-134) <3.5 KV
SAMPLE QUANTITY: 4
WARRANTY: 10 Year Wear Warranty
MINIMUM ORDER: Not Available
LEAD TIME: Not Available
PARENT COMPANY: Interface, Inc.
INTERNATIONAL: Yes
STATUS: Available
STATUS DATE: 04-Oct-00

TREATMENT (COATING): DuraTech™ Soil Resistance Treatment

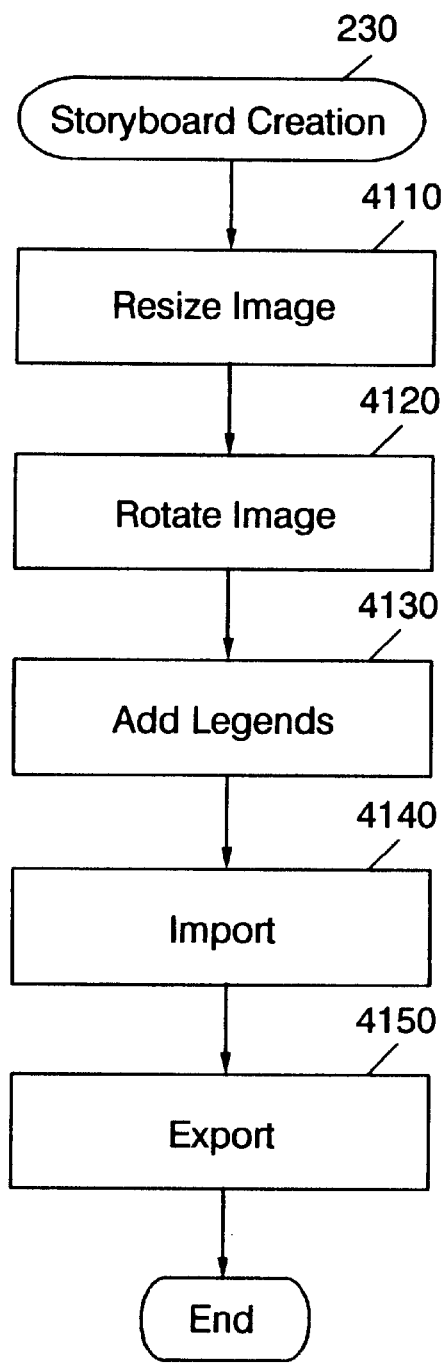
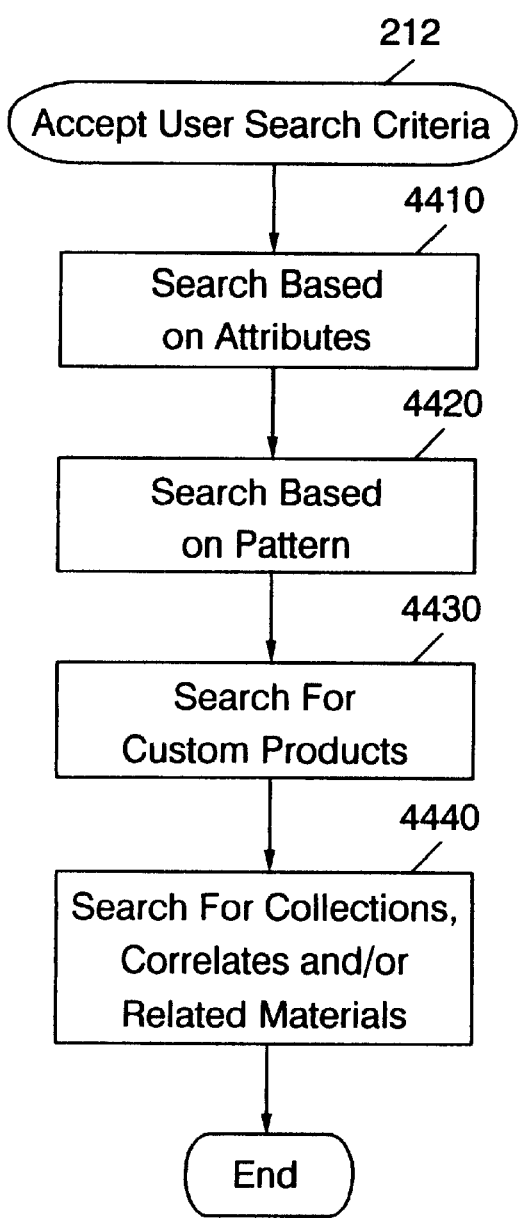

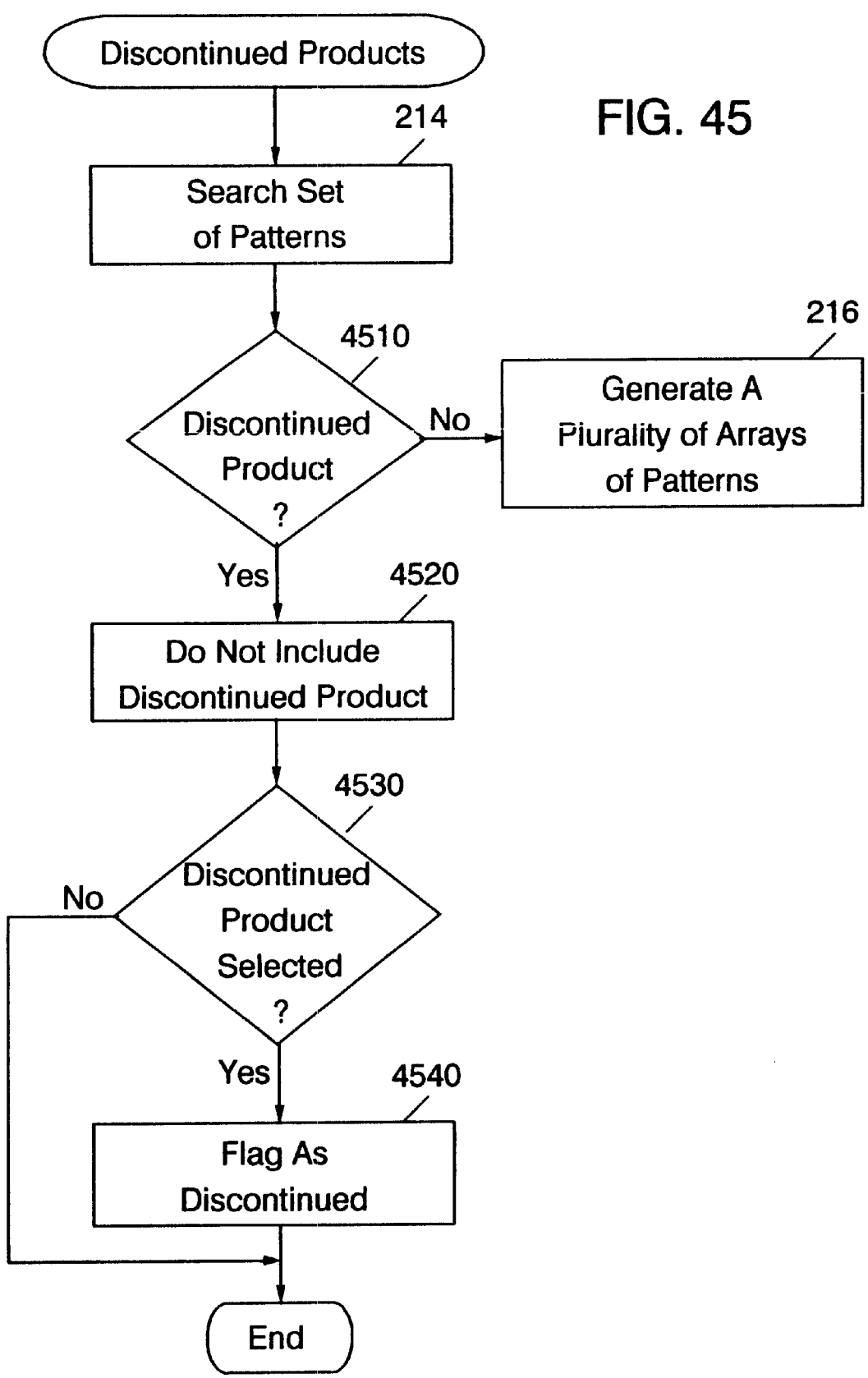

FIG. 47

One Click Sample Ordering

METHODS, SYSTEMS AND COMPUTER PROGRAM PRODUCTS FOR COORDINATING PATTERNS OF INTERIOR DESIGN SURFACE TREATMENTS FOR INTERIOR SPACES

CROSS-REFERENCE TO RELATED APPLICATION

This application is a Continuation-in-Part of application Ser. No. 09/481,297, Filed Jan. 11, 2000, now U.S. Pat. No. 5,459,435, entitled Methods, Systems and Computer Program Products for Generating Storyboards of Interior Design Surface Treatments for Interior Spaces, the disclosure of which is hereby incorporated herein by reference in its entirety.

FIELD OF THE INVENTION

This invention relates to computer systems, methods and computer program products, and more particularly to graphical computer systems, methods and computer program products.

BACKGROUND OF THE INVENTION

Interior decorators/designers assist clients in selecting and coordinating interior design surface treatments, also referred to as surface coverings, including floor treatments, upholstery, fabrics, wall treatments and/or countertop surfaces for commercial and/or residential interior spaces. These interior design surface treatments are selected from many manufacturers, each of which generally produces many different patterns and color schemes of floor treatments, upholstery, fabrics, wall treatments and/or surfaces. These interior design surface treatments generally are coordinated from an aesthetic, functional and/or budgetary standpoint.

In order to select interior design surface treatments for an interior space, an interior designer generally views the interior space, plans and/or photographs thereof, including any existing interior design surface treatments. The designer's client also is consulted as to the functional, aesthetic and/or budgetary requirements.

The interior designer then scans many sample books of floor treatments, upholstery, fabrics, wall treatments, surfaces and/or other interior design surface treatments. In general, each manufacturer will produce many sample books. Thus, for example, for wallpaper, each of dozens or more of manufacturers may produce dozens or more of sample books of wallpaper patterns.

After scanning these books, a small number of patterns that are thought to be appropriate for the interior space are selected. The books that include these patterns then may be lugged to the interior space and/or to the client for review and/or discussion. Alternatively, a sample of each interior design surface treatment that is being considered may be cut from the sample book or ordered from the manufacturer. After additional client consultation, the samples may be narrowed down to one sample for each product that is being used. A sample of each product type that will be used in the interior space may be mounted on a foam-backed or other board, known as a "storyboard", so that the client can view each of the proposed interior design surface treatments, and the manner in which they coordinate in the particular interior space. Multiple storyboards may be generated for a given interior space.

Although the interior design process has been described above as a linear process, it will be understood that the process generally is iterative with multiple iterations at each step and multiple returns to earlier steps based on the client's decision, budgetary constraints and/or other factors. This process may be time consuming and inefficient.

It will be recognized that the above-described interior design process involves the selection and coordination of patterns of interior design surface treatments for aesthetic, functional and/or budgetary compatibility. Graphical computers now have been developed that can manipulate graphical images such as patterns of interior design surface treatments. In fact, personal computers generally include Graphical User Interfaces (GUI) that can manipulate graphical images.

Graphical computer systems have been applied to manipulate images of interior design surface treatments. For example, U.S. Pat. Nos. 5,966,454 and 6,005,969, both to Thomas et al. and both entitled Methods and Systems for Manipulation of Images of Floor Coverings or Other Fabrics, provide methods and systems that enable a highly streamlined and efficient fabric or textile sampling and design process, particularly valuable in the design and selection of floor treatments, wall treatments and other interior design treatments. A digital library of fabric models is created, preferably including digitized full-color images and having associated a digital association of positions that are located within and which characterize the models. Via an application implemented according to conventional software methods, and running on conventional hardware having high resolution graphics processing capabilities, a user may navigate among a set of alternative models and may modify the positions of the selected models, to test out desired combinations of characteristics—such as poms, or yard-ends, for models of floor treatments—and view the results in high resolution. The resulting samples or designs can be stored and transmitted over a telecommunications network, or by other means, to a central facility that can either generate photographic-quality images of the samples, or can directly generate actual samples of carpet or other material of interest. See the '454 and '969 patent abstracts.

Another example of a graphical computer system that has been applied to manipulate images of interior design surface treatments is the MONA™ Textile Design Explorer, developed by Cone Mills Corporation's Business Unit d cube™. MONA lets a user quickly and precisely browse through a rich database of images. When the user finds a pattern of interest, the user can execute a search based on that image and the software gathers other patterns that are similar in style, motif or other visual characteristics. If the user knows exactly what the user wants, the user can conduct a more structured search using a unique textile design terminology system that allows for powerful cross-referencing options. Once selections have been made, high resolution images can be downloaded to edit, combine or recolor with off-the-shelf or CAD/CAM software. The MONA Textile Design Explorer is described in a *User's Manual*, 1996.

Manipulation of graphical images on computer systems also has been applied in other industries. See, for example, U.S. Pat. No. 5,870,771 to Oberg, entitled Computerized System for Selecting, Adjusting, and Previewing Framing Product Combinations for Artwork and Other Items to be Framed. Disclosed is a computerized system having means for displaying a digital image with an object, such as an object of artwork supplied by a user, analyzing the color composition of the image, searching a database for coordinating frame and matting material products, developing composite images of the user's input with the matching selections and presenting the digital images to the user, so that the items may be previewed before placing an order. See the '771 patent abstract.

Another example is the Web site for HomePortfolio, Inc. This Web site presents an editorial selection of top-of-the-line and hard-to-find home design products and directs the user to their nearest retailer. HomePortfolio lets a user choose favorite products and organize them in the user's own personal portfolio-an online scrapbook that makes it easy to communicate with a spouse, builder, architect or designer. See www.homeportfolio.com.

Notwithstanding these and other advances in computer graphic systems, the interior design process generally continues to use large numbers of product sample books, ordering of samples and creating storyboards on foam-backed cardboard, as was described above. As was described above, this process may be time-consuming and inefficient.

SUMMARY OF THE INVENTION

The present invention can provide computerized methods, systems and/or computer program products for generating a storyboard of interior design surface treatments for a commercial and/or residential interior space. A plurality of arrays of patterns that correspond to user search criteria are obtained from a stored set of patterns for interior design surface treatments, and are displayed on a computer display. Each array of patterns corresponds to a surface treatment product type, such as floor treatments, upholstery, textiles (fabrics), wall treatments and surfaces (countertops). The product type also can include product subtypes, such as carpet, vinyl composition tile, resilient sheet flooring, porcelain tile and ceramic tile for floor treatments.

A plurality of subarrays of patterns then are generated, each subarray corresponding to a surface treatment product type. The plurality of subarrays of patterns are generated in response to selection by a user, generally an interior designer/decorator, architect, facility planner, product dealer and/or general contractor, from the corresponding array of patterns for the corresponding surface treatment type. Finally, at least one pattern from at least two of the subarrays of patterns are combined to produce a storyboard of interior design surface treatments for an interior space.

By displaying the arrays of patterns that correspond to user search criteria, allowing selection from these patterns to generate a plurality of subarrays of patterns, and allowing at least one pattern from at least two of the subarrays to be combined to produce a storyboard on a computer system, large numbers of patterns may be considered and combined without the need to peruse a large library of sample books. Moreover, the one or more storyboards may be generated without the need to physically order samples or cut samples from sample books. The subarrays of patterns that are under consideration and/or one or more storyboards, may be viewed on a computer system, and may be emailed to a client to allow improved efficiency in the decision-making process. More sophisticated interior design also may be obtained, by considering large numbers of patterns for each product type, while allowing streamlined client interaction and allowing the time for the interior design process to be reduced.

Prior to displaying a plurality of arrays of patterns that correspond to user search criteria from a stored set of patterns for interior design surface treatments, a set of patterns for interior design surface treatments preferably is stored. Each pattern preferably includes a plurality of pattern attributes associated therewith. The pattern attributes may include a product specification including an identification of a manufacturer, an identification of a primary color, and an identification of an overall style. However, other attributes may be added over those that are provided by the manufacturer, including design movement, motif, color quality and/or technique. The associated plurality of pattern attributes is stored on a computer system. In order to display a plurality of arrays of patterns that correspond to user search criteria, at least one user-selected attribute is accepted for at least one of the surface product treatment types, to define the user search criteria. The stored pattern attributes and the patterns themselves may be searched for the at least one of the surface treatment product types, to generate the plurality of arrays of patterns that meet the user search criteria.

Generally, multiple search criteria are used by a designer for each product type. Moreover, patterns preferably are retrieved that meet any of the search criteria. In order to provide an indication of the extent that the pattern matches the user search criteria, an indicator also may be displayed with each pattern that indicates an extent that the pattern matches the user search criteria. For example, a bar may be displayed adjacent each pattern with the length of the bar indicating the extent that the particular pattern meets the user's search criteria.

The plurality of arrays of patterns that correspond to the user's search criteria may be displayed in an array or matrix, for example a 6×6 matrix containing 36 patterns that meet the user search criteria. Larger or smaller arrays may be displayed and large arrays may be displayed using tabs. The designer then may select from the displayed arrays of patterns to identify a subarray of patterns for a particular product type. The subarray may include one or more patterns that are selected by the designer as being of interest. The subarrays that are selected may be highlighted in the arrays of patterns. However, preferably, the subarrays are separately displayed to create a "catalog" of fabrics that are being considered for each product type. The catalog may be reviewed with a client, for example by email.

At least one pattern from at least two of the subarrays of patterns is combined to produce the storyboard. The storyboard preferably is displayed on the computer display. The storyboard may be annotated by the interior designer, for example using an editing tool, to indicate, for example, which pattern is being considered for wall treatment, which pattern is being considered for floor treatment, which pattern is being considered for upholstery and which pattern is being considered for countertops. The storyboard then may be emailed to the client. The storyboard also may be electronically stored and/or printed. The storyboard also may be used to electronically order samples of the interior design surface treatments that are contained in the storyboard. In yet another alternative, the storyboard may be used to electronically order sufficient quantities of the interior design surface treatments that are contained in the storyboard, for the interior space.

The present invention preferably is implemented using a graphical user interface. In such a graphical user interface, the plurality of arrays of patterns preferably is displayed in a first window on a display and the plurality of subarrays of patterns preferably is displayed in a second window on the display. The storyboard preferably is displayed in a third window on the display. These windows may be contiguous or separated from one another and may be accessed using tabs, pull-down menus or other conventional window selection techniques.

Moreover, the present invention preferably is implemented in a client-server environment. Preferably, a client computer and a server computer are connected via a network, preferably the Internet. More specifically, the stored set of patterns for interior design surface treatments may consume large amounts of computer storage, and a high speed search engine preferably is used for searching the stored set of patterns. Accordingly, the set of patterns for interior design surface treatments may be stored at a server system, preferably a Web server, and the search engine for searching the stored set of patterns also may operate at a server system. The user search criteria may be generated at a client system, for example a desktop, laptop or palmtop personal computer, and may be conveyed to the server system over the Internet. The array of patterns that are generated from the search may be transmitted to the client system over the network, such as the Internet, and displayed at the client system. The subarrays may be generated at the client system and the storyboard also may be generated at the client system. After the storyboard is generated, however, the storyboard preferably is transmitted to the client system for storage until needed again. The storyboard may be stored at the client and/or server for future use.

The invention has been described above in terms of displaying a plurality of arrays of patterns that correspond to user search criteria, generating a plurality of subarrays of patterns in response to user selection from the corresponding array of patterns and combining at least one pattern to produce the storyboard. However, the storyboard may be generated directly from the plurality of arrays of patterns without the need for intermediate generation of a plurality of subarrays of patterns. Accordingly, a plurality of arrays of patterns that correspond to user search criteria may be obtained from a stored set of patterns for interior design surface treatments and may be displayed. Then, at least one pattern from at least two of the arrays of patterns may be combined to produce a storyboard.

In client-server implementations of the present invention, the server preferably stores the set of patterns for a plurality of surface treatment product types, each pattern including a plurality of pattern attributes. The server preferably accepts from a client over a network such as the Internet, at least one user-selected attribute for at least one of the surface treatment product types. The stored pattern attributes for the at least one of the surface treatment product types is searched to generate a plurality of arrays of patterns that meet the at least one user-selected attribute. The plurality of arrays of patterns that meet the at least one user-selected attribute preferably is transmitted to the client over the network. A storyboard of interior design surface treatments for an interior space preferably is received from the client over the network and is stored at the server.

The client preferably accepts at least one user-selected attribute for at least one of a plurality of surface treatment product types, to define user search criteria. The user search criteria preferably is transmitted to the server over the network. The client also preferably receives from the server over the network, a plurality of arrays of patterns that correspond to the user search criteria, each array of patterns corresponding to a surface treatment product type. The plurality of arrays of patterns preferably is displayed. The client accepts at least one user selection from at least one of the plurality of arrays of patterns. The client preferably generates a plurality of subarrays of patterns and preferably displays the plurality of subarrays of patterns. The client then preferably combines at least one pattern from at least two of the subarrays, to produce a storyboard, and preferably displays the storyboard. Accordingly, the interior design process may be made more flexible and/or more efficient.

Other embodiments of the present invention can store data related to the plurality of arrays of patterns that correspond to user search criteria, data related to the plurality of subarrays of patterns and/or data related to the storyboard, in a database. The database can be mined to extract information related to projects of a user and/or products of a manufacturer of the interior design surface treatments. For example, the database can be mined to extract information related to search criteria of a user, patterns that are frequently selected by a user, combinations of interior design surface treatments that are used by a user, samples of interior design surface treatments that have been ordered by a user, or quantities of interior design surface treatments that have been ordered by a user. Mining can extract information related to past projects of a user, work-in-progress projects of a user, or future projects of a user. Moreover, the database can be mined to extract information related to products and product categories of a manufacturer of the interior design surface treatments that are selected in response to user search criteria, that are selected from the corresponding array of patterns or that are included in a storyboard. This information can be used by a manufacturer to generate sales leads, to design new patterns, to direct marketing and/or to manufacture interior design surface treatments.

Other embodiments of the present invention obtain a plurality of patterns for interior design surface treatments from a plurality of manufacturers of interior design surface treatments and convert the patterns from the manufacturers into a standardized set of representations of the plurality of patterns for interior design surface treatments from the plurality of manufacturers. The standardized set of representations then are stored. Converting may encompass both the patterns themselves and the pattern attributes, to thereby generate a standardized set of representations of patterns and attributes from multiple manufacturers. The patterns may be converted by scaling the patterns to a common scale, capturing images of the patterns under common lighting and/or color correcting the patterns. The attributes may be standardized by generating specifications for the patterns from a standard set of attributes and attribute values. The standardized attributes also may be used to allow simplified communication between designers and suppliers, allow improved accuracy of product descriptions so that, for example, a designer can obtain a better understanding of a product and/or allow a standard format for data exchange among designers, customers and suppliers. According to other embodiments, a product specification that is associated with a selected pattern in the plurality of arrays of patterns that correspond to user search criteria, in the catalog and/or in the storyboard is displayed.

Other embodiments of the present invention resize at least one of the images of the patterns that is displayed on the storyboard, without resizing the pattern, in response to user input. Thus, distortions in the storyboard may be reduced and preferably eliminated, notwithstanding the resizing of images thereon. Images on the storyboard also may be rotated in response to user input and legends may be added to the storyboard to identify selected attributes of the patterns on the storyboard. Images, graphics and/or text may be imported into the storyboard, and the storyboard itself may be exported to other systems, methods or computer program products.

Other embodiments of the present invention allow custom products to be searched and can also allow collections, correlates or related materials to be searched. Discontinued items may be flagged in response to a search and/or may not be returned in response to a search. Moreover, databases may be provided so that a user can identify a service provider and/or a manufacturer's representative. Many of these embodiments may be used independently of methods, systems and/or computer program products for generating storyboards of interior design surface treatments for interior spaces, according to embodiments of the present invention.

BRIEF DESCRIPTION OF THE DRAWINGS

FIGS. 32 and 33 are flowcharts of operations that are performed in response to selection of options on a menu bar of a storyboard according to an embodiment of the present invention.

FIG. 40 is an example of a product specification that includes standard attributes according to an embodiment of the present invention.

FIG. 41 is a flowchart of operations that may be performed to create storyboards according to an embodiment of the present invention.

FIG. 44 is a flowchart of accepting user search criteria according to an embodiment of the present invention.

FIG. 45 is a flowchart of handling discontinued products according to an embodiment of the present invention.

FIG. 47 illustrates an example of a sample ordering page according to an embodiment of the present invention.

DETAILED DESCRIPTION OF PREFERRED EMBODIMENTS

Figure 1:
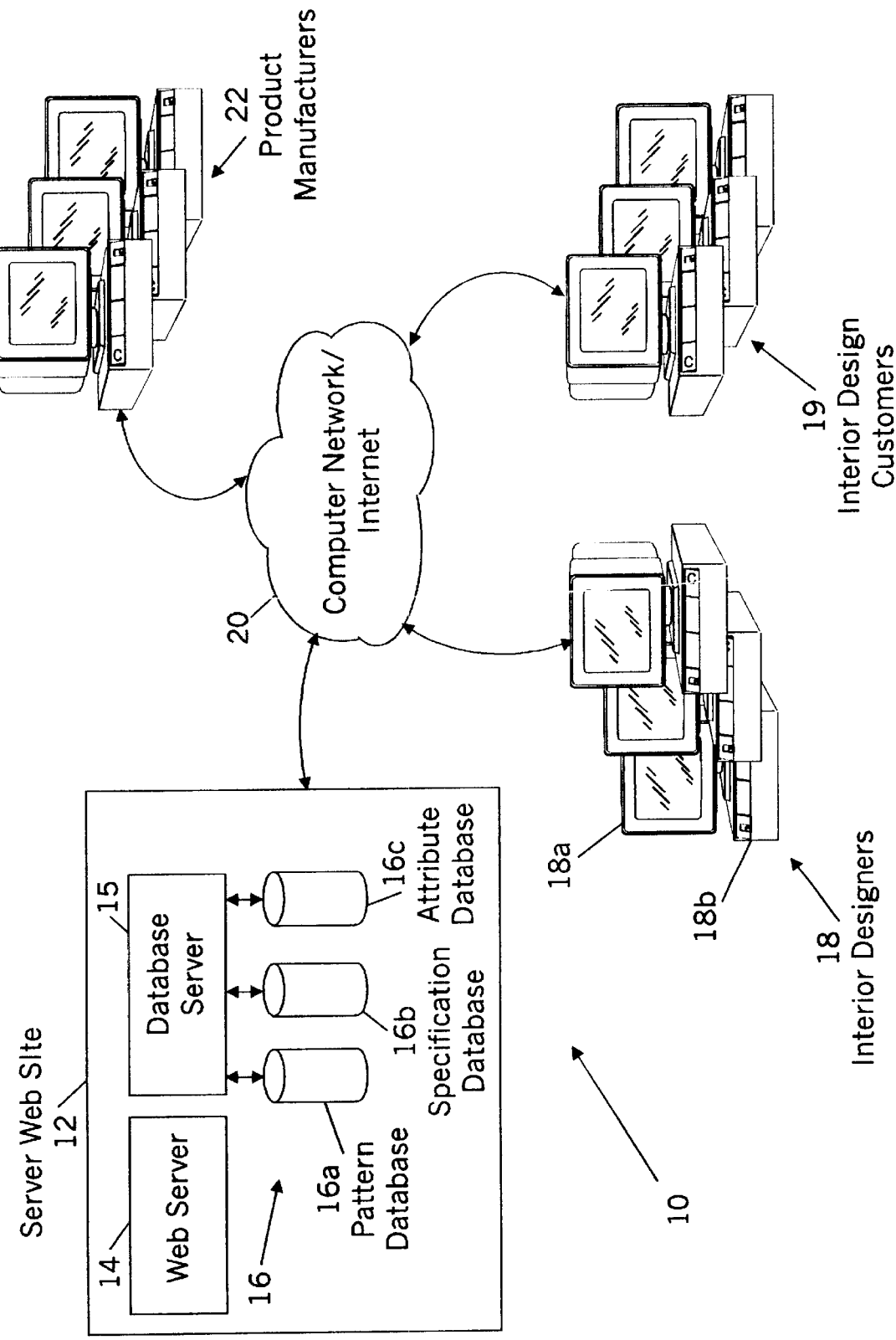
FIG. 1 is a diagrammatic representation of computer systems, methods and computer program products for generating a storyboard of interior design surface treatments for an interior space according to an embodiment of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the description of the drawings.

In order to provide a complete description of preferred embodiments of the invention in a systematic manner, a general description first will be provided. An intermediate level description then will be provided, followed by a detailed implementation of embodiments of the invention. Other embodiments of the invention then will be described.

The terms "user" and "designer" are used synonymously herein to indicate any user of systems, methods and/or computer program products for generating storyboards of interior design surface treatments for interior spaces and/or other interior design surface treatment systems, methods and/or other computer program products according to embodiments of the invention. Moreover, the terms "manufacturer" and "supplier" are used synonymously herein to indicate any entity in a supply chain for interior design surface treatments.

General Description

The present invention may be practiced on a single computer, preferably using a client-server architecture. However, because the present invention preferably involves storage and/or searching of large numbers of graphical images (patterns) of interior design surface treatments, the present invention preferably is implemented on a client-server system, wherein at least one client computer and at least one server computer are connected over a network, such as the Internet.

The Internet is a worldwide decentralized network of computers having the ability to communicate with each other. The Internet has gained broad recognition as a viable medium for communicating and for conducting business. The World-Wide Web (Web) was created in the early 1990's, and is comprised of server-hosting computers (Web servers) connected to the Internet that have hypertext documents (referred to as Web pages) stored therewithin. Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device. While HTTP and Web pages are the prevalent forms for the Web, the Web itself refers to a wide range of protocols including Secure Hypertext Transfer Protocol (HTTPS), File Transfer Protocol (FTP), and Gopher, and Web content formats including plain text, HyperText Markup Language (HTML), Extensible Markup Language (XML), as well as image formats such as Graphics Interchange Format (GIF) and Joint Photographic Experts Group (JPEG).

A Web site is conventionally a related collection of Web files that includes a beginning file called a "home" page. From the home page, a visitor can access other files and applications at a Web site. A large Web site may utilize a number of servers, which may or may not be different and which may or may not be geographically-dispersed. For example, the Web site of the International Business Machines Corporation (www.ibm.com) includes thousands of Web pages and files spread out over multiple Web servers in locations world-wide.

A Web server (also referred to as an HTTP server) is a computer program that generally utilizes HTTP to serve files that form Web pages to requesting Web clients. Exemplary Web servers include International Business Machines Corporation's family of Lotus Domino® servers, the Apache server (available from www.apache.org), and Microsoft's Internet Information Server (IIS), available from Microsoft Corporation, Redmond, Wash. A Web client is a requesting program that also generally utilizes HTTP. A browser is an exemplary Web client for use in requesting Web pages and files from Web servers. A Web server waits for a Web client, such as a browser, to open a connection and to request a specific Web page or application. The Web server then sends a copy of the requested item to the Web client, closes the connection with the Web client, and waits for the next connection.

HTTP allows a browser to request a specific item, which a Web server then returns and the browser renders. To ensure that browsers and Web servers can interoperate unambiguously, HTTP defines the exact format of requests (HTTP requests) sent from a browser to a Web server as well as the format of responses (HTTP responses) that a Web server returns to a browser. Exemplary browsers that can be utilized with the present invention include, but are not limited to, Netscape Navigator® (America Online, Inc., Dulles, Va.) and Internet Explorer™ (Microsoft Corporation, Redmond, Wash.). Browsers typically provide a graphical user interface for retrieving and viewing Web pages, applications, and other resources served by Web servers.

As is known to those skilled in this art, a Web page is conventionally formatted via a standard page description language such as HTML, which typically contains text and can reference graphics, sound, animation, and video data. HTML provides for basic document formatting and allows a Web content provider to specify anchors or hypertext links (typically manifested as highlighted text) to other servers. When a user selects a particular hypertext link, a browser running on the user's client device reads and interprets an address, called a Uniform Resource Locator (URL) associated with the link, connects the browser with a Web server at that address, and makes a request (e.g., an HTTP request) for the file identified in the link. The Web server then sends the requested file to the client device which the browser interprets and renders within a display screen.

As also will be appreciated by one of skill in the art, the present invention may be embodied as methods, data processing systems, and/or computer program products. Accordingly, the present invention may take the form of an entirely hardware embodiment, an entirely software embodiment running on general purpose hardware or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as JAVA®, Smalltalk or C++. The computer program code for carrying out operations of the present invention may also be written in conventional procedural programming languages, such as "C", JavaScript, Visual Basic, TSQL, Perl, or in a functional (or fourth generation) programming language such as Lisp, SML, or Forth. In addition, Microsoft Active Server Pages (ASP) technology and Java Server Pages (JSP) technology may be utilized. The program code may execute entirely on one or more Web servers and/or application servers, or it may execute partly on one or more Web servers and/or application servers and partly on a remote computer (i.e., a user's Web client), or as a proxy server at an intermediate point in the network. In the latter scenario, the remote computer may be connected to the Web server through a LAN or a WAN (e.g., an intranet), or the connection may be made through the Internet (e.g., via an Internet Service Provider).

The present invention is described below with reference to block diagram and flowchart illustrations of methods, apparatus (systems) and computer program products according to an embodiment of the invention. It will be understood that each block of the block diagrams and/or flowchart illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create structures for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process or method such that the instructions which execute on the computer or other programmable apparatus provide steps for implementing the functions specified in the block diagram and/or flowchart block or blocks.

Referring now to FIG. 1, a computer system 10 that can practice methods and/or include computer program products for generating a storyboard of interior design surface treatments for an interior space, according to an embodiment of the present invention, is schematically illustrated. The illustrated system 10 includes a server Web site 12 and a plurality of interior designer clients 18, also referred to as an interior designer site, an interior designer system or simply as an interior designer, that communicate with one another over a computer network, such as the Internet 20. Each interior designer site 18 includes a computer display 18a and a computer 18b. A pointing device such as a mouse also is included.

The server Web site 12 includes a Web server 14, such as a Java Web server, a database server 15 and one or more databases 16. As shown in FIG. 1, the databases 16 may include a pattern database 16a, a specification database 16b and an attribute database 16c. Other databases also may be provided. Although a single Web server 14 and database server 15 are illustrated, it will be understood that multiple Web servers and multiple database servers (including other application servers) may be utilized according to the present invention.

The Web server 14 is the "front end" component of the Web site 12, and is configured to handle requests from interior designers 18 that access the Web site 12. The Web server 14 can include program code, logic and graphics, to interface with the interior designers 18. Exemplary commercial Web servers that may be utilized as a Web server 14 in the illustrated system 10 are Apache, available from the Apache Server Project, http://www.apache.org; Microsoft's Internet Information Server (IIS), available from Microsoft Corporation, Redmond, Wash.; and Netscape's FastTrack®) and Enterprise™ servers, available from America Online, Inc., Dulles, Va. Other Web servers that may be utilized include Novell's Web Server for users of its NetWare® operating system, available from Novell, Inc., San Jose, Calif.; and IBM's family of Lotus Domino® servers, available from International Business Machines Corporation, Armonk, N.Y.

As is known by those of skill in the art, a database is a collection of data that is organized in tables or other conventional forms of organization. A database typically includes a database manager and/or database server 15 that facilitates accessing, managing, and updating data within the various tables of a database. Exemplary types of databases that can be used to implement the pattern database 16a, specification database 16b, and attribute database 16c of the present invention include relational databases, distributed databases (databases that are dispersed or replicated among different points in a network), and object-oriented databases. Relational, distributed, and object-oriented databases are well understood by those of skill in the art and need not be discussed further herein. Since the present invention preferably includes large quantities of stored patterns, a database system that is particularly adapted for storing and searching large numbers of patterns, such as Oracle8i Visual Image Retrieval (VIR) available from Oracle Corp., Redwood Shores, Calif. may be used. See the Oracle8i Visual Information Retrieval Data Sheet, March 1999. However, other databases may be used, including IBM's DB2® database, Microsoft's SQL server database, and database products from Sybase and Computer Associates.

The database server 15 operates as a "middleman" server between the Web server 14 and the plurality of databases 16. The database server 15 generally includes program code and logic for retrieving data from the databases 16 (and from sources external to the Web site 12) in response to requests from the Web server 14. The database server preferably is adapted for searching and storing of large numbers of patterns, such as Oracle VIR. Other commercial database servers that may be utilized as a database server 14 in the illustrated system 10 include Microsoft's SQL server, IBM DB2® Universal Database server, the latter being available from International Business Machines Corporation, Armonk, N.Y.

FIG. 1 illustrates a plurality of databases including a pattern database 16a, a specification database 16b and an attribute database 16c. However, it will be understood that one or more of these databases may be combined into a single database and that other databases also may be provided at the server Web site 12. The pattern database 16a stores a plurality of patterns for interior design surface treatments. These patterns may be obtained from product manufacturers 22 via the computer network 20. The specification database 16b may include product specifications for each of the products that are stored at the server 15, and also may be obtained from product manufacturers 22. Attribute database 16c may include other attributes of products that supplement the product specifications. These attributes may be obtained from the product manufacturers 22 and/or may be generated by interior designers that operate the server Web site 12. Detailed examples will be provided below. The patterns for the pattern database 16a, the specifications for the specification database 16b and the attributes for the attribute database 16c may be stored, organized and/or manipulated using conventional cataloging software, such as Extensis PhotoTools 3.0, marketed by the Extensis Products Group of Creativepro.com, Inc. See www.extensis.com. Other software such as Thumbs Up™ marketed by Graphic Detail, Inc. may be used. See www.graphicdetail.com.

The server Web site 12 is accessible to interior designers 18 via a computer network such as the Internet 20. Interior designers 18 can access the server Web site 12 via a client program, such as a browser or a custom software application, running on a client device, such as a personal computer 18b including a display 18a. However, it is understood that electronic devices such as personal digital assistants (PDAs), hand-held computers, Internet-ready phones, and WebTVs, may be utilized as client devices for accessing the Web site 12 in accordance with the present invention.

The Web server 14 also is configured to communicate with various third parties in order to carry out aspects of the present invention. As will be described below, the Web server 14 is configured to communicate with the product manufacturers 22, in order to obtain the pattern database 16a, the specification database 16b and/or the attribute database 16c from each manufacturer. Moreover, samples of patterns in a storyboard may be ordered from the product manufacturers 22 via the Web server 14. In yet another alternative, actual quantities of the interior design surface treatments for the interior space may be ordered from the product manufacturers 22 via the Web server 14. Finally, the interior designers 18 may communicate with their interior design customers (referred to by interior designers as "clients") 19, for example by sending an email storyboard, via the Internet and preferably through the Web server 14. Communications between the interior designers 18, interior design customers 19, server Web site 12 and product manufacturers 22 are preferably established via the Internet 20. However, other communication methods and networks may be utilized, including direct-dial access and telephonic communications. Wireless or wire communications may be used.

Figure 2:
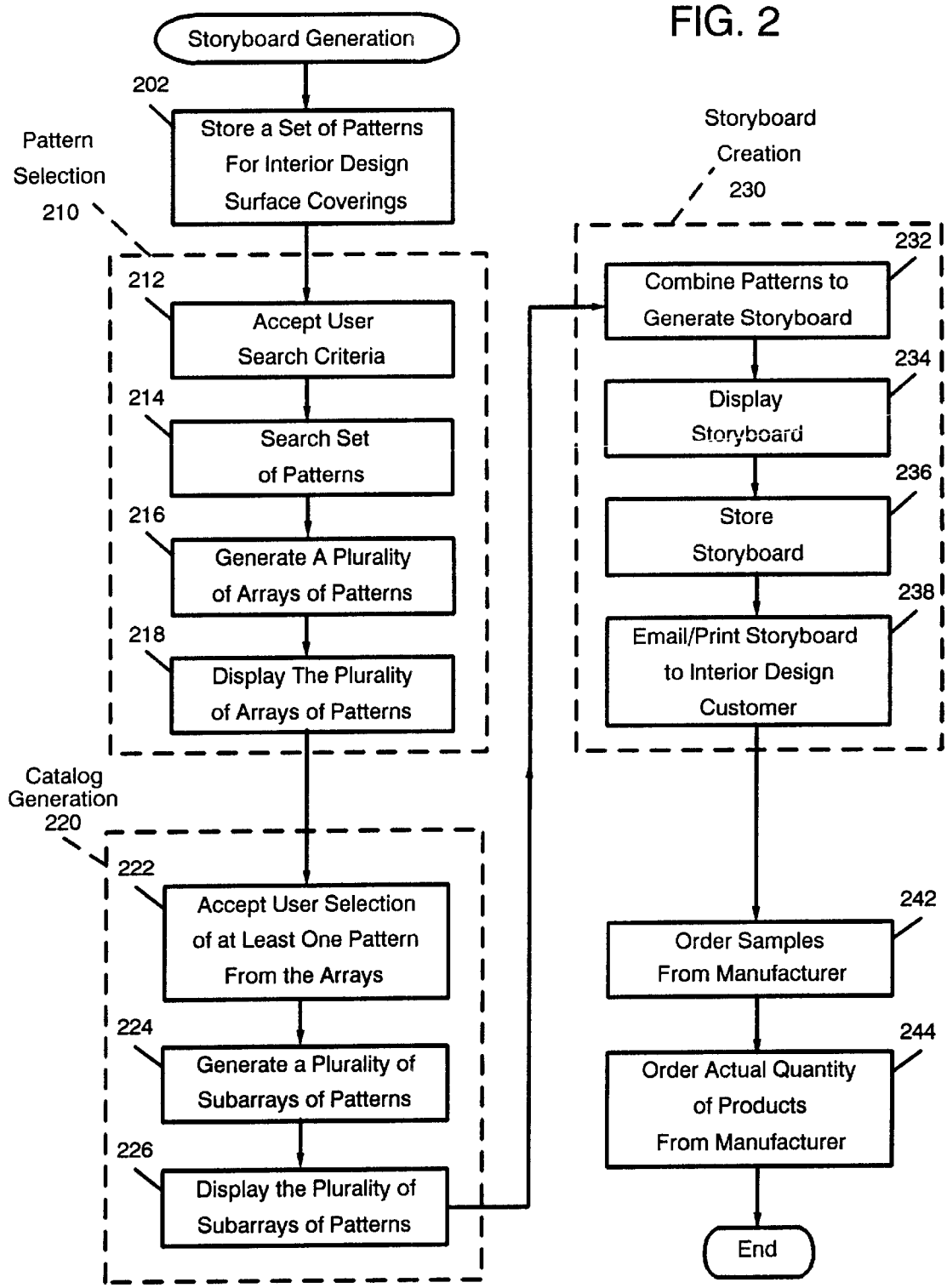
FIG. 2 is a flowchart illustrating overall operations for storyboard generation according to an embodiment of the present invention.

Referring now to FIG. 2, operations for generating a storyboard according to an embodiment of the present invention, now will be described. A storyboard may be generated in three general phases: pattern selection 210, catalog generation 220 and storyboard creation 230. However, the catalog generation phase may be skipped and operations for storyboard creation may proceed directly from pattern selection 210.

Referring again to FIG. 2, the set of patterns for interior design surface treatments is stored (Block 202), preferably in the pattern database 16a at the server Web site 12. These patterns may be obtained from product manufacturers 22, and/or may be generated by scanning and/or digitally photographing actual samples of interior design surface treatments. As was described above, patterns also may include specifications and other attributes that may be provided by the manufacturer and/or by interior designers, and that are stored in the specification database 16b and attribute database 16c.

In the description that follows, an interior designer 18 also will be referred to as a "user" and a supplier also will be referred to as a "manufacturer". Continuing with the description of FIG. 2, user search criteria are accepted at Block 212. The user search criteria may be at least one user-selected attribute for the at least one of the surface treatment product types. The user search criteria also may include various aspects of the specification, such as identification of the manufacturer, identification of the primary color and an identification of an overall style. A hierarchy of attributes also may be provided, as will be described below, to allow a designer to formulate search criteria based on attributes that generally are used by designers in manually selecting surface treatments.

The user criteria preferably are accepted at the interior designer system 18. Then, referring to Block 214, a search is performed of the stored pattern attributes for the at least one of the surface treatment product types, to generate a plurality of arrays of patterns that meet the user search criteria at Block 216. It will be understood that the operations of Blocks 214 and 216 preferably are performed at the server Web site 12.

Then, at Block 218, the plurality of arrays of patterns that correspond to the search criteria are displayed, preferably at the interior designer system 18. Each array of patterns preferably corresponds to a surface treatment product type.

The catalog generation phase 220 of FIG. 2 now will be described generally. As shown in Block 222, user selection of at least one pattern from at least one of the plurality of arrays of patterns is accepted, preferably at the interior designer system 18. A plurality of subarrays of patterns then is generated at Block 224. Each subarray preferably corresponds to a surface treatment product type. At Block 226, the plurality of subarrays of patterns is displayed to produce a "catalog". The display of the plurality of subarrays of patterns allows the designer to manipulate the designer's preferred choices for each of the pattern types.

Storyboard creation according to the present invention (Block 230) now will be described generally. As shown in Block 232, at least one pattern from at least two of the subarrays of patterns or from at least two of the arrays of patterns are combined to generate a storyboard of interior design surface treatments for an interior space. Combining preferably takes place at the interior designer system 18. A storyboard is displayed, preferably at the interior designer system 18 at Block 234. The storyboard may be stored at Block 236. Although the storyboard may be stored at the interior designer system 18, it also preferably is stored at the server Web site 12. The storyboard then may be emailed to an interior design customer 19 at Block 238, either directly over the Internet 20 or via the server Web site 12. Prior to printing and/or emailing the storyboard to the interior design client at Block 238, the storyboard may be annotated, for example to indicate the interior space to which the storyboard applies, and to identify which patterns are associated with which surfaces, such as floors, upholstered furniture, walls and countertops.

At Block 242, samples of the interior design surface treatments that are contained in the storyboard may be electronically ordered from the product manufacturers 22, either directly over the Internet or via the server Web site 12. Moreover, actual quantities may be ordered from manufacturers 22 at Block 224, either directly via the Internet or via the server Web site 12.

It will be understood that the operations of FIG. 2 need not occur sequentially. Thus, operations for an interior design project may begin at any block in FIG. 2, and may be performed iteratively based on the interior designer's selections and/or customer interaction.

Intermediate Level Description

An intermediate level description of systems, methods and/or computer program products for generating a storyboard of interior design surface treatments for an interior space, according to an embodiment of the present invention, now will be described in connection with FIGS. 3–19. A detailed implementation then will follow.

Figure 3:
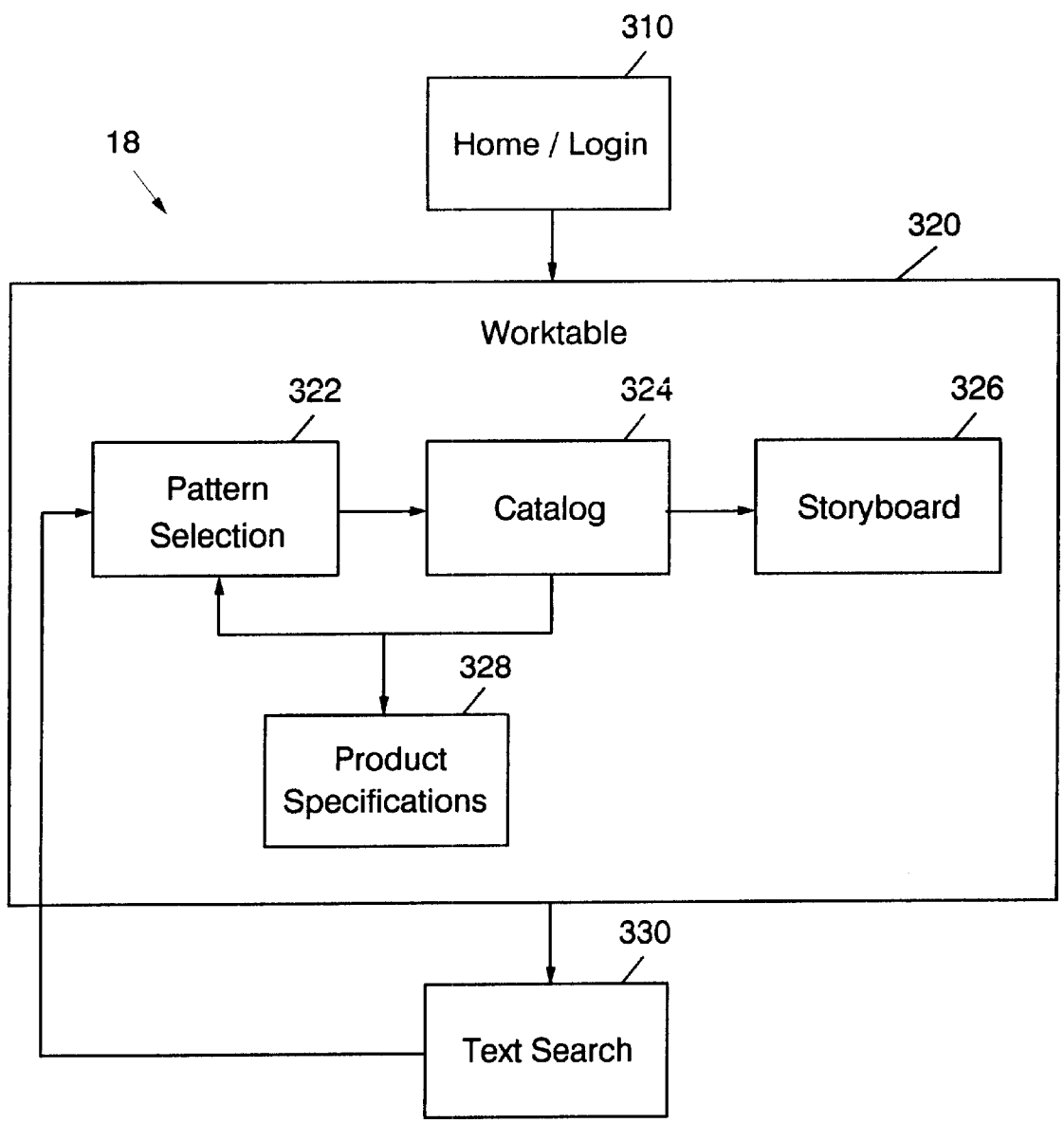
FIG. 3 is a block diagram of interior designer systems, methods and computer program products according to an embodiment of the present invention.

Referring now to FIG. 3, a block diagram of an interior designer system, method and/or computer program product 18 is shown. A home/login portion 310, a worktable portion 320 and a text search portion 330 preferably are included. Each of these portions may be embodied as a separate Web page and/or as elements of a custom software program. As will be described in detail below, the worktable 320 preferably includes a separate window for a pattern selection 322, a catalog 324, a storyboard 326 and product specifications 328. These windows may be contiguous, spaced apart and/or overlapping, and may be manipulated using conventional window manipulation techniques. Multiple catalogs and/or storyboards may be open simultaneously.

In general, the home/login portion 310 is the home page of the Web site, the login page and/or the login elements of a custom program. They may be combined into a single page. The worktable 320 preferably is a single page with four interrelated windows corresponding to the four modules of interrelated functionality. These windows include the pattern selection window 322 that includes the patterns that are selected by a search. The catalog 324 includes those patterns that are selected from the pattern selection window 322 by the interior designer. The storyboard 326 is created by the designer from the catalog 324 or directly from the pattern selection window 322. Product specifications 328 also preferably are included for each pattern. In general, as was described above, a designer first searches for products with certain patterns, then selects those patterns the designer is interested in, to build a catalog 324, then places the selected patterns in a storyboard 326 for presentation to a customer 19.

Figure 4:
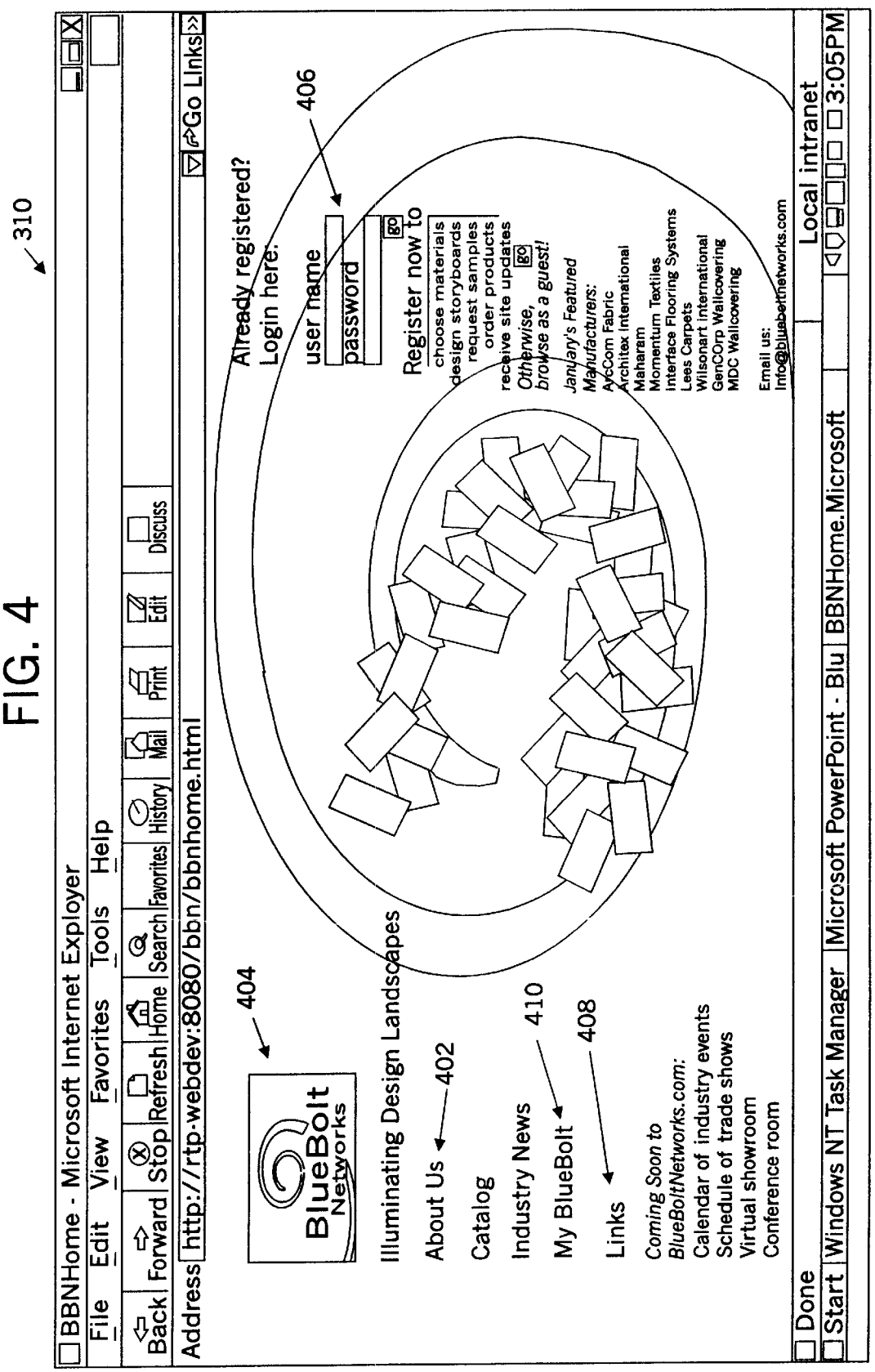
FIG. 4 illustrates a home/login page display or screen according to an embodiment of the present invention.

FIG. 4 illustrates an embodiment of a home/login display 310. The display 310 may include standard Web site features, such as descriptions of the company 402, descriptions of the application 404, a registration section 406, links to related sites 408, user customization 410, and other conventional Web site features. Upon supplying a user name and password in the registration section 406, and clicking on the "go" button, the designer can enter the worktable 320.

Figure 5:
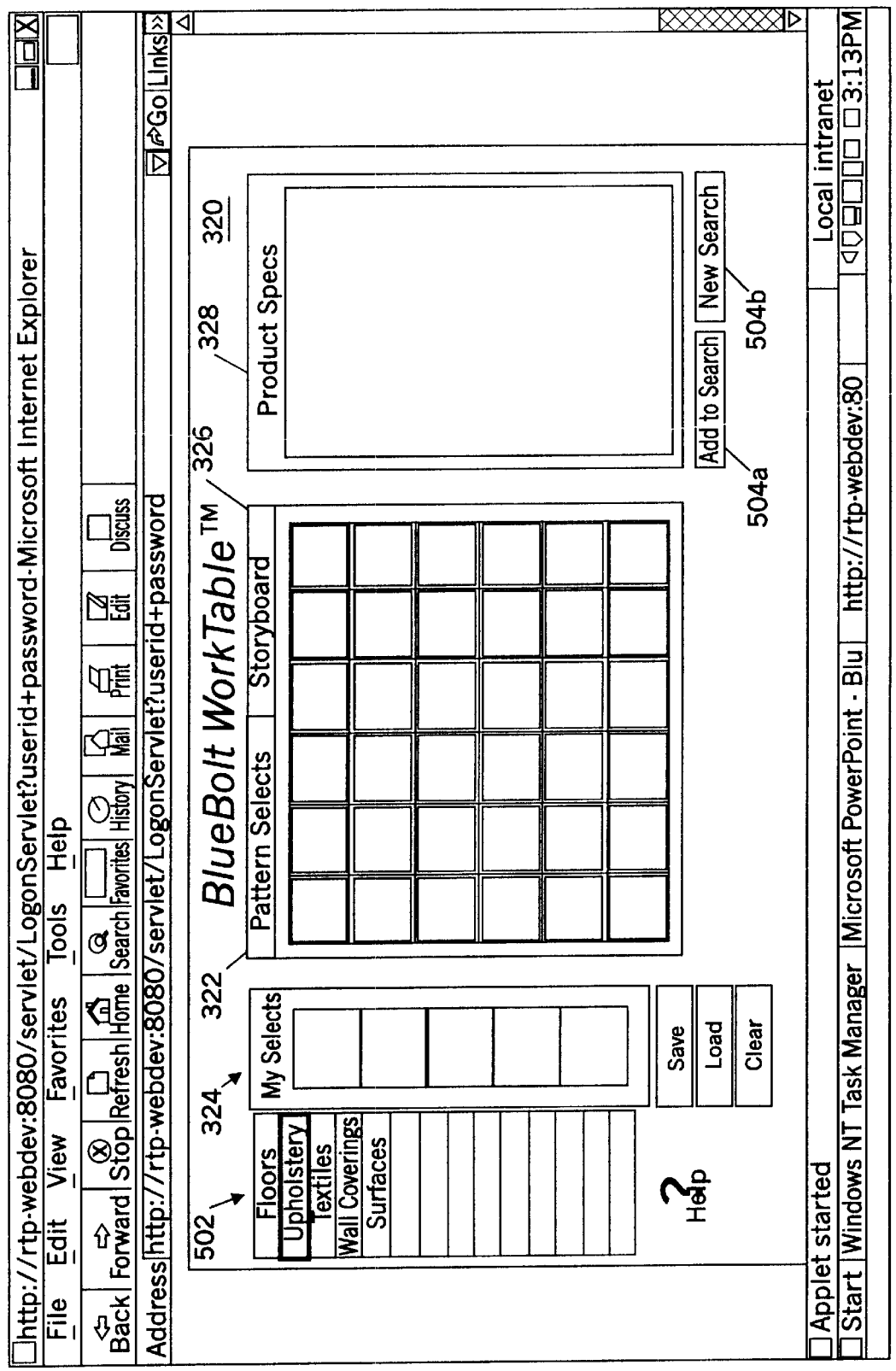
FIG. 5 illustrates an initial worktable display according to an embodiment of the present invention.

Referring now to FIG. 5, the worktable display 320 includes a pattern selection window 322, a catalog window 324, a storyboard window 326, and a product specification window 328. Buttons 504a and 504b also are included to access the text search function 330.

In general, the pattern selection window 322 displays a plurality of arrays of patterns, for example a plurality of 6×6 arrays of patterns that correspond to user search criteria, from a stored set of patterns for interior design surface treatments. Each array of patterns generally corresponds to a surface treatment product type. Representative surface treatment product types are shown in a list 502, and can include, for example, floor treatments (floor coverings), upholstery, textiles, wall treatments (wall coverings) and surfaces. Moreover, product types may also include a variety of product subtypes. Thus, carpet, vinyl tile, sheet flooring, porcelain tile and ceramic tile may be included for floor treatments, and solid materials and laminates may be included for surfaces.

Multiple arrays of pattern selections may be included in window 322, as will be described below. The catalog section 324 includes a plurality of subarrays of patterns. Each subarray corresponds to a surface treatment product type 502. The subarray is generated in response to user selection from the corresponding array of patterns for the corresponding surface treatment type. The subarray may include one or more patterns that are of interest to the designer, and that preferably are individually selected from the pattern selection window 322. The product specification area 328 contains product specifications for a selected pattern. In FIG. 5 a tab for storyboard 326 also is shown. The storyboard will be described below.

Figure 6:
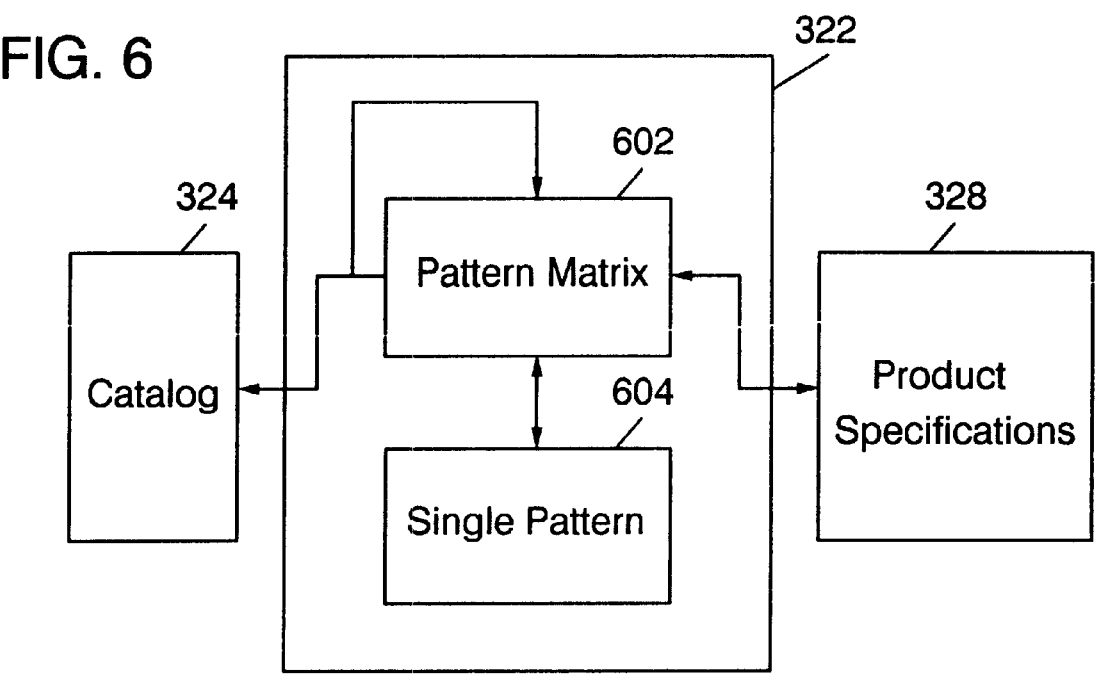
FIG. 6 is a block diagram of pattern selection according to an embodiment of the present invention.

FIG. 6 is a block diagram of pattern selection 322 according to an embodiment of the present invention. As shown in FIG. 6, the pattern selection window 322 allows display of a plurality of arrays of patterns that correspond to user search criteria. The arrays of patterns are referred to in FIG. 6 as a pattern matrix 602. A zoom function also preferably is provided to allow display of a single pattern 604 at a higher resolution. Moreover, selections from the pattern matrix 602 may be placed in the catalog area 324, based on the designer's selections. Product specifications 328 for a highlighted pattern in the pattern matrix 602 or for a single pattern 604, also are displayed.

More specifically, the pattern matrix 602 is the selection of patterns that have met the designer's search criteria, based on a text search of attributes and/or a search of patterns that will be described below. In the embodiment described herein, the matrix displays 36 items simultaneously. If there are more than 36 items, the user may page through the items. Individual patterns may be "dragged-and-dropped" from the matrix 602 to the catalog 324. The pattern then will be displayed in the catalog 324, as well as in the pattern matrix 602. The mouse may be used to point at a pattern in the matrix 602 or in the catalog 324, in order to display information about the product in the production specification window 328. If a pattern in the matrix is selected by clicking, the information in the product specification will stay in the window.

A pattern in the matrix 602 may be right clicked to allow the user to zoom in or search. In zooming, a single pattern 604 may be displayed within the matrix boundary. When a single pattern is displayed, right clicking the mouse can return to the entire matrix 602. When a pattern is selected and a right click is performed, a new search may be performed based on pattern content, to reload the matrix 602 with patterns most like the selected pattern. The search preferably is performed at the server Web site 12 using a search engine such as Oracle VIR or other similar pattern-matching search engines.

Figure 7:
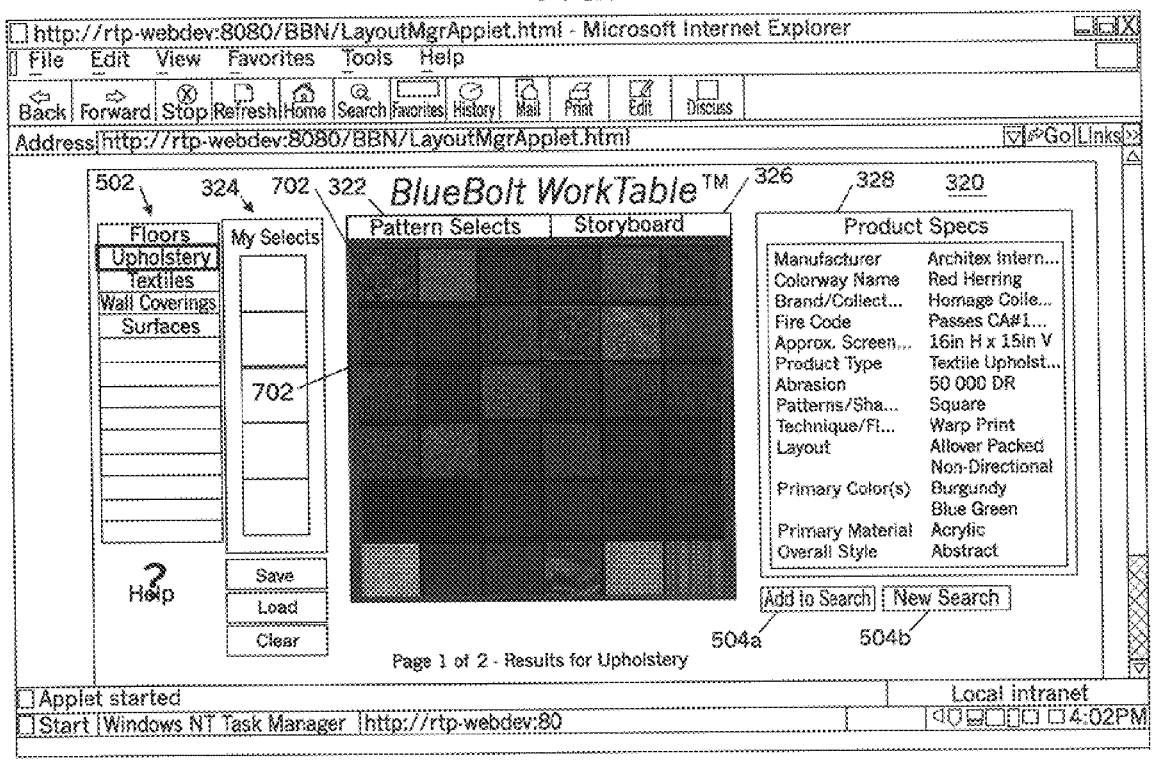
FIG. 7 illustrates a pattern selection page display on a worktable display according to an embodiment of the present invention.

FIG. 7 illustrates a pattern selection page display 322 on a worktable 320, wherein a pattern selection has been loaded based on user criteria. As shown in FIG. 7, the pattern matrix or array 322 displays the first two pages of upholstery patterns that meet the designer's criteria. The upholstery product in the list 502 is highlighted to indicate upholstery selection. The pattern in the second row and fourth column has been selected via the mouse, so that its product information is displayed in the production specification window 328. Moreover, as shown in FIG. 7, each pattern preferably includes a matching bar 702 adjacent, here shown as beneath, the pattern. The matching bar 702 provides an indicator of the extent that the pattern matches the user search criteria. In FIG. 7, the catalog or subarray of patterns 324 is empty, because the designer has not yet selected patterns from the pattern matrix or array 322.

Figure 8:
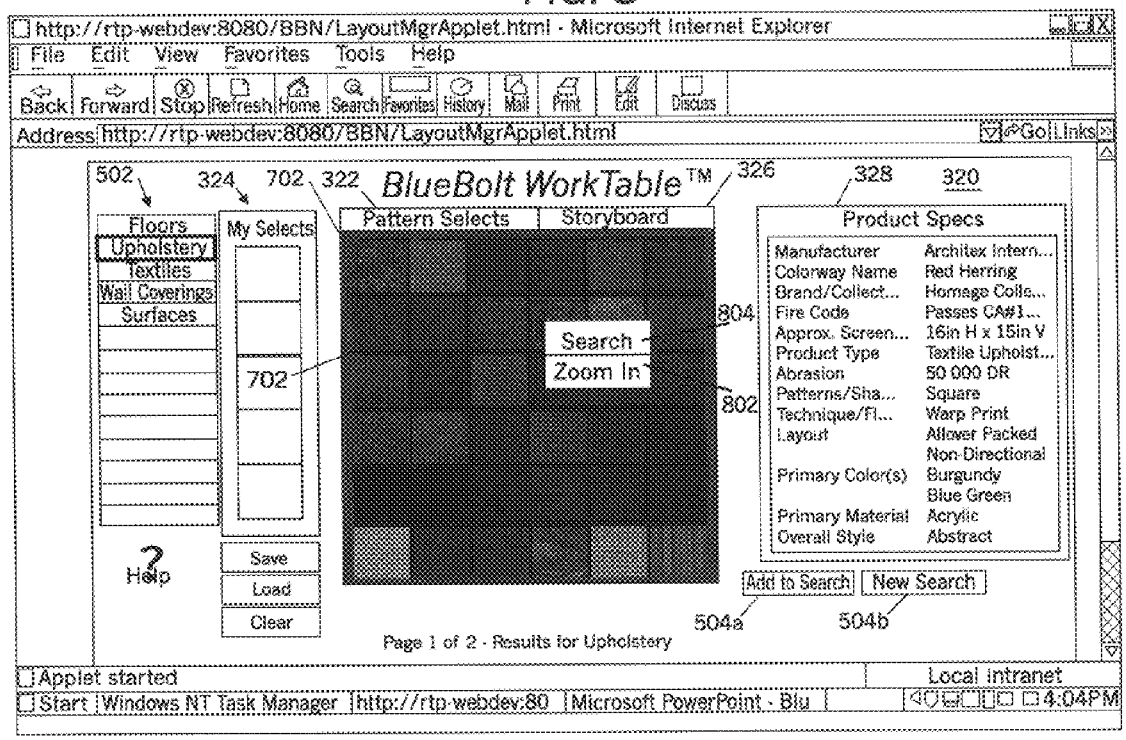
FIG. 8 illustrates a right mouse button menu on a pattern selection page display according to an embodiment of the present invention.
Figure 9:
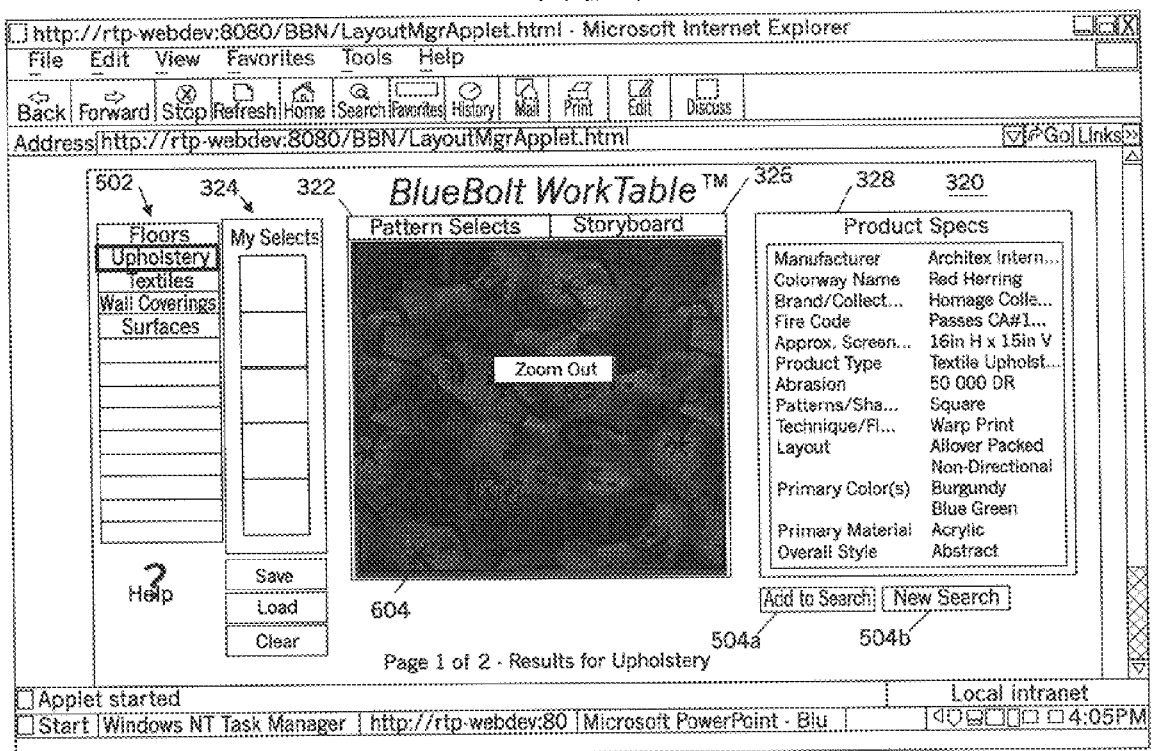
FIG. 9 illustrates a single pattern display on a worktable display according to an embodiment of the present invention.
Figure 10:
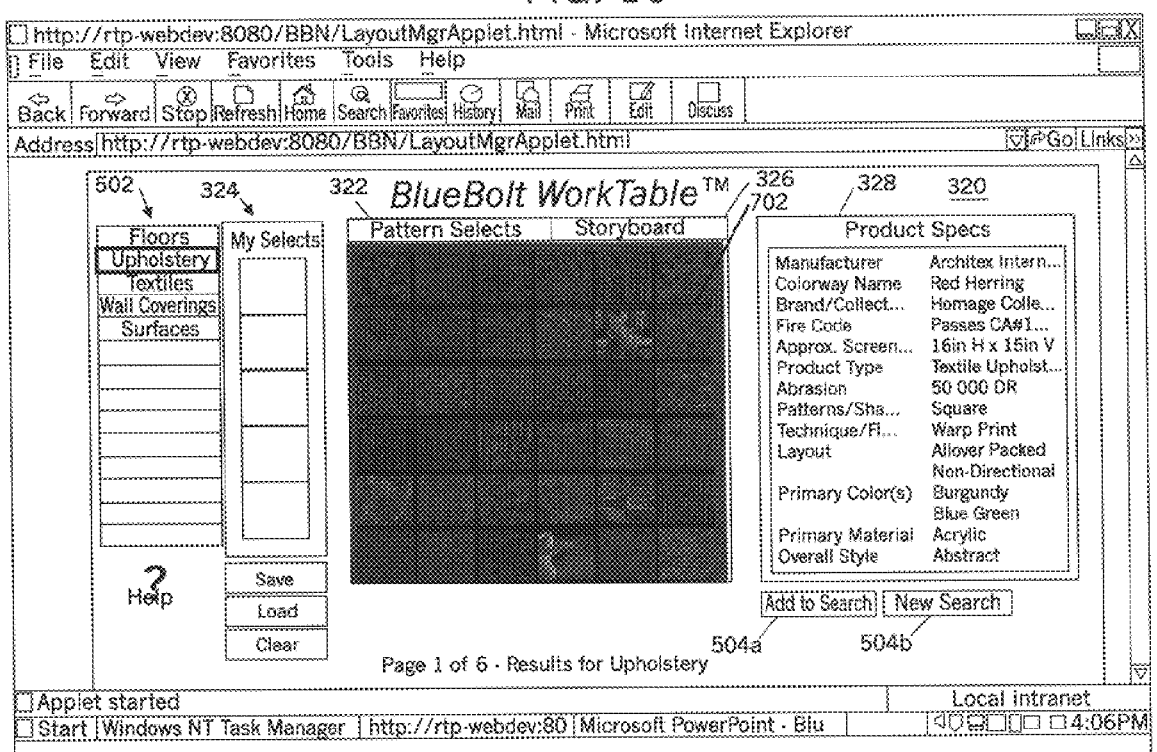
FIG. 10 illustrates a display of results of a visual search according to an embodiment of the present invention.

FIG. 8 is similar to FIG. 7, but illustrates the menu commands that may be obtained by right clicking the mouse on a selected pattern in the matrix 322. In particular, a zoom in or search may be performed. When a zoom in 802 is performed, only the selected pattern is displayed with the menu item for returning to all the patterns. See FIG. 9. When the search button 804 is selected, a new set of patterns is displayed in the pattern matrix 322. The new set of patterns may be obtained using, for example, Oracle's VIR search mechanism, by performing pattern matching to the selected pattern. See FIG. 10. In FIG. 10, the original pattern that was used to perform the new search is displayed in the upper left box of the matrix 322. The remaining boxes of the matrix 322 contain patterns that closely match the original pattern, based on the pattern matching search. Alternatively, the new set of patterns may be obtained by searching for other patterns that closely match the categories and values of the selected pattern.

Figure 11:
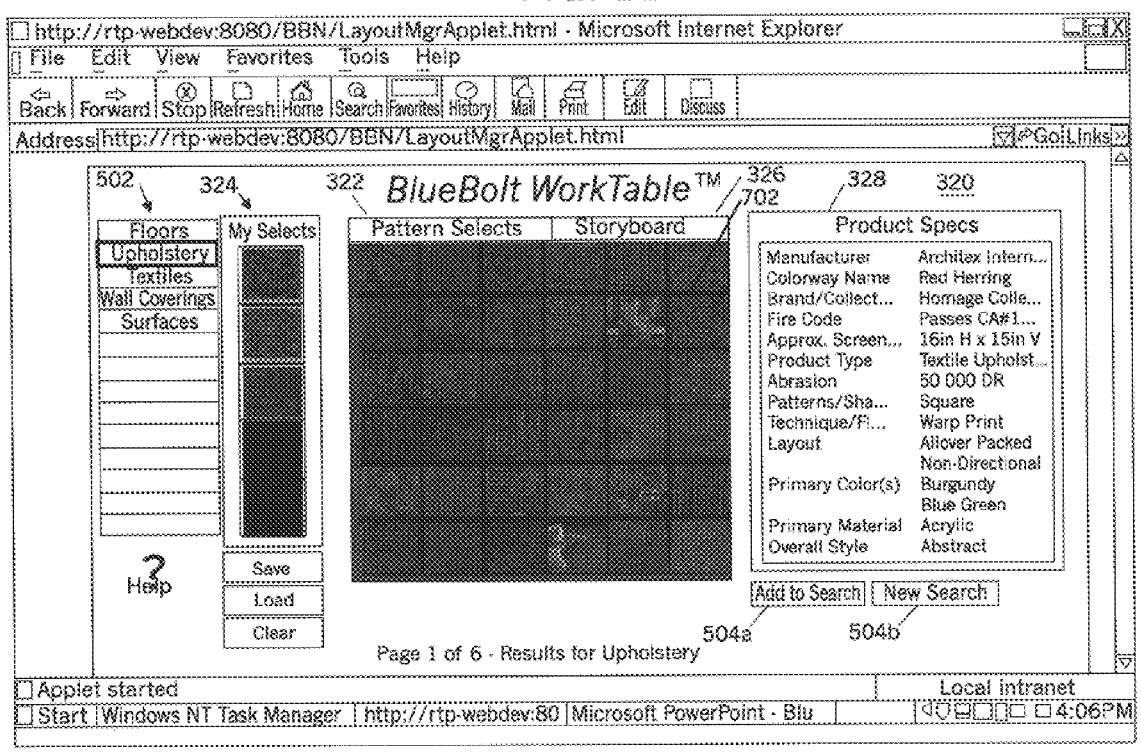
FIG. 11 illustrates a display of movement of patterns into a catalog according to an embodiment of the present invention.

FIG. 11 illustrates the designer's selection of patterns from the arrays or matrices 322, moving the selected patterns into the catalog 324 for use in building a storyboard 326. The catalog 324 now will be described in connection with FIG. 12.

Figure 12:
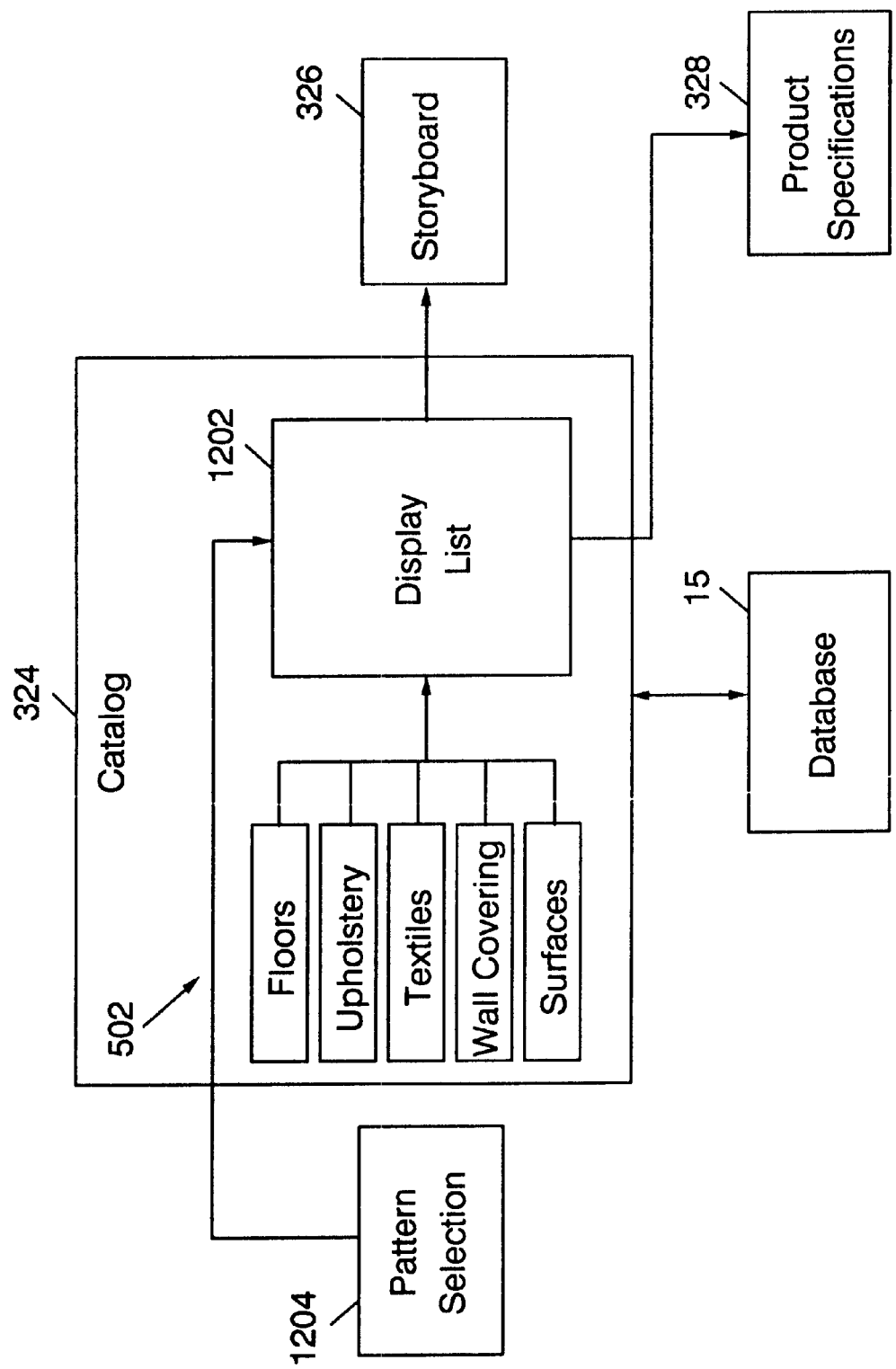
FIG. 12 is a block diagram of a catalog according to an embodiment of the present invention.

Referring now to FIG. 12, the catalog 324 includes a plurality of subarrays of patterns that are referred to in FIG. 12 as a "display list" 1202. Each subarray can include one or more patterns. Each subarray corresponds to a surface treatment product type 502, and is created in response to designer selection from the corresponding array of patterns 322 for the corresponding surface treatment type 502. Stated differently, the catalog 324 contains the designer's patterns of choice for each product type 502. The designer selects the patterns from the pattern selection area 322 and preferably stores them in the catalog 324 as an intermediary to placing the patterns in the storyboard. In another alternative, the designer may place patterns directly from the pattern selection matrix 322 into the storyboard 326.

In the catalog 324, clicking on the product type tab 502 displays the patterns chosen for that product, so that the designer can add or delete patterns. Individual patterns are selected from the pattern selection matrix 322 and dragged and dropped into the catalog display list 1202. As was shown in FIG. 11, five patterns may be selected for a product type 502. However, more than five patterns may be selected by adding slots to the display list as well. The slots may be added one at a time or in groups of five. It will be understood that the same pattern may be added to the catalog 324 more than once. Individual patterns from the catalog then may be dragged and dropped to be added to the storyboard 326.

Catalogs may be saved by pressing the save button 1102. The catalogs may be saved at the interior designer system 18, but preferably are saved at the server Web site 12. The clear button 1104 may be used to delete the current product types display list. The load button 1106 may be used to load a previously stored catalog 324. An individual item may be removed from the catalog 324 by right clicking on the selected pattern in the catalog. Similar to the description above for the pattern selection matrix 322, when the mouse pointer is run over a pattern, that pattern's specifications are displayed in the product specification area 328.

Figure 13A:
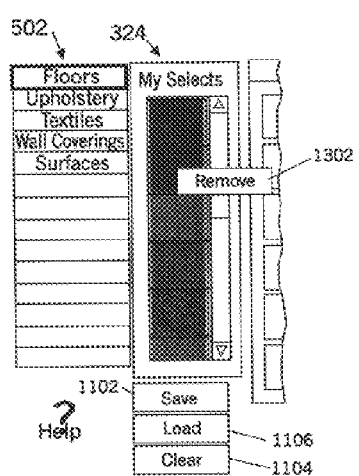
FIGS. 13A–13C illustrate detailed displays of a catalog according to an embodiment of the present invention.
Figure 13B:
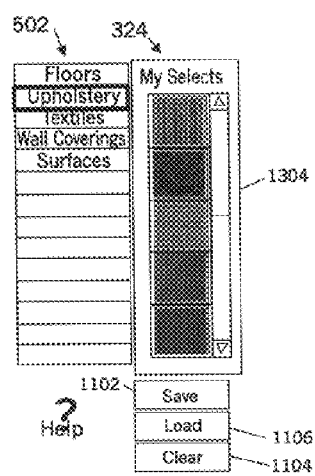
Figure 13C:
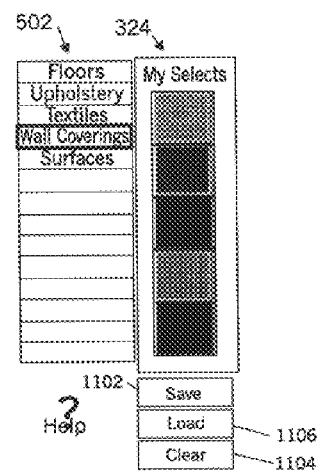

FIGS. 13A–13C illustrate detailed displays that describe various operations that can be performed on the catalog 324. Specifically, FIG. 13A illustrates an example of four pattern choices for floors, with the remove menu 1302 on pattern 2.

FIG. 13B illustrates a catalog for upholstery. Since more than five items were selected, a scroll bar 1304 is present. FIG. 13C illustrates a catalog 324 for wall treatments. As shown, there are only three items selected, and the third item may be placed in the fourth box. Thus, the designer can place the selected patterns in the catalog 324 at any position, for example to indicate best choices, next best choices, etc. The load and save buttons 1106 and 1102, respectively, move the catalog to and from the file system. The clear button 1104 empties the current product selections.

Figure 14:
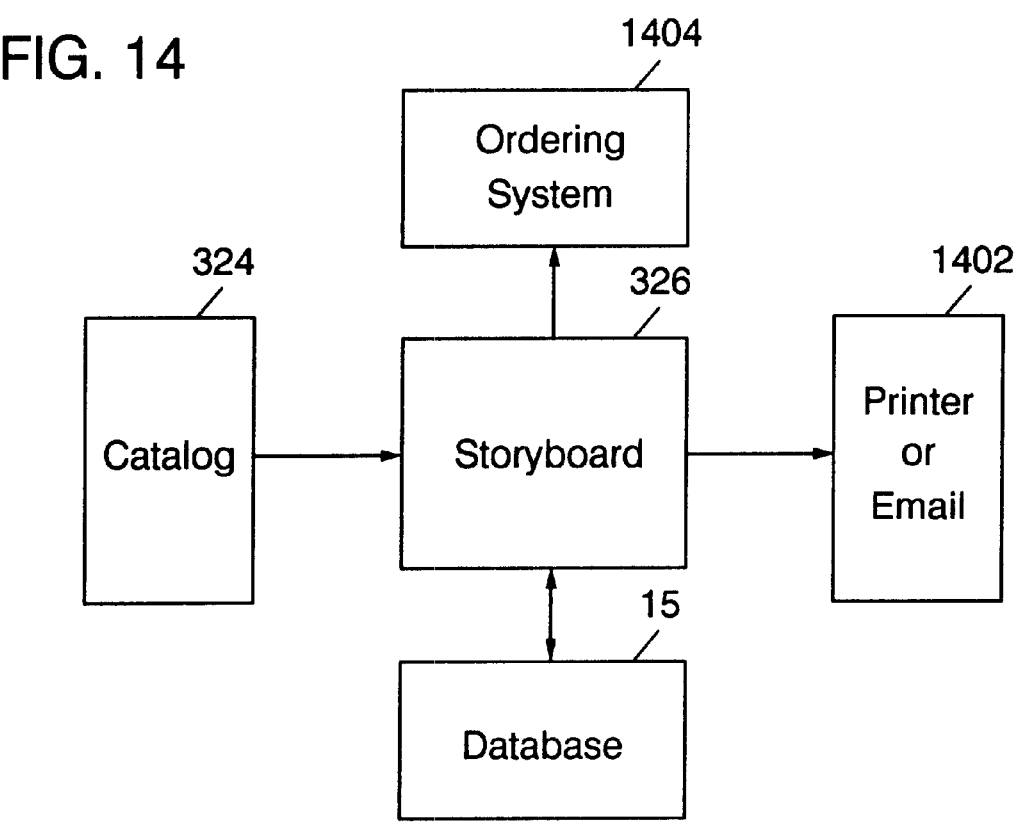
FIG. 14 is a block diagram of a storyboard according to an embodiment of the present invention.

FIG. 14 is a block diagram of a storyboard 326. In general, at least one pattern from the at least two of the subarrays of patterns in the catalog 324 may be combined into a single screen, window and/or file to produce a storyboard 326 of interior design surface treatments for an interior space. Patterns from the catalog and text annotations can be placed on the storyboard 326, resized, moved, etc. The storyboard itself can be detached from the worktable 320 and set up in its own window, so that it can be enlarged and made easier to work with, as with a conventional window.

Still referring to FIG. 14, patterns from the catalog 324 can be dragged and dropped on the storyboard 326. Patterns can be resized or moved using conventional window functionality. Text can be added to the storyboard via the right mouse button menu, to annotate the storyboard. This text may be used to describe the pattern use, such as a floor treatment, a wall treatment, etc. Storyboards can be saved to the database server 15 and/or at the interior designer system 18. Storyboards also can be loaded from the database server 15 and/or the interior designer's system 18. Storyboards also can be printed and emailed to customers 19, as shown at Block 1402. Samples of any or all the patterns may be ordered from a manufacturer using an ordering system 1404. Moreover, actual quantities of the material also may be ordered. When ordering actual quantities, assistance may be provided to determine the quantities needed by including a measuring function as part of the ordering function. Ordering may be implemented by selecting the item and using an order sample menu item or an actual quantity menu item from a menu bar.

A storyboard 326 on the worktable 320 may only occupy a small window. However, it may be detached from the worktable 320 and placed in its own window, so that it can be manipulated separately from the worktable 320. The storyboard 326 then may be reattached to the worktable 320.

Figure 15:
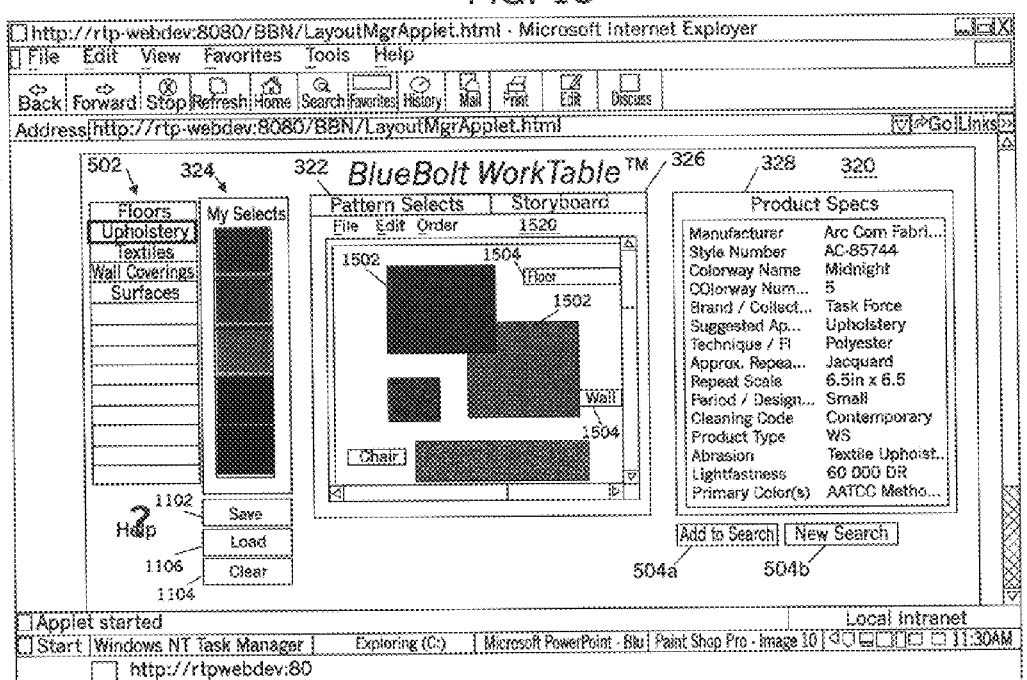
FIG. 15 illustrates a worktable display including a storyboard display according to an embodiment of the present invention.
Figure 16:
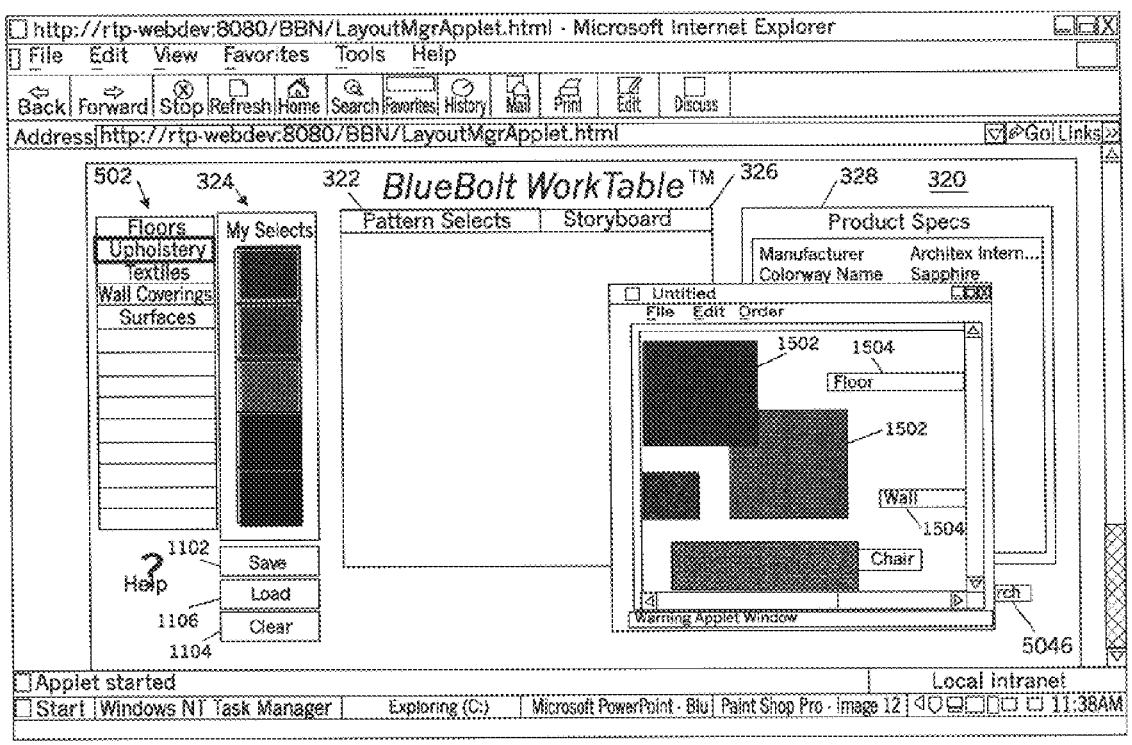
FIG. 16 illustrates a storyboard display detached from a worktable display according to an embodiment of the present invention.
Figure 17:
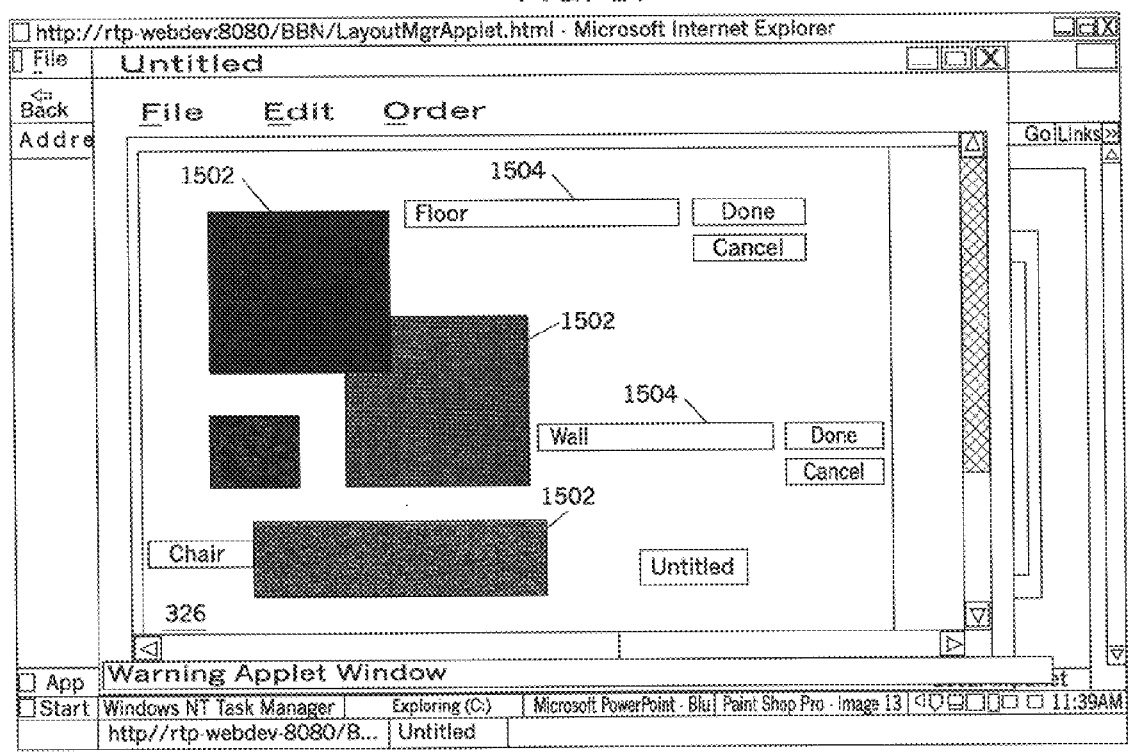
FIG. 17 illustrates a storyboard display that is resized according to an embodiment of the present invention.

FIG. 15 illustrates a worktable display 320 including a storyboard 326 having patterns 1502 and annotated text 1504. FIG. 16 illustrates the storyboard 326 detached from the worktable 320. FIG. 17 illustrates the storyboard window that has been resized.

It will be understood that the storyboard 326 has been illustrated as a planar, two-dimensional storyboard with fabric patterns placed at various locations therein. However, a three-dimensional "virtual room" storyboard representation also may be provided that includes a virtual floor, virtual walls, virtual countertops, virtual furniture and other virtual items. The selected patterns then may be mapped onto these virtual items, for example using conventional texture mapping techniques, to produce a virtual representation of the interior space.

Referring back to FIG. 2, pattern selection 210 now will be described in greater detail. In particular, accepting user search criteria (Block 212), searching the stored set of patterns (Block 214) and generating a plurality of arrays of patterns that meet the user search criteria (Block 216) now will be described.

Figure 18:
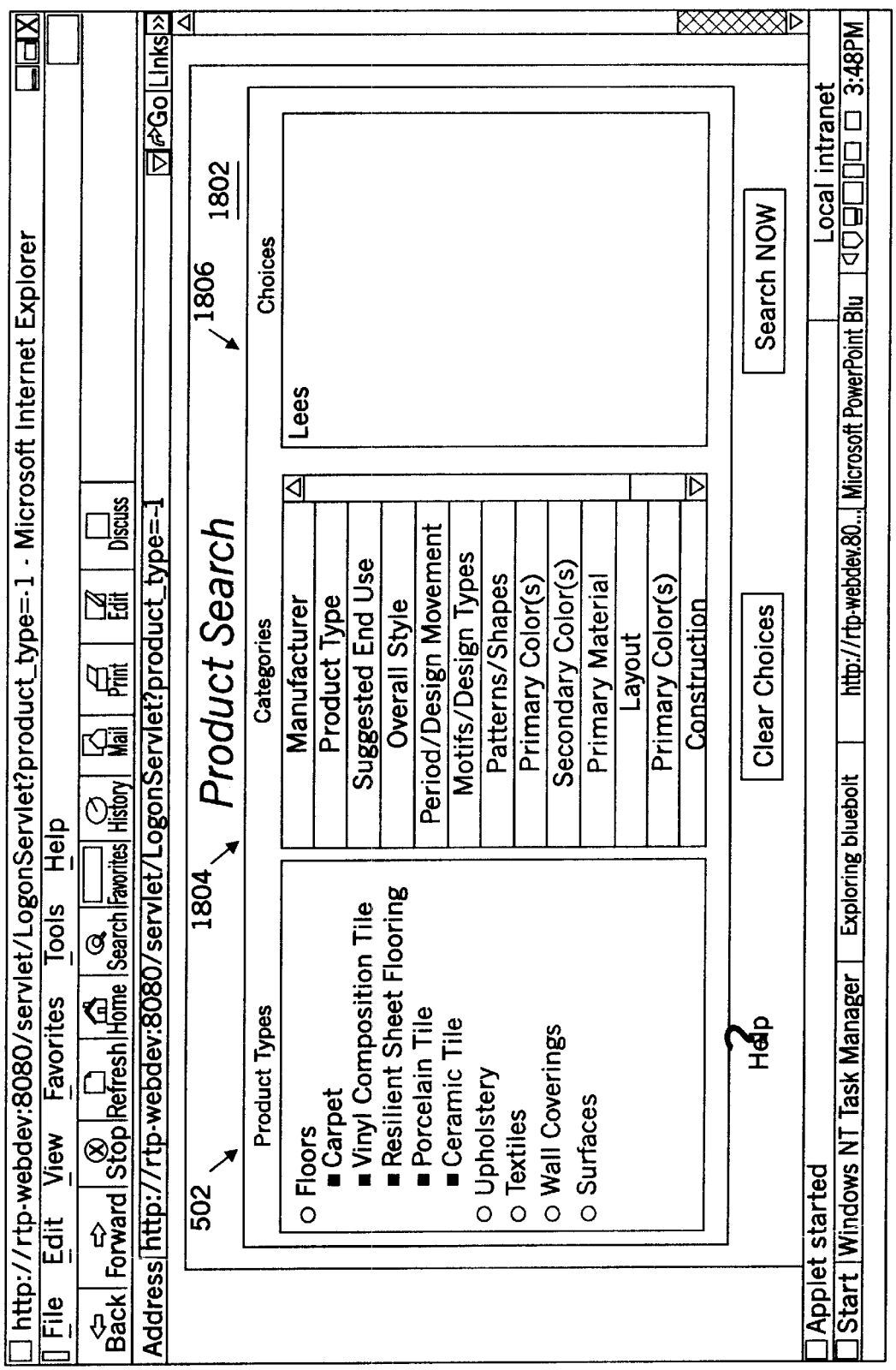
FIG. 18 illustrates a text search display according to an embodiment of the present invention.

More specifically, FIG. 18 illustrates a text search screen that may be initiated by depressing one of the search buttons 504a and 504b of FIG. 5. Upon depressing one of the search buttons 504a and 504b, the text search screen of FIG. 18 may be displayed. The screen includes a product search window 1802 and a separate window that lists product types 502, product attributes, also referred to as "categories" 1804 and product choices or values 1806. In general, a plurality of product types 502 may be supported. In the embodiment of FIG. 18, five product types are supported: floors, upholstery, textiles, wall treatments and surfaces. However, different and/or other product types may be supported. Moreover, one or more of the product types may include one or more subtypes. For example, as shown in FIG. 18, floors may includes subtypes of carpet, vinyl composition tile, resilient sheet flooring, porcelain tile and ceramic tile. A search preferably is conducted on one of the subtypes at a time.

Once the type/subtype 502 has been selected from the product type window 502, the attributes, also referred to herein as "categories", associated with the product type or subtype, is displayed in the product attribute window 1804. When an attribute is selected from the attribute window 1804, the attribute choices or values are displayed in the choices window 1806.

For an attribute or category 1804, the designer may select as many values or choices 1806 as desired. Moreover, the designer may specify more than one item in the category box 1804 and may select multiple choice values 1806 for each category.

Figure 19:
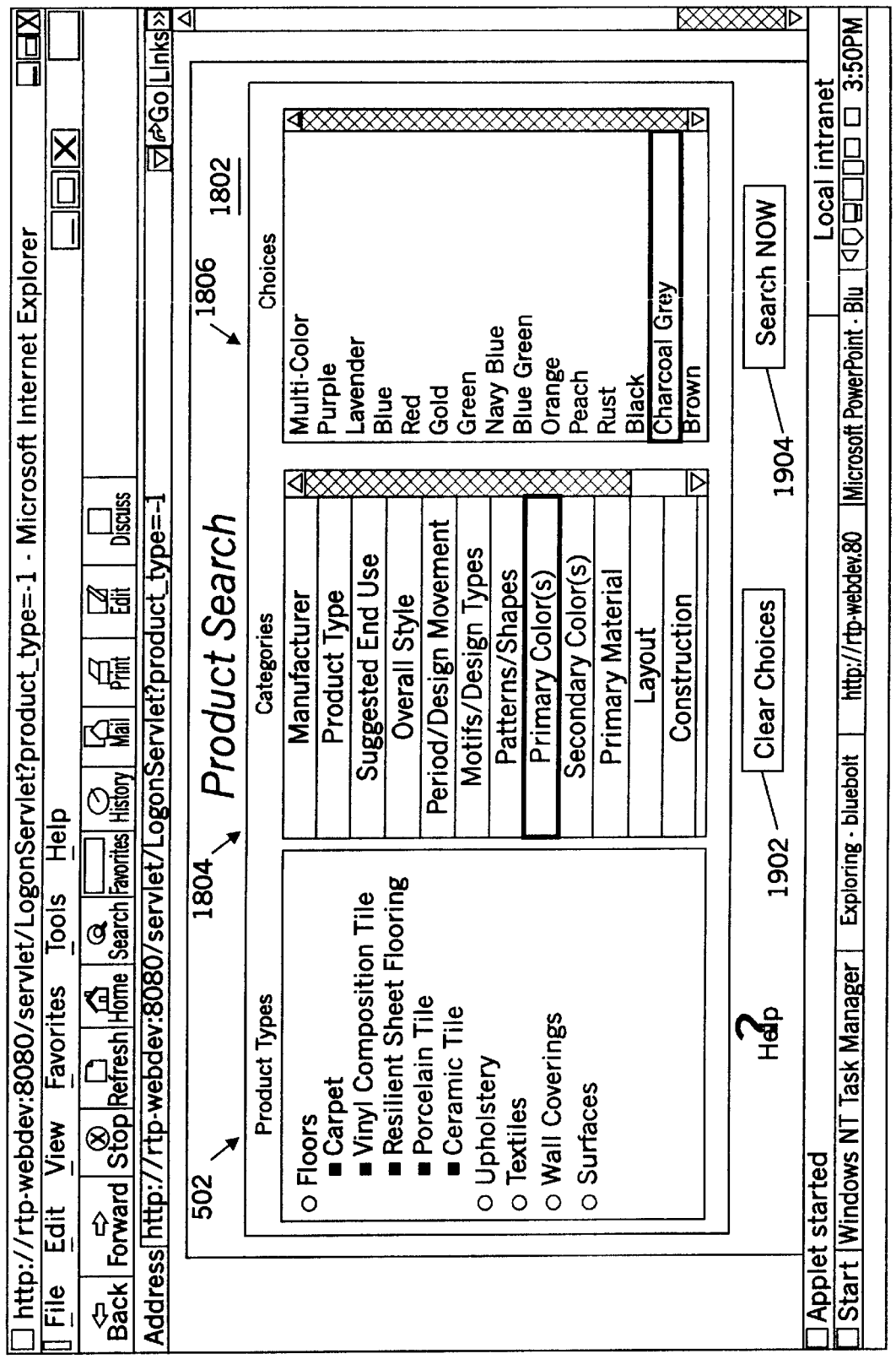
FIG. 19 illustrates a text search display with attribute values selected according to an embodiment of the present invention.

FIG. 19 illustrates an example of a text search screen 1802 with attribute values selected. In particular, as shown in FIG. 19, the designer can select the carpeting product type 502 and the category or attribute 1804 of primary color(s). The choices or values box 1806 lists all of the primary colors that are available, and the designer has selected charcoal grey. Other values 1806 may be selected for the other categories 1804. An example of a list of attributes (categories) 1804 and values (choices) 1806 for various product types 502 is provided in the following Table. It will be understood that the categories 1804 and/or the values 1806 may be provided by the manufacturer, and/or may be added based on designer input at the server Web site 12. It also will be understood that a color palette may be provided to allow actual color selection instead of or in addition to color name selection. Preferably, when an attribute has an unconstrained value range, it is not searchable. In the following Table, the left column lines indicate an attribute or category, and the right column lists corresponding values or choices.

TABLE

| Attribute | Value |
|---|---|
| File Name | Unconstrained Value |
| Manufacturer | Arc Corn Fabrics; Architex International; Momentum Textiles; Gen Corp Wallcoverings; Lees; MDC Wallcoverings; Paul Brayton Designs; Wilson Art International; etc. |
| Product Type | Carpet; Vinyl Composition Tile; Resilient Sheet Flooring; Porcelain Tile; Ceramic Tile; Solid Surface Material; Textile Upholstery; Bedding Fabric; Cubicle Fabric; Drapery Fabric; Panel Fabric; Leather Upholstery; Vinyl Upholstery; Vinyl Wallcovering; Textile Wallcovering; Laminate |
| Application | Bedding; Counter Top; Cubicle; Drapery; Drapery/Bedding Floorcovering-Base; Floorcovering-Corridor; Floorcovering-Main; Panel; Resilient Flooring; Upholstery; Wallcovering |
| End Use | Education; Healthcare; Hospitality; Office; Residential; Retail; Transportation |
| Overall Style | Abstract; Check; Conversational/Novelty; Floral; Geometric; Plaid; Plain/Solid; Regional/Ethnic; Stripe; Texture |
| Design Movement | Contemporary; Traditional; Transitional; African Influence; Art Deco; Art Noveau; Arts and Crafts; Asian Influence; Baroque; Bauhaus; Colonial; Empire; French Country; Impressionist; Latin American Influence; Jacobean; Naive / Primitive; Neoclassic; Renaissance; Southwest; Toile; Victorian |
| Motifs/Design Types | Animal; Animal Skin; Architecture; Bamboo; Bark; Basket/Vase; Bird; Botanical; Bouquet; Bow/Ribbon; Brushstroke ; Bud/Sprig; Butterfly/Insect; Cat/Dog; Celestial; Chain/Rope/Tassel; Daisy; Ditsy; Fan; Feather; Fiber; Flamestitch; Fleur de lis; Flower; Folkloric; Food; Fruit/Vegetable; Garden Flowers; Garland/Wreath; Grasses/Wheat; Greek Key; Heart; Heraldry; Horse; Hunting/Fishing; Juvenile; Lattice/Trellis; Leather Look; Leaves; Line/Scribble; Marbelized; Marine Life; Medallion; Mosaic; Musical; Nautical; Number/Letter; Object; Optical; Organic; Paisley; Patchwork; People; Puzzle; Reptile; Rose; Scallop; Scenic; Scroll; Shell; Speckle; Splatter; Sponge Look; Sports; Stone; Tile; Tone on Tone; Tools; Toy/Game; Transportation; Travel; Tree; Trompe loeil; Tropical; Tulip; Vines; Water/Wave; Western; Wildflowers; Woodgrain; Woven Look |
| Patterns | Argyle; Awning Stripe; Basketweave; Chalk Stripe; Check; Circle; Diamond; Gingham; Glen Plaid; Grasscloth; Grid; Herringbone; Houndstooth; Madras; Novelty Check; Novelty Plaid; Novelty Stripe; Ogee; Oval; Pin Stripe; Polka Dots; Polygon; Rep Stripe; Rectangle; Square; Tartan; Ticking; Triangle; Zigzag |
| Primary Color(s) | Beige; Black; Blue; Blue Green; Brown; Burgundy; Charcoal Grey; Dark Green; Gold; Green; Grey; Lavender; Light Blue; Light Green; Magenta; Mauve; Navy Blue; Off-White; Olive Green; Orange; Peach; Pink; Purple; Red; Rust; Taupe; White; Yellow; Yellow Green; Bleached-Cherry, Maple, Metallic, Multi-Color, Pine |
| Secondary Color(s) | Beige; Black; Blue; Blue Green; Brown; Burgundy; Charcoal Grey; Dark Green; Gold; Green; Grey; Lavender; Light Blue; Light Green; Magenta; Mauve; Navy Blue; Off-White; Olive Green; Orange; Peach; Pink; Purple; |

TABLE-continued

| Attribute | Value |
| --- | --- |
|  | Red; Rust; Taupe; White; Yellow; Yellow Green; Bleached-Cherry, Maple, Metallic, Multi-Color, Pine |
| Color Quality | Bright; Pastel/Light; Dark; Neutral/Muted; Medium; Jewel Tone; Cool; Warm |
| Primary Material | Acrylic; Cotton; Hemp; Leather; Linen; Modacrylic; Nylon; Olefin; Olefin/Polypropylene; Polyester; Polypropylene; Ramie; Rayon; Silk; Sisal Synthetic; Synthetic/Natural; Vinyl; Wool; Wool/Nylon |
| Repeat Scale | Extra Large; Large; Medium; Small; Mini; None |
| Layout | Directional; Non-Directional; Allover Packed; Allover Tossed; Allover Set; Border; Check/Plaid; Frame; Spaced Set; Spaced Tossed; Stripe; Wavy Stripe |
| Match Type | Drop Match; Free Reverse; Half Drop Match; Quarter Drop Match; Random; Reverse Drop Match; Set or Self Match |
| Technique | Batik/Tie Dye; Brocade; Chenille; Damask; Embossed; Embroidery; Gloss Finish; Jacquard; Ikat/Ikat Look; Matlasse; Matte Finish; Moire; Ombre; Overprint; Pebble Finish; Pile / Velvet; Print; Satin; Sheer; Taffeta; Tapestry; Woven/Woven Look; Warp Print |
| Construction | Broadloom; Roll; Fusion Bonded; Modular Tile; Tufted; Woven-Axminster; Woven-Velvet; Woven-Wilton |
| Pile Type | Cut Pile-Saxony Plush; Cut and Loop Pile; Loop Pile-Level Loop; Loop Pile-Multi Level Loop; Cut Pile-Texture; Cut Pile-Velvet |
| Dye Method | Piece Dyed; Printed; Solution Dyed; Stock Dyed; Yarn Dyed |
| Price/Yd. Range | Under $25; $25–$45; Over $45 |
| Style Name | Unconstrained Value |
| Style Number | Unconstrained Value |
| Colorway Name | Unconstrained Value |
| Colorway Number | Unconstrained Value |
| Band/Collection | Unconstrained Value |
| Exact Content | Unconstrained Value |
| Width | Unconstrained Value |
| Repeat | Unconstrained Value |
| Screen Image | Unconstrained Value |
| Abrasion | Unconstrained Value |
| Cleaning Code | Unconstrained Value |
| Lightfastness | Unconstrained Value |
| Treatment | Unconstrained Value |
| Custom Colors | Unconstrained Value |
| Fire Code | Unconstrained Value |
| Designer | Unconstrained Value |
| Net Price | Unconstrained Value |
| Railroaded | Unconstrained Value |
| Warranty | Unconstrained Value |
| Parent Company | Unconstrained Value |
| Tile or Sheet | Unconstrained Value |
| Standard Size | Unconstrained Value |
| Gauge | Unconstrained Value |
| Backing | Unconstrained Value |
| Reversible | Unconstrained Value |
| Discontinued | Unconstrained Value |
| Weight | Unconstrained Value |
| Physical Properties | Unconstrained Value |
| Colorfastness | Unconstrained Value |
| Minimum Order | Unconstrained Value |
| Lead Time | Unconstrained Value |
| Flame Spread Factor | Unconstrained Value |
| Smoke Devel. Factor | Unconstrained Value |
| Washable Temp. | Unconstrained Value |
| Alternate Basecloth | Unconstrained Value |
| Correlate Patterns | Unconstrained Value |
| Pile Height | Unconstrained Value |
| Associated Marketing | Unconstrained Value |

The selected product types 502, categories 1804 and choices 1806 preferably are transmitted to the server Web site 12, and a search is performed using the database server 15 and one or more of the databases 16. The search preferably is an "OR" search, to retrieve patterns for the selected product type 502 that match any of the categories 1804 or choices 1806. The match indicator 702 (FIG. 7) may be used to indicate the percentage of the attributes that are matched, so that the designer may determine how closely a given pattern matches all of the search criteria. A special indicator also may be provided to indicate that all attributes have been matched, i.e. that the pattern satisfies an "AND" search.

Detailed Implementation

A detailed implementation of an embodiment of the present invention now will be provided in connection with FIGS. 20–34. This detailed implementation will refer back to the overall description and intermediate level description of FIGS. 1–19.

Figure 20:
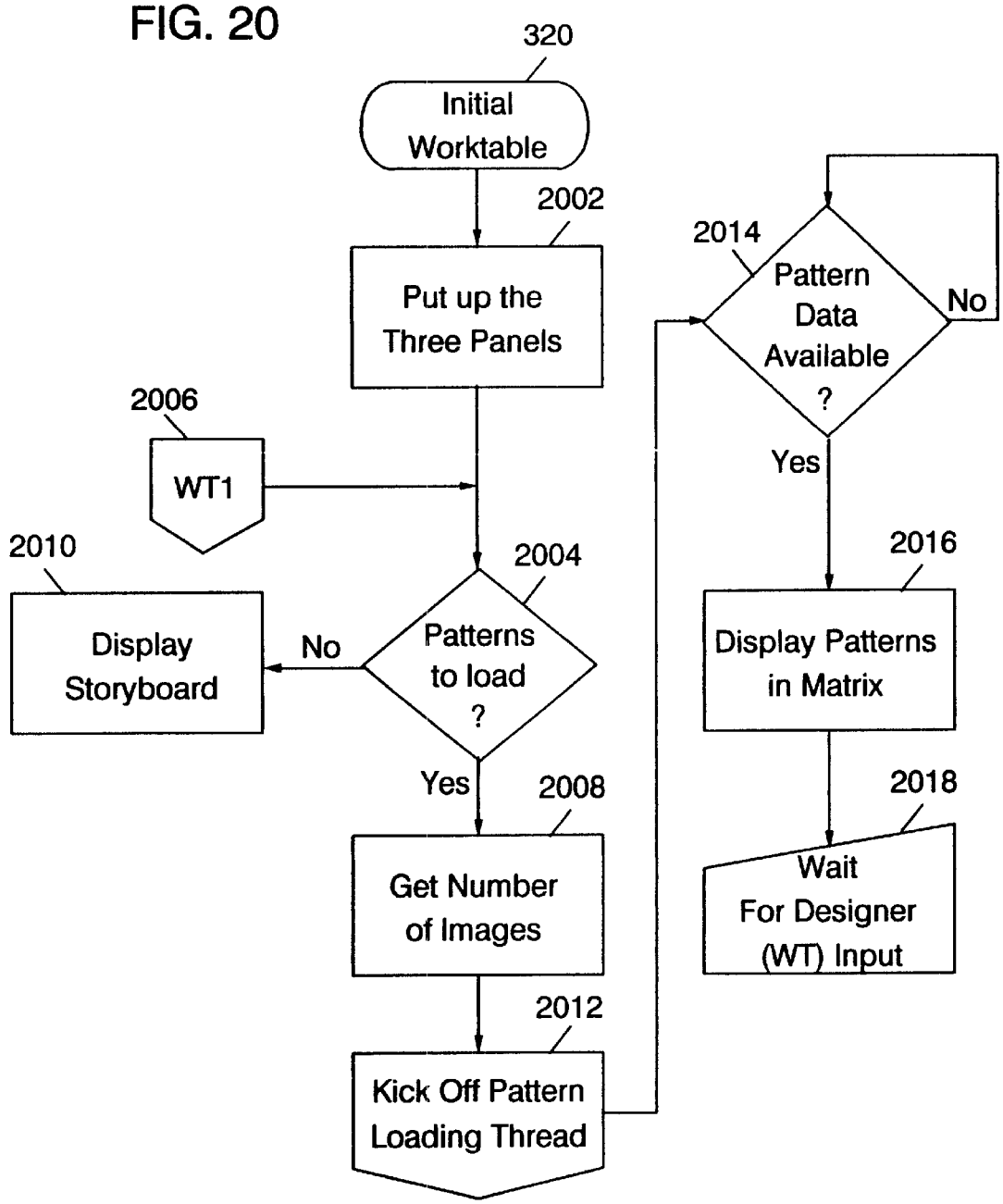
FIG. 20 is a flowchart of operations for producing an initial worktable according to an embodiment of the present invention.

Referring now to FIG. 20, operations for producing an initial worktable (WT) 320 of FIG. 5 now will be described. As shown in FIG. 20, operations begin at Block 2002, wherein the three panels of the worktable 320 are displayed. A saved worktable WT1 (Block 2006) then may be loaded. Details of Block 2006 will be described in FIG. 31 below. A test is then made at Block 2004 as to whether there are patterns to be loaded. If not, then the storyboard 326 is displayed at Block 2010. If yes, the images are obtained at Block 2008, by initiating a pattern loading thread at execution at Block 2012. It will be understood that the use of a separate thread can allow concurrent operations and/or better perceived performance. The pattern loading thread will be described in FIG. 21 below. Operations then wait at Block 2014 until pattern data is available. When pattern data is available, the patterns are displayed in the matrix 322 at Block 2016 and operations then wait for designer worktable input at Block 2018.

Figure 21:
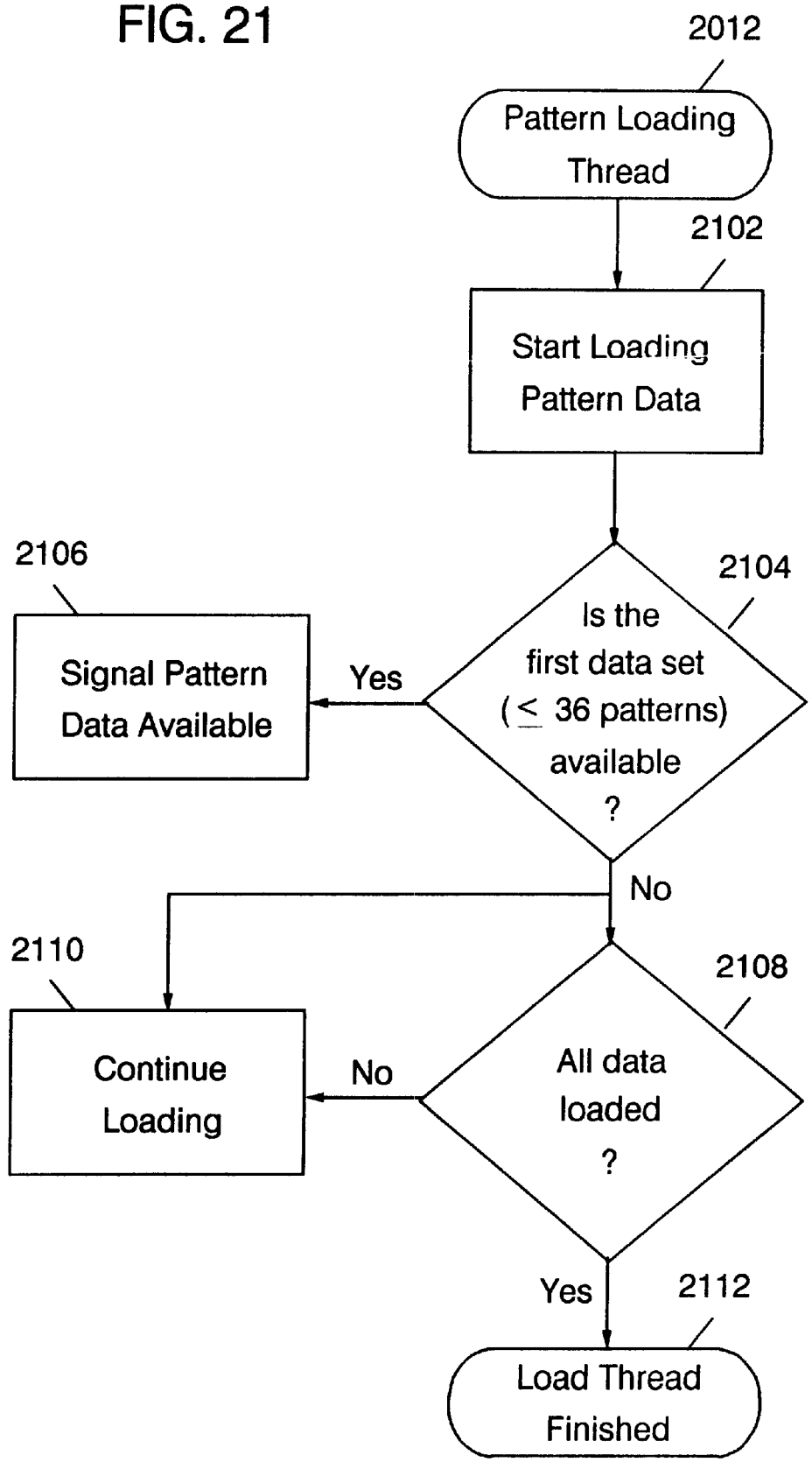
FIG. 21 is a flowchart of operations for pattern loading according to an embodiment of the present invention.

Referring now to FIG. 21, the pattern loading thread 2012 of FIG. 20 now will be described. The operations of FIG. 21 preferably take place at the server Web site 12. As shown in Block 2102, loading of pattern data is started. At Block 2104, a test is made as to whether the first data set, for example 36 patterns or less, is available. If yes, then at Block 2106, an indication is provided to the interior designer system 18 that pattern data is available, and the pattern data may be transmitted from the server Web site 12 to the interior designer system 18 via a network, such as the Internet 20. Since these patterns may occupy a large bandwidth, pattern transmission can begin even prior to completion of the search. If the answer at Block 2104 is no, at Block 2108, a test is made as to whether all data has been loaded and, if not, loading is continued at Block 2110 until all data has been loaded at Block 2112.

Figure 22:
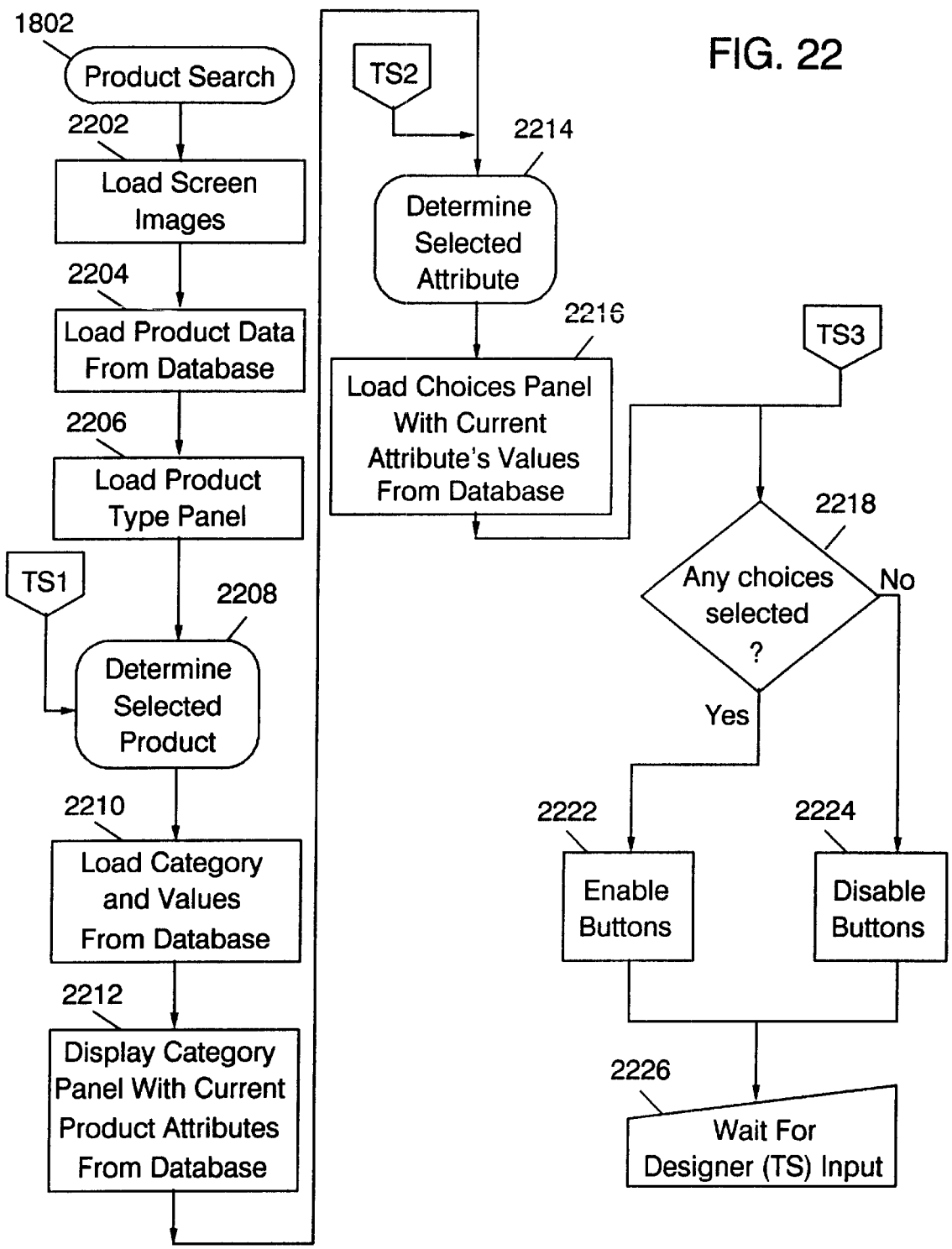
FIG. 22 is a flowchart of operations on a worktable to perform a product search according to an embodiment of the present invention.

Referring now to FIG. 22, detailed operations for performing a product search 1802 of FIG. 18, also referred to as a "text search", now will be described. In particular, at Block 2202, the screen images of FIG. 18 are loaded. Then, product data is loaded from the database 16 at Block 2204. The product type panel 502 also is loaded at Block 2206. A text search input (TS1) is received, and the selected product is determined from the input at Block 2208. Details of the text search input TS1 will be described in FIG. 23A below. The category and values that are loaded from the database 16 at Block 2210 and the category panel 1804 is displayed with current product attributes from the database at Block 2212. At Block 2214, a second text search input (TS2) is obtained, as described in detail in FIG. 23B, and the selected attribute is determined. The choices panel 1806 then is loaded with the current attributes values from the database at Block 2216. A third text search input (TS3) then is determined, as described in detail in FIG. 23D, and it is determined at Block 2218 whether any choices are selected. If yes, then the buttons are enabled for searching at Block 2222, and if not, the buttons for searching are disabled at Block 2224. Additional search input is then waited for at Block 2226.

Figure 23A:
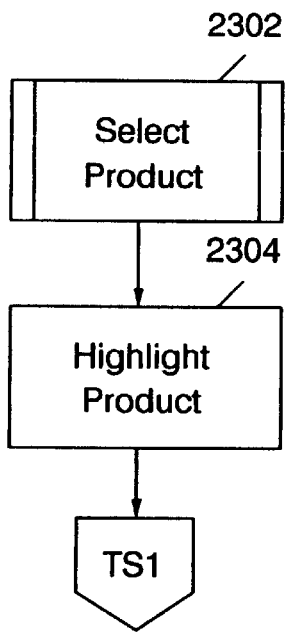
FIGS. 23A–23E are flowcharts of operations that are performed in response to designer text search input according to an embodiment of the present invention.
Figure 23B:
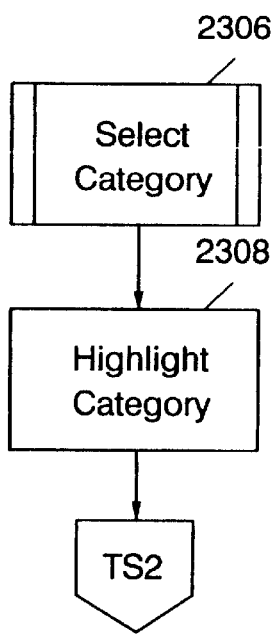
Figure 23C:
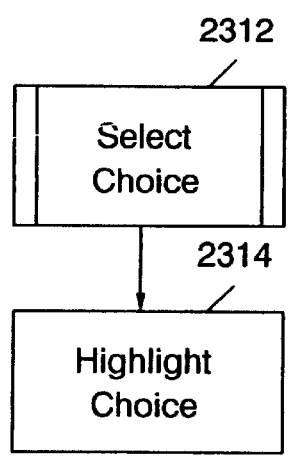
Figure 23D:
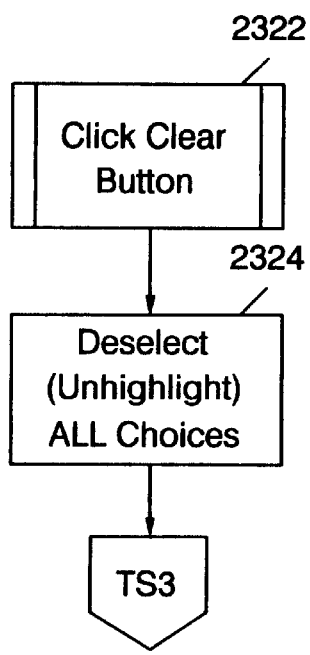
Figure 23E:
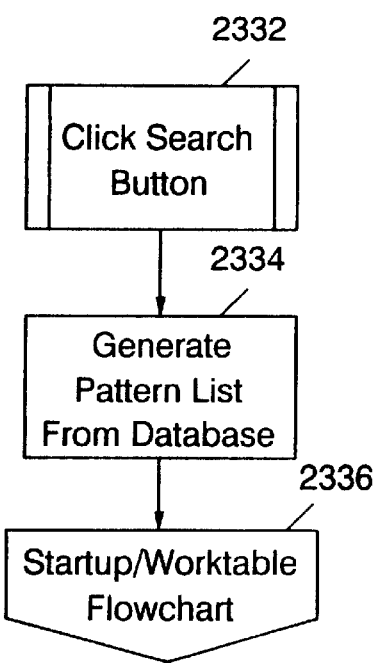

The designer inputs for the text search of FIG. 22 are illustrated in FIGS. 23A–23E. As illustrated in FIG. 23A, when the designer selects a product type 502 at Block 2302, the product type is highlighted at Block 2304. In FIG. 23B, when the designer selects a product category 1804 at Block 2306, the category is highlighted at Block 2308. In FIG. 23C, when the designer selects a choice 1806 at Block 2312, the choice is highlighted at Block 2314. In FIG. 23D, when the designer clicks the clear button 1902 of FIG. 19, at Block 2322, all choices are deselected at Block 2324. Finally, in FIG. 23E, when the designer clicks the search button 1904 of FIG. 19 at Block 2332, a pattern list is generated from the database at Block 2334 and the initial worktable flowchart of FIG. 20 may be invoked at Block 2336.

Figure 24A:
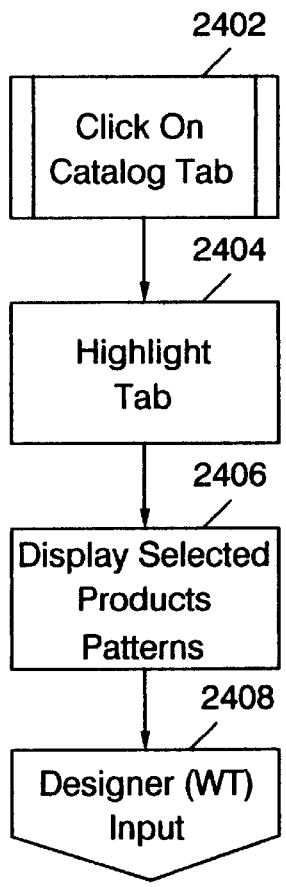
FIGS. 24A–24E are flowcharts of operations that are performed in response to designer inputs for tabs and buttons on a worktable, according to an embodiment of the present invention.
Figure 24B:
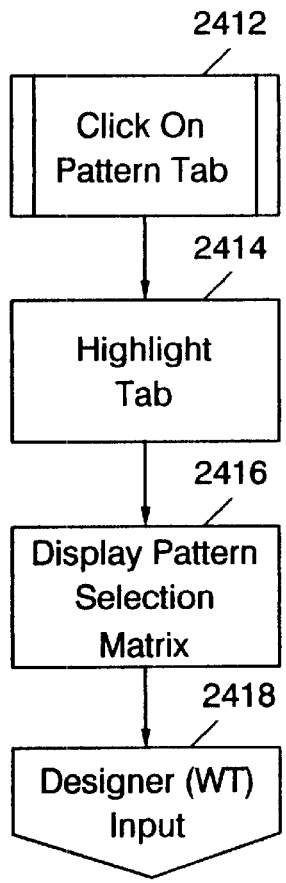
Figure 24C:
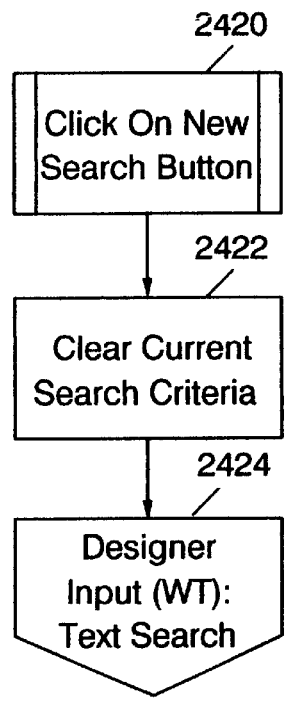
Figure 24D:
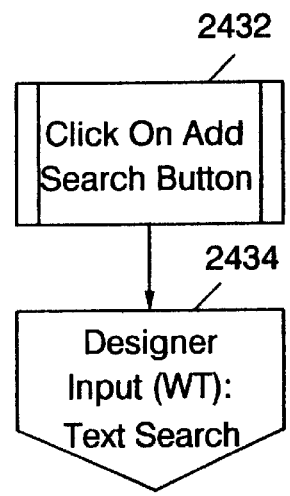

Referring now to FIGS. 24A–24E, operations for various designer inputs on the worktable screen (FIG. 5) now will be described. As shown in FIG. 24A, when a catalog tab 502 is selected at Block 2402, the tab is highlighted at Block 2404, and the selected product patterns 324 are displayed at Block 2406. Processing then waits for additional designer worktable input at Block 2408. As shown in FIG. 24B, when a pattern tab 322 is selected, the tab is highlighted at Block 2414 and the pattern selection matrix is displayed at Block 2416. Processing then waits for additional designer worktable input at Block 2418. At FIG. 24C, when the new search button 504b is selected at Block 2420, the current search criteria is cleared and operations then wait for designer input for a text search (FIG. 22). Similarly, at FIG. 24D, when the add search button (504a) of FIG. 5 is selected at Block 2432, then operations continue with designer worktable input of FIG. 22.

Figure 24E:
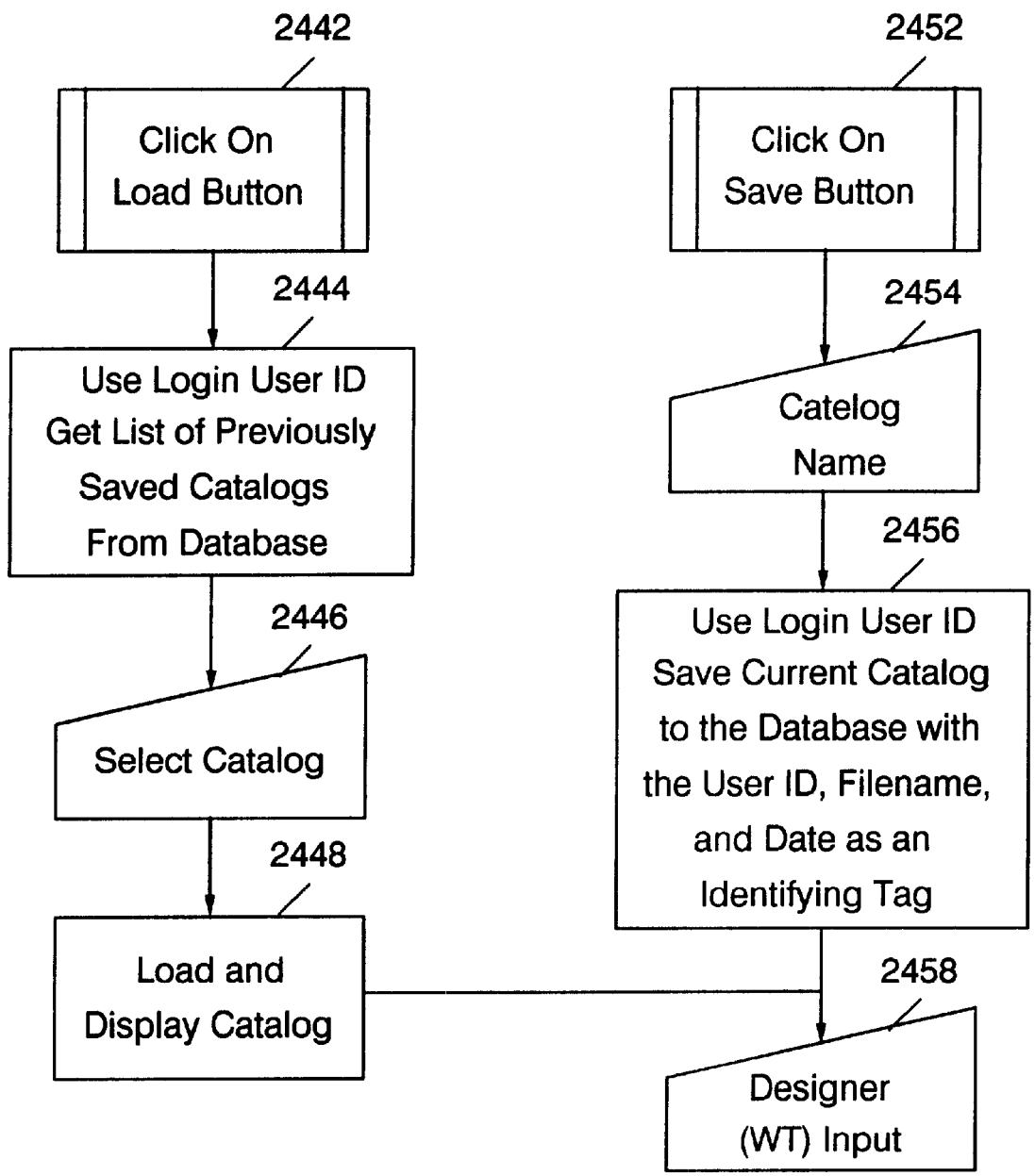

In FIG. 24E, when the designer clicks on the load button 1106, at Block 2442, the login user ID is used to get a list of previously saved catalogs from the Web site 12 at Block 2444. User input is accepted to select the catalog at Block 2446, and the catalog is loaded and displayed at Block 2448. Finally, when the save button 1102 is selected at Block 2452 and the catalog name is input at Block 2454, the login user ID is used to save the current catalog to the database 16 with the user ID, file name and date as an identifying tag at Block 2456. Operations then wait for additional designer worktable input at Block 2458.

Figure 25:
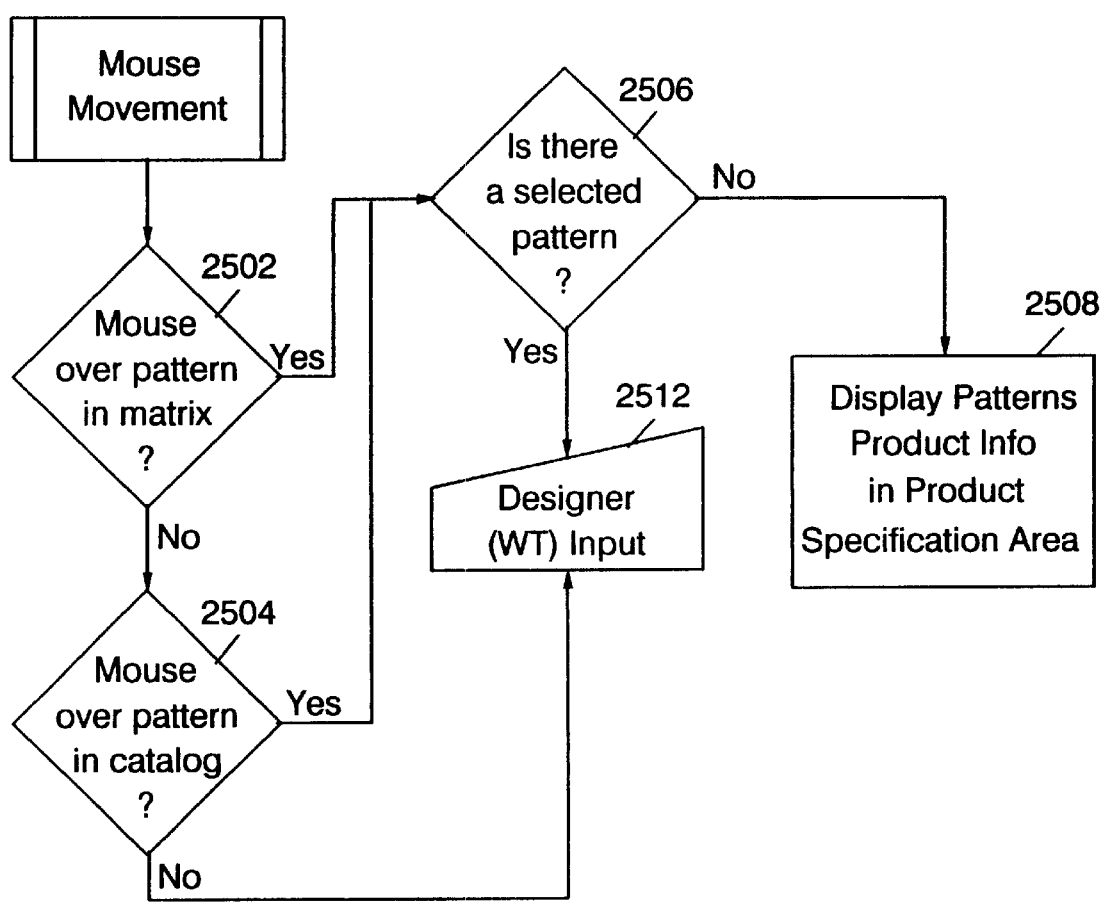
FIG. 25 is a flowchart of operations that are performed in response to designer mouse movement on a worktable according to an embodiment of the present invention.

FIG. 25 illustrates detailed operations for designer mouse movement on the worktable of FIG. 5. As shown in FIG. 25, if the mouse pointer is over a pattern in the matrix 322 (Block 2502) or the right mouse button is clicked, then a determination is made at Block 2506 as to whether there is a selected pattern. If not, then at Block 2508, the pattern's product information is displayed in the product specification area 328. If yes, operations wait for additional designer worktable input at Block 2512. Alternatively, if the mouse pointer is not over the pattern in the matrix at Block 2502, then a test is made at Block 2504 as to whether the mouse pointer is over a pattern in the catalog 324. If not, operations wait at Block 2512 for additional designer worktable input, and if yes, operations continue at Block 2506 as described above.

Figure 26:
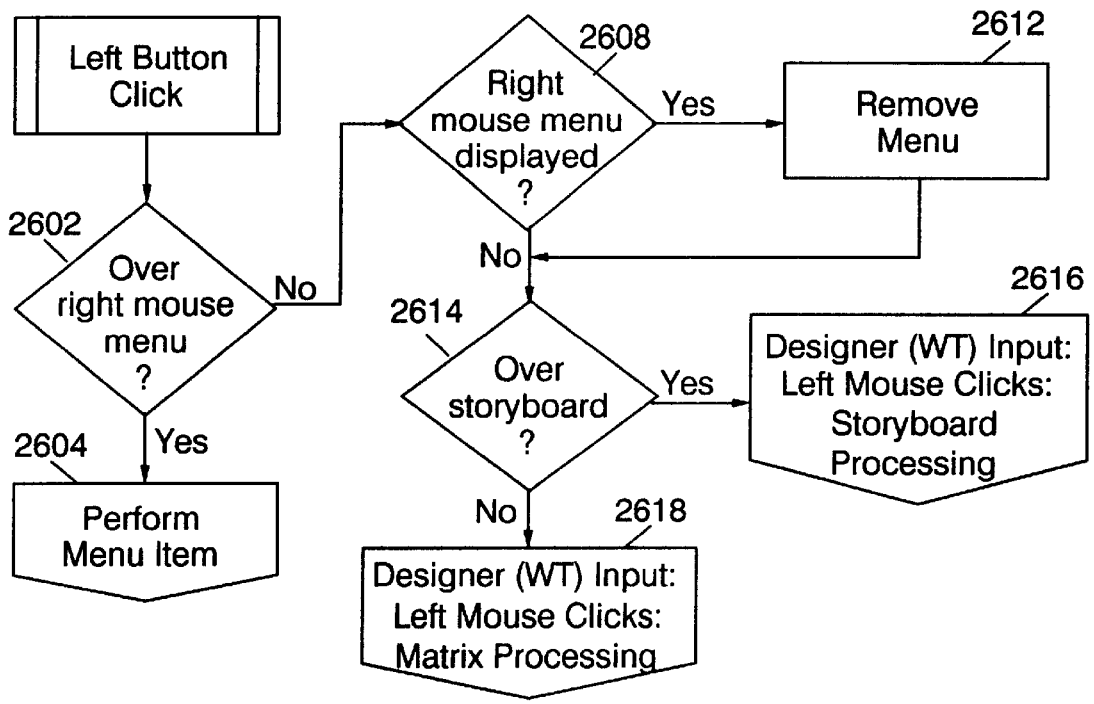
FIGS. 26 and 27 are flowcharts of operations performed in response to designer left mouse clicks that are not on tabs or buttons on a worktable according to an embodiment of the present invention.

FIG. 26 describes detailed operations for designer left mouse button clicks when on the worktable 320. As shown in FIG. 26, if the mouse pointer is over the right mouse menu (Block 2602), then the menu item is performed at Block 2604. If not, and the right mouse menu is displayed at Block 2608, then the menu item is removed at Block 2612. If not, and the mouse pointer is over the storyboard at Block 2614, then operations wait for designer worktable input at Block 2616. In particular, left mouse clicks can begin storyboard processing. If the mouse pointer is not over the storyboard, then operations wait for designer input at Block 2618, where left mouse clicks can indicate matrix processing.

Figure 27:
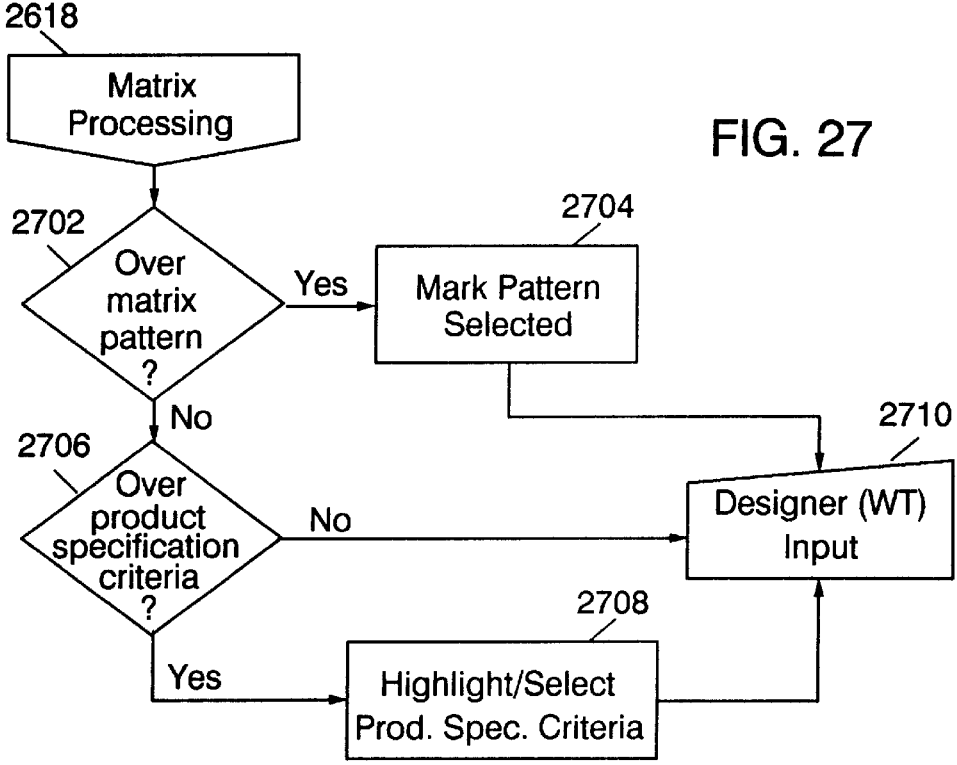

Matrix processing 2618 of FIG. 26 is described in FIG. 27. As shown, if the mouse pointer is over the matrix pattern at Block 2702, and the matrix pattern is selected by left click at Block 2704, then designer worktable input is accepted at Block 2710. If the mouse pointer is not over the matrix pattern at Block 2702, but is over the product specification window at Block 2706, then the selected product specification criteria is highlighted at Block 2708 and operations wait for additional designer worktable input at Block 2710.

Figure 28:
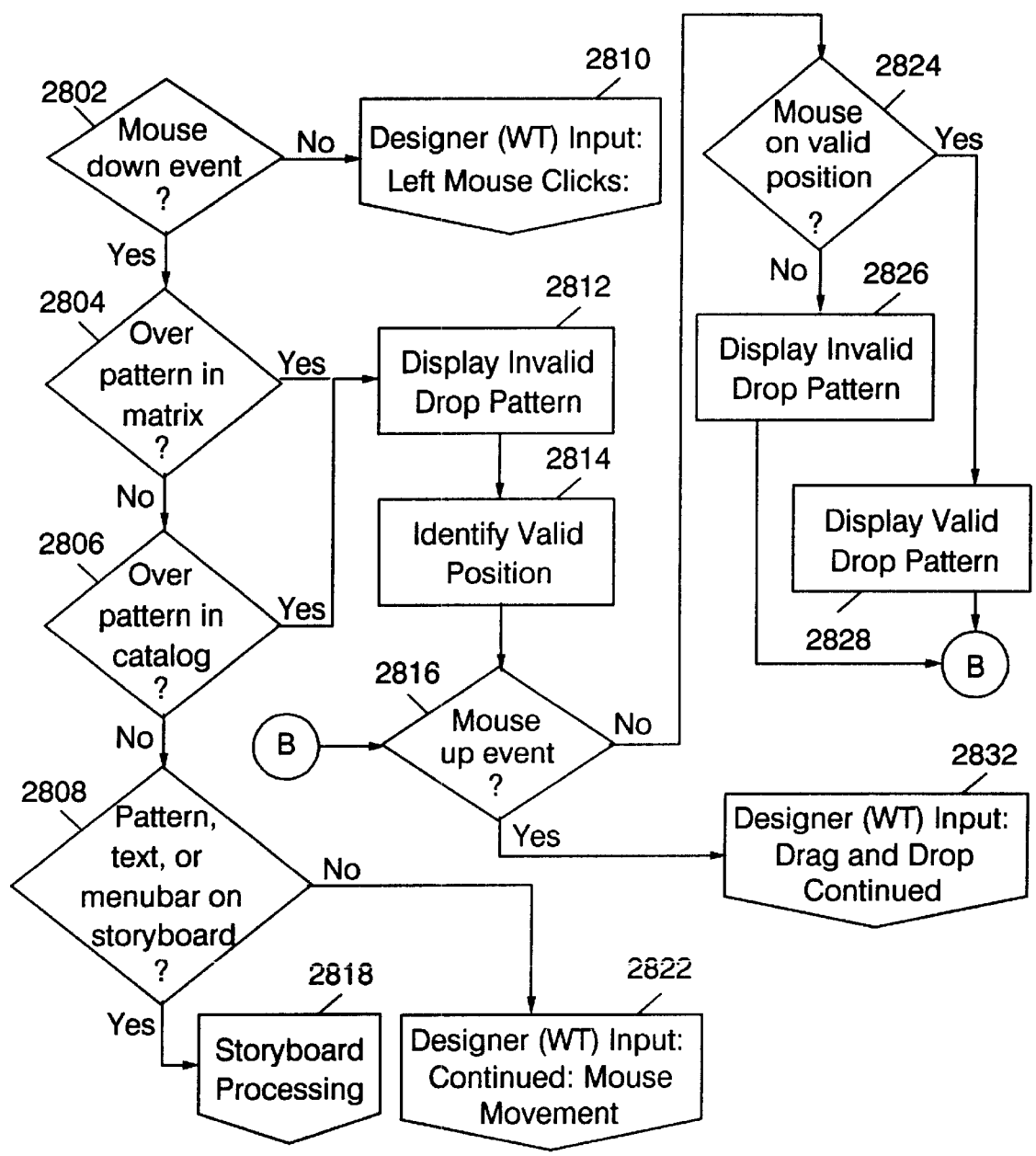
FIGS. 28 and 29 are flowcharts of operations performed in response to designer drag and drop inputs on a worktable according to an embodiment of the present invention.

Referring now to FIG. 28, drag and drop operations that are performed when the worktable of FIG. 5 is displayed, now will be described. As shown in FIG. 28, when a mouse down event does not occur at Block 2802, operations wait for designer worktable input of left mouse clicks of FIG. 26 or 27 at Block 2810. When a mouse down event does occur at Block 2802, a test is made as to whether the mouse pointer is over a pattern in the matrix 322 (Block 2804) or over a pattern in the catalog 324 (Block 2806) or whether the mouse pointer is on the pattern, text or menu bar of the storyboard 326 at Block 2808. If the mouse pointer is over the pattern in the matrix at Block 2804, then an invalid drop pattern warning is displayed at Block 2812 and a valid position is identified at Block 2814. Operations then wait for a mouse up event at Block 2816. Similar processing may occur when the mouse pointer is over the pattern in the catalog at Block 2806.

If the mouse pointer is over the pattern, text or menu bar on the storyboard at Block 2808, then storyboard processing is performed as will be described below. If the mouse pointer is not on a pattern, text or menu bar on the storyboard at Block 2808, then operations continue at Block 2822 for designer worktable input for mouse movement (FIG. 25). On occurrence of a mouse up event at Block 2816, operations continue at Block 2832 for drag and drop of FIG. 29. Finally, if the mouse pointer is on a valid position at Block 2824, then a valid drop pattern is displayed at Block 2828. If not, an invalid drop pattern is displayed at Block 2826.

Figure 29:
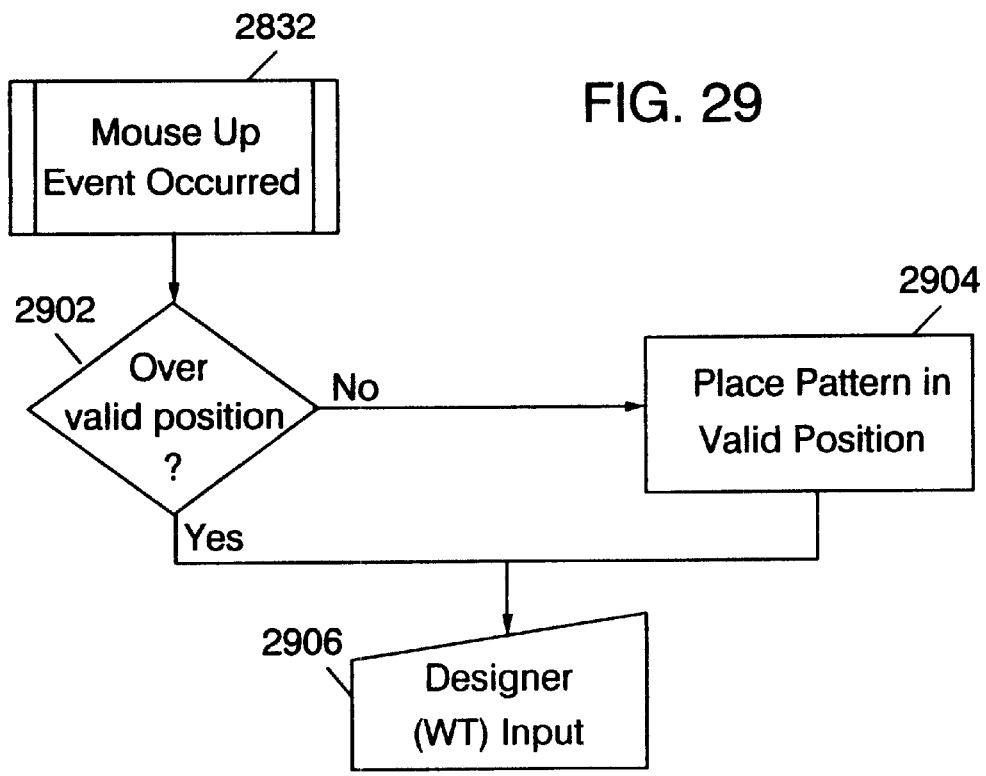

Referring now to FIG. 29, when a mouse up event occurs (Block 2832 of FIG. 28), then a test is made at Block 2902 as to whether the mouse pointer is over a valid position. If not, then the pattern is placed in the valid position at Block 2904. If yes, then user input is obtained at Block 2906.

Figure 30:
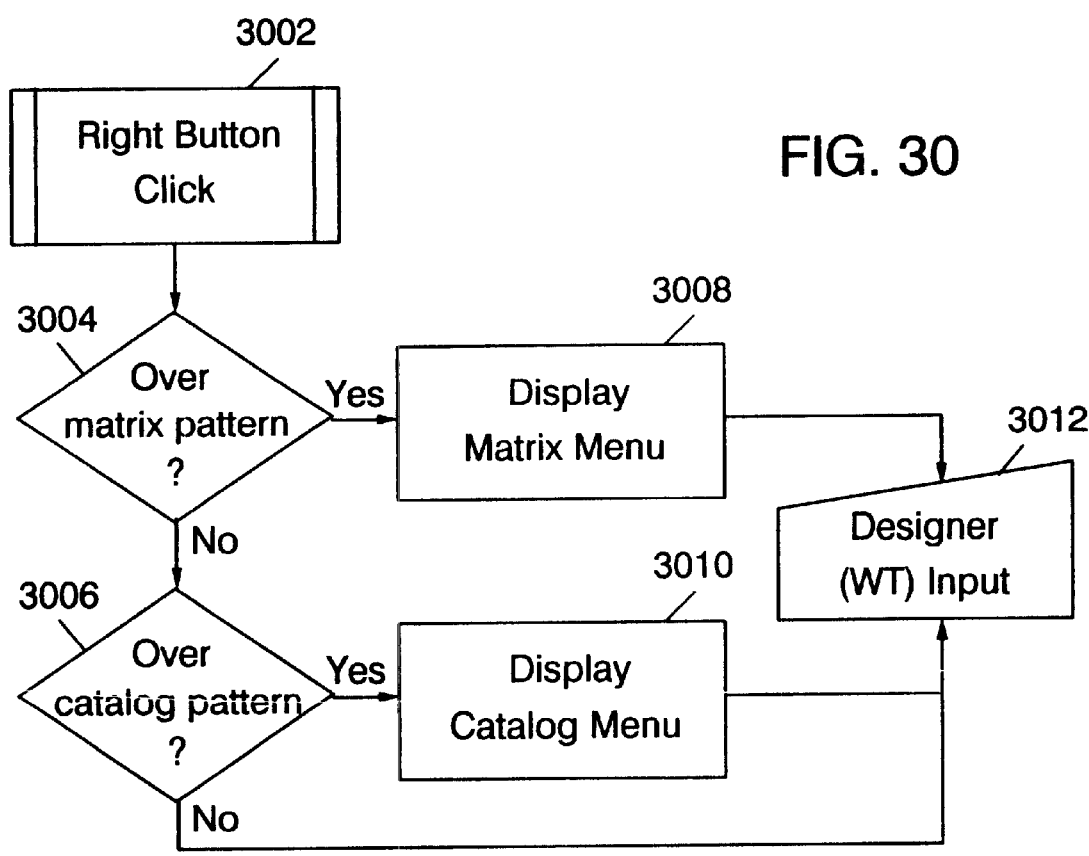
FIG. 30 is a flowchart of operations that are performed in response to a right mouse click by a designer on a worktable according to an embodiment of the present invention.

Referring now to FIG. 30, operations for processing designer worktable inputs when the right mouse button is clicked and the mouse pointer is not on tabs or buttons, will be described. As shown in FIG. 30, upon a right button click at Block 3002, a test is made as to whether the mouse pointer is over the matrix pattern 322 (Block 3004) or over the catalog pattern 324 (Block 3006). If over the matrix pattern, then the matrix menu is displayed at Block 3008. If over the catalog pattern (Block 3006), then the catalog menu is displayed at Block 3010. Operations then wait for additional designer worktable input at Block 3012.

Figure 31:
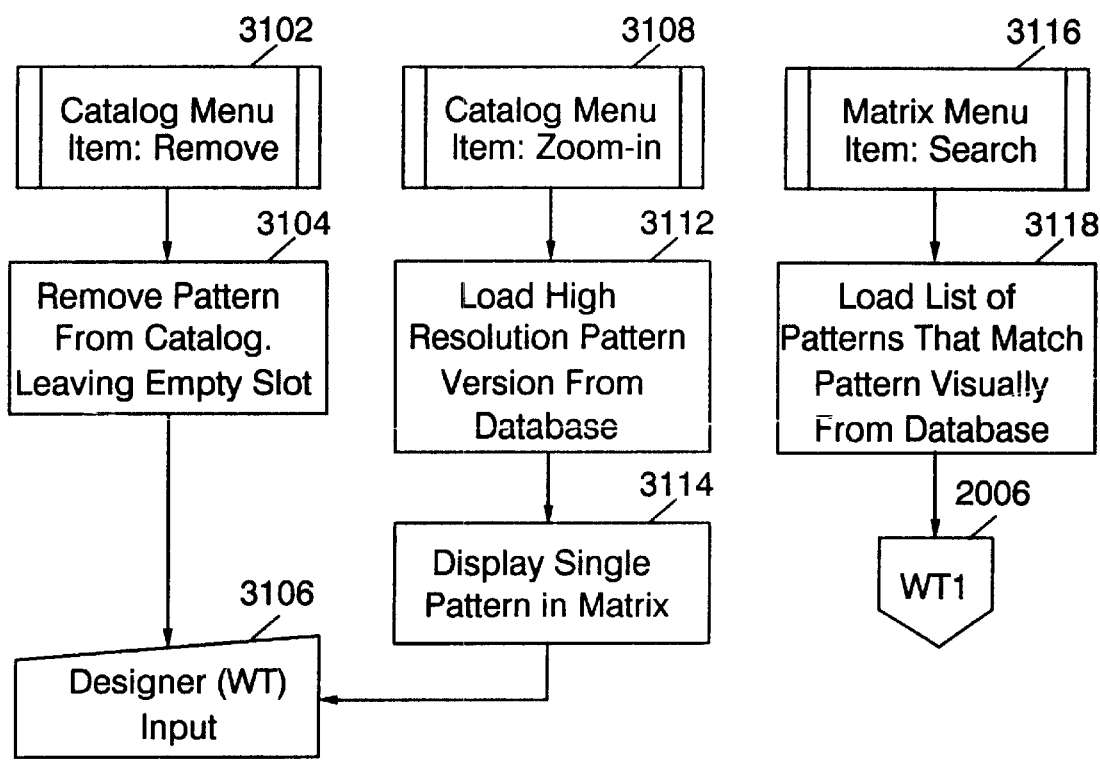
FIG. 31 is a flowchart of operations that are performed in response to designer input selection on a worktable of a menu item according to an embodiment of the present invention.

FIG. 31 describes operations for the worktable screen 320, to perform menu items. In particular, when the remove item 1302 of FIG. 13A is selected at Block 3102, the pattern is removed from the catalog 324, leaving an empty slot, at Block 3104, and designer worktable input is awaited at Block 3106. When the zoom-in menu 802 of FIG. 8 is selected at Block 3108, the high resolution pattern version is loaded from the database at Block 3112 and the single pattern is displayed in the matrix 322 at Block 3114. When a search menu item 804 of FIG. 8 is selected at Block 3116, then a list of patterns that visually match the selected pattern is loaded from the database 16 at Block 3118. Additional operations then continue at Block 2006 of FIG. 20.

Figure 33:
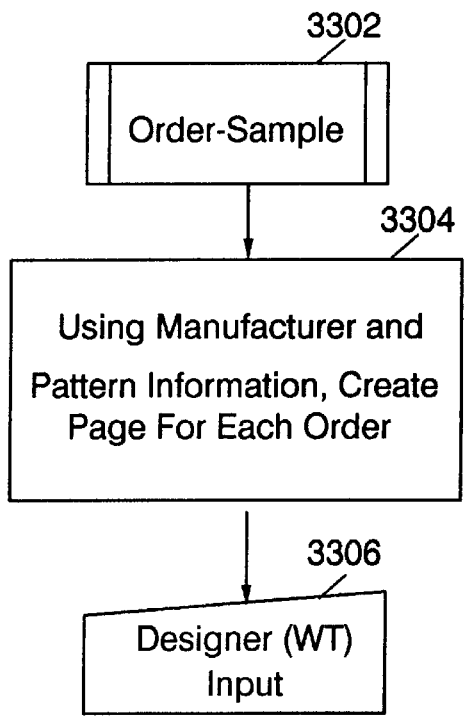
Figure 34:
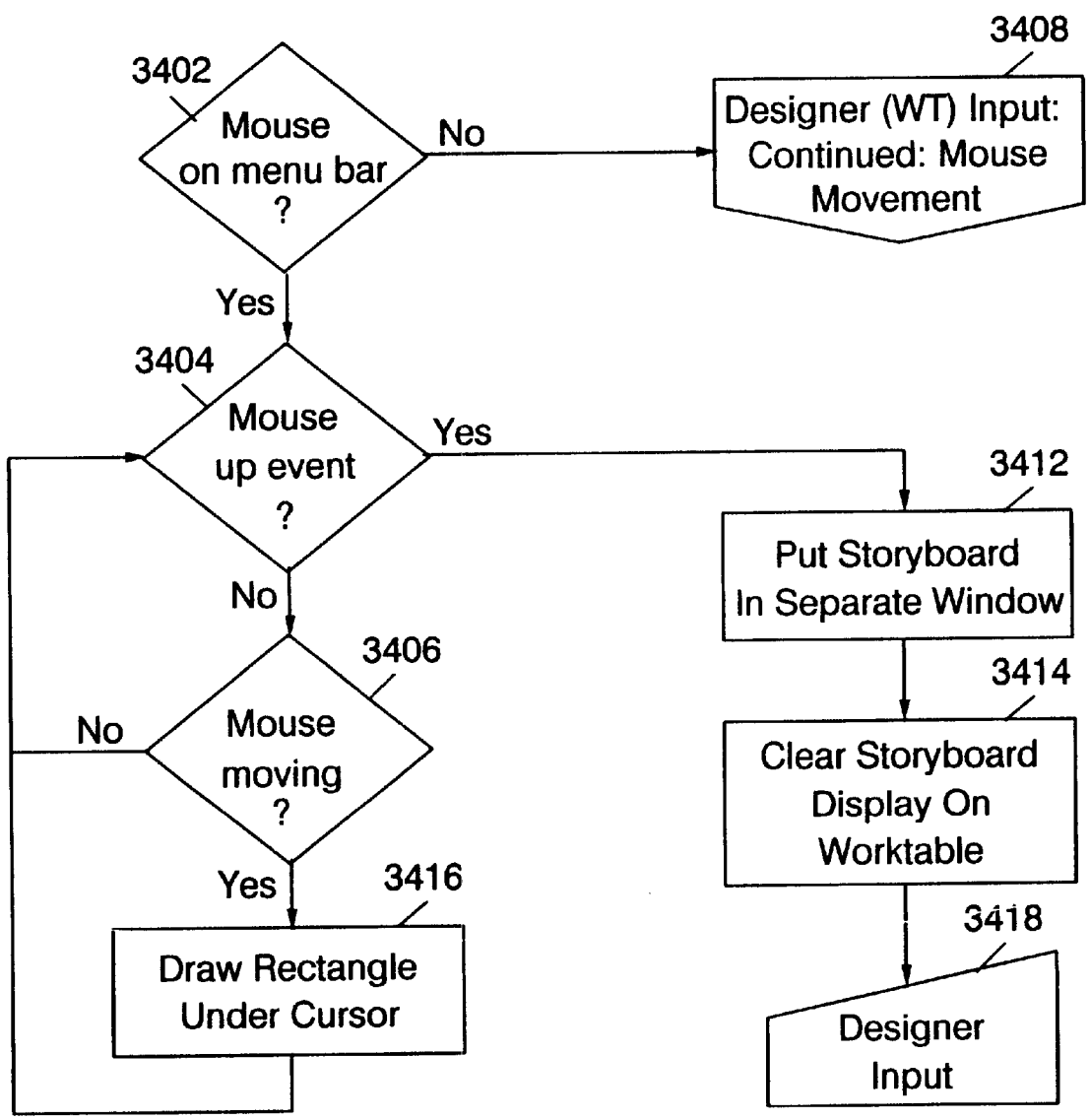
FIG. 34 is a flowchart of operations in response to designer drag and drop inputs for storyboard processing according to an embodiment of the present invention.

Referring to FIGS. 32–34, operations for processing designer inputs when on the storyboard screen 326 of FIG. 15, now will be described. As can be seen from FIG. 15, the storyboard screen includes a menu bar 1520 with three options: File, Edit and Order. As shown in FIG. 32, when File is accessed and an Open option is selected at Block 3202, the login user ID is used to get a list of previously saved stored storyboards from the database 16 at Block 3204. Then, referring to Block 3206, user input is obtained to select the desired storyboard, and at Block 3208, the desired storyboard is loaded and displayed. Operations then wait for additional designer worktable input at Block 3212.

When the File Close option is selected at Block 3214, then the current state of the storyboard is saved to the database 16 and the display is cleared at Block 3216. Additional input then is awaited at Block 3212. When the File Save option is selected at Block 3212, a test is made as to whether the storyboard already is saved at Block 3224. If not, then a storyboard name is obtained from the user at Block 3226, and then at Block 3228, the patterns, text and positions are passed to the database server 15. The current state of the storyboard then is saved to the database 16 at Block 3232.

Figure 47:
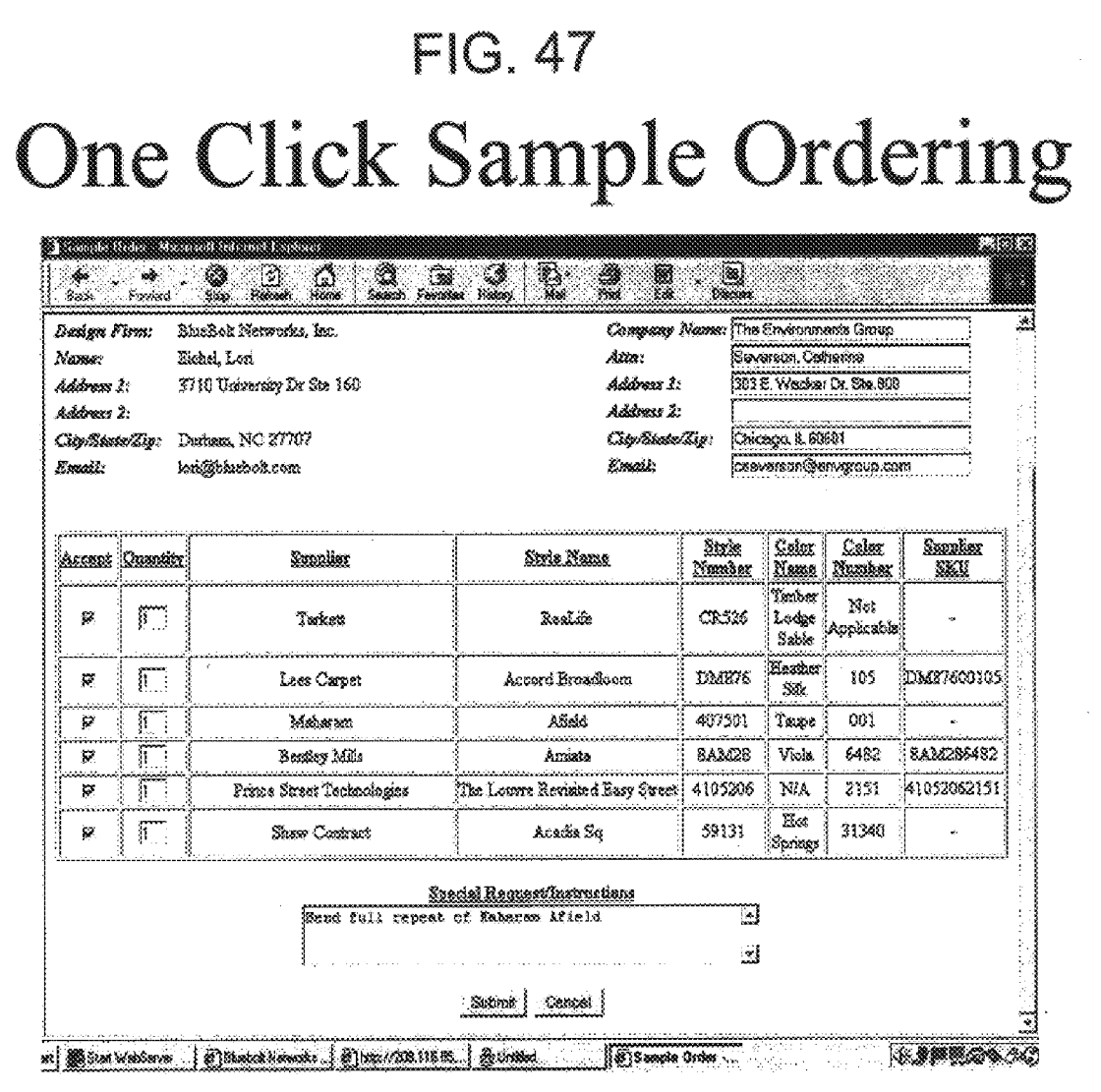

FIG. 33 illustrates operations when the Order option is selected (Block 3302) from the menu bar 1520 of the storyboard 326 of FIG. 15. As shown at Block 3304, using the manufacturer and pattern information, a page may be created for each order and a sample may thereby be ordered. See, for example, FIG. 47. Additional designer input then is awaited at Block 3306, for example, to submit or cancel the order form.

Finally, referring to FIG. 34, drag and drop processing while on the storyboard 326 of FIG. 15 now will be described. In order to perform drag and drop processing, tests are made as to whether the mouse pointer is on the menu bar 1520 of the storyboard (Block 3402), whether a mouse up event has occurred (Block 3404), and whether the mouse pointer is moving (Block 3406). If the mouse pointer is not on the menu bar 1520 at Block 3402, then operations continue for designer worktable input for mouse pointer movement at Block 3408, corresponding to FIG. 25. If a mouse up event has occurred at Block 3404, then the storyboard is placed in a separate window at Block 3412, as shown in FIG. 16. The storyboard display on the worktable then also is cleared at Block 3414, as also shown in FIG. 16. This window then may be resized as shown in FIG. 17. Operations then wait for designer input at Block 3418. Accordingly, the storyboard may be separated from the worktable and enlarged using the operations of FIG. 34.

Other Embodiments

Other embodiments of the present invention now will be described. These embodiments may have been described, at least in part, in the General Description, Intermediate Level Description and/or Detailed Implementation above, and/or may be additional embodiments of the present invention that were not described above.

1. Data Mining

Figure 35:
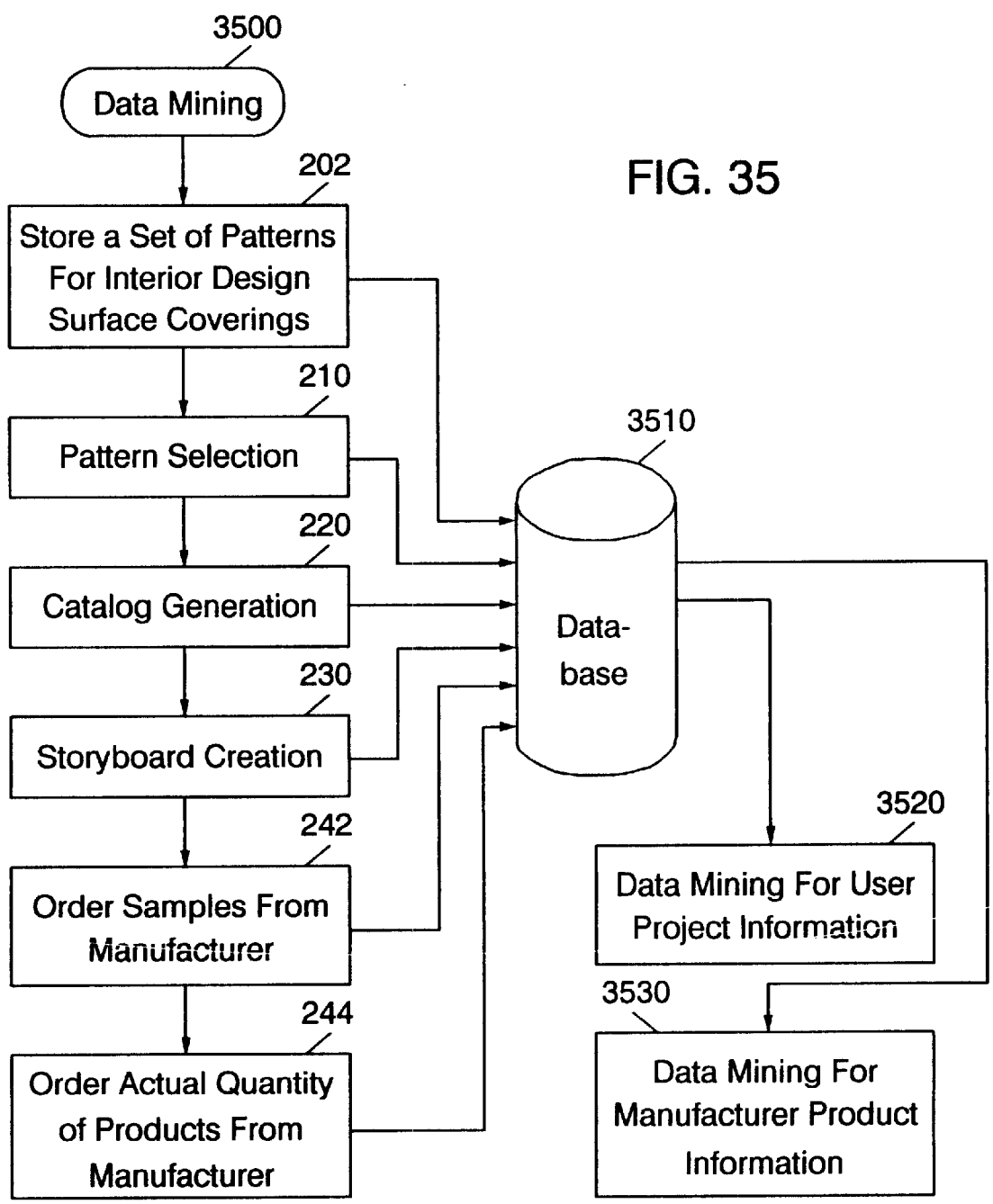
FIG. 35 is a flowchart of data mining according to embodiments of the present invention.

Referring now to FIG. 35, data mining according to embodiments of the present invention now will be described. As was described above in connection with FIG. 2, embodiments of the present invention can include storing a set of patterns for interior design surface coverings (Block 202), pattern selection (Block 210), catalog generation (Block 220), storyboard creation (Block 230), ordering samples from the manufacturer (Block 242) and/or ordering of actual quantities of products from the manufacturer (Block 244). As shown in FIG. 35, data related to any or all of the above may be stored in a database 3510. The database 3510 then may be mined for user information at Block 3520 and/or may be mined for manufacturer information at Block 3530.

More specifically, as a result of the use of systems, methods and/or computer program products according to embodiments of the invention, by many designers (users) and/or many manufacturers (suppliers) of interior design surface coverings, a great deal of information may be captured in a database 3510, and then mined by both the designer community (Block 3520) and the supplier community (Block 3530) in a manner that may not have been heretofore possible. Thus, new information may be generated that can be of value to users and suppliers. Accordingly, systems, methods and/or computer program products according to embodiments of the invention may provide an interactive hub for the interior design surface covering industry, to allow the industry to collect data from both suppliers and designers, and in turn track the association of products and projects in a comprehensive manner.

Figure 36:
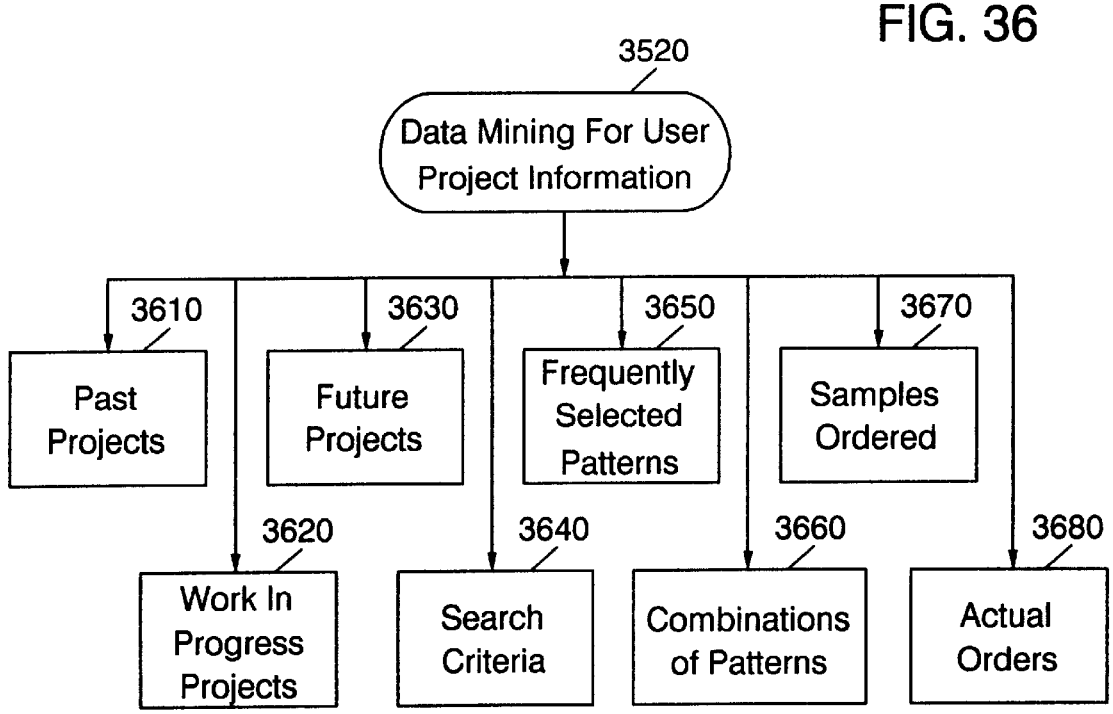
FIG. 36 is a flowchart of data mining for user project information according to an embodiment of the present invention.

Referring now to FIG. 36, designers (users) can archive their projects digitally, versus a traditional process of manually storing books of information for long time periods. By mining the data in the database 3510, information concerning past projects of the user (Block 3610), work in progress (present projects) (Block 3620) and future projects (Block 3630), may be obtained. Moreover, projects may be stored based on a project name, number and/or other identifier, so that usage may be determined on a per-project basis, for timekeeping and/or client billing purposes. An ability also may be provided to cross-reference categories of different projects by the same design firm as well as to cross-reference product groups by attribute (such as color) from various suppliers.

Still referring to FIG. 36, the search criteria may be mined at Block 3640 to indicate, for example, what search criteria have been used by a designer in the past and what products were obtained as a result of these search criteria. Moreover, at Block 3650, patterns that were frequently selected into catalogs may be archived and searched to indicate what the designer ultimately selected from the many choices during a search, for past projects, and may be used to help a designer make choices as to present and/or future projects. Also, at Block 3660, combinations of patterns that are used in storyboards may be archived and mined to indicate what combinations of patterns have been used successfully in the past, are being used in the present and/or may be used in the future. Email activity may be monitored, for example to ascertain which storyboards have been emailed, which samples have been ordered (Block 3670) and/or actual quantities of materials that have been ordered (Block 3680).

Figure 37:
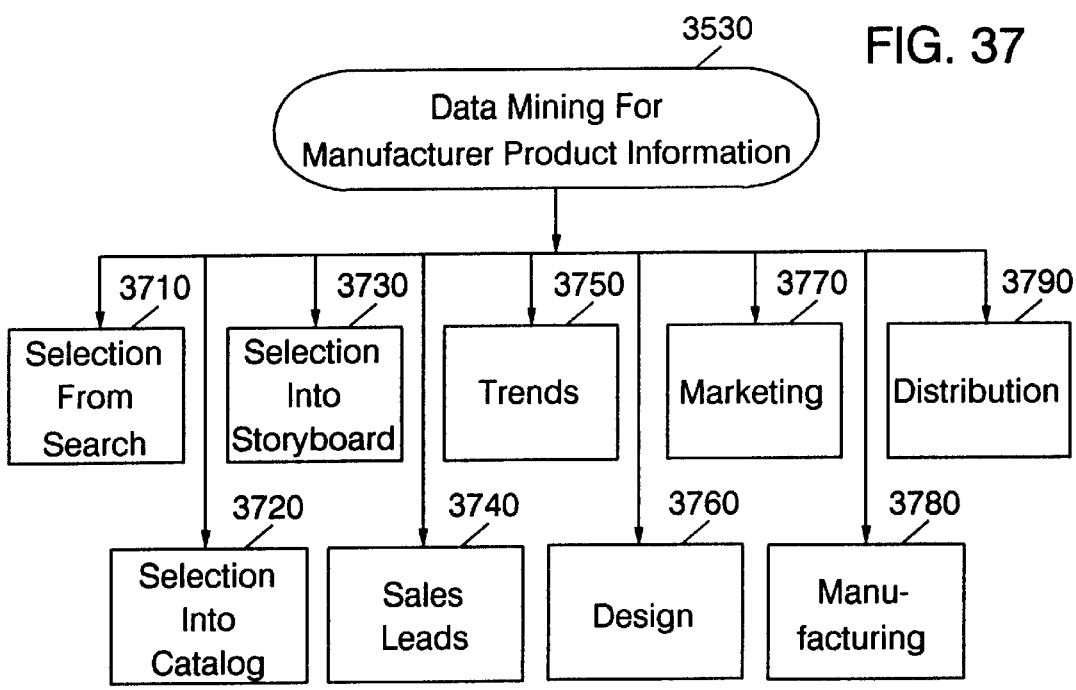
FIG. 37 is a flowchart of data mining for manufacturer product information according to an embodiment of the present invention.

Moreover, by capturing and mining the data that was described in connection with FIG. 35, manufacturers may be provided with information that may have been unavailable heretofore. FIG. 37 describes aspects of data mining for manufacturer information (Block 3530). In particular, information related to products, product categories and/or attributes of a manufacturer of the interior design surface treatments that are selected in response to user search criteria (Block 3710), selected into user catalogs (Block 3720) and/or selected into storyboards (Block 3730) may be obtained. These selections may be used as an indicator of where the market is trending. This information may provide sales leads to the manufacturer at Block 3740 and also can provide geographic trend data, Internet and extranet tools and/or corporate standards for manufacturers based on past and/or anticipated uses.

Other trends may be predicted at Block 3750. For example, usage data and product preferences, including where products are used, by whom and for what type of applications may be predicted. Installation preferences, such as glued direct to floor, over pad, free lay, double stick, area rug, etc. may be determined. Environmental trends also may be determined by determining whether the designers incorporated certain criteria in their selection, such as MSDS sheets, materials that can be recycled, natural materials, manufacturers who are ISO14000 compliant, etc.

At Block 3760, the data mining of Block 3530 may influence design activity by the manufacturer, such that future products may be designed based on trends that are seen in the data that is in the database 3510. At Block 3770, market research also may be obtained by determining, for example, color and pattern trends, preferences, usage data, customer satisfaction or responses to product launches. Manufacturing also may be triggered at Block 3780 to meet anticipated demand based on the actual orders, the searches, catalogs and/or storyboards which are being generated. Sample activity also may be used to determine manufacturing, and may be used to influence such items as lead time decisions and custom products. Raw materials also may be ordered and/or new raw materials may be designed based on fiber preference data and/or environmental feedback. Finally, at Block 3790, the distribution chain also may be impacted by the data mining, for example by determining installation types and punch lists that may be needed based on user selections, by generating and/or modifying product catalogs and information and/or by providing virtual three-dimensional environments based on storyboard selections.

From the standpoint of the user (designer) (FIG. 36), data mining can provide usage data and product preferences, dynamically searchable catalogs, virtual sample boards and product collaboration, and/or sample ordering and fulfillment. From the manufacturer (supplier) standpoint (FIG. 37), product samples and specification information may be generated, and increased customer reach and market intelligence may be obtained. An online catalog also may be provided. Thus, suppliers can gain real-time knowledge of what product characteristics are important to the design community. Color, style, scale, geographic preference, raw material preference, product characteristics, usability, installation preference, sales leads, customer satisfaction, lead time sensitivity, sample activity, custom trends, environment issues, corporate standards and in-use activity may be obtained. This knowledge can provide manufacturers with an opportunity to fine-tune their supply chain from raw resources to end use and back again. Moreover, suppliers can review their products prior to release, by image and/or specification data, make changes and/or comments prior to release.

Data mining operations have been described above in connection with Blocks 202, 210, 220, 230, 242 and 244 of FIGS. 2 and 35. However, it will be understood that a database 3510 may be created independent of some or all of these blocks and may be mined for user project information and/or manufacturer product information, as was described at Block 3520 and 3530, respectively, regardless of the source of the data. Thus, data mining may be applied to the interior design industry to obtain knowledge that may have been unavailable heretofore, independent of storyboard creation by designers.

2. Standardized Patterns and Attributes

Figure 38:
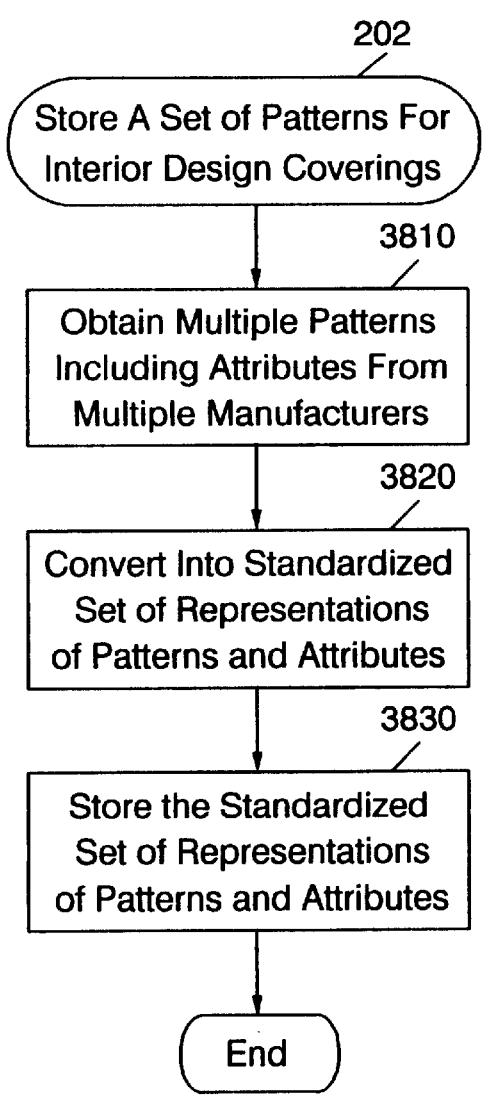
FIG. 38 is a flowchart of storing a set of patterns for interior design coverings according to an embodiment of the present invention.

Referring now to FIG. 38, additional embodiments of storing a set of patterns for interior design coverings (Block 202 of FIG. 2) now will be described. In general, embodiments of the present invention can allow a standardized set of representations of patterns and attributes to be generated and stored for a plurality of patterns from a plurality of manufacturers.

Heretofore, in order to compare products from different manufacturers or suppliers, a user such as a designer might compare a small swatch of the product that might be held in an architectural binder, folder or case of small samples. The user might also compare the accompanying specification data that might be printed on the back of the binder, folder or case. Alternatively, online catalogs from various manufacturers or suppliers might be compared, wherein the online catalogs contain images of products and accompanying specification data.

Due to space limitations and/or marketing decisions, the specification data often is a small subset of the complete data related to the product. Moreover, the attributes in the specification data, the values the attributes can take and/or the relative positioning of the attributes in the specification, generally may vary from manufacturer to manufacturer. Thus, each manufacturer may lay out the specification page in a unique fashion.

For example, one manufacturer may place the style name and number at the top, whereas another manufacturer may place the same identification information at the bottom. In another example, one manufacturer may call the way the product is made "construction", while another may call it "finishing". One manufacturer may refer to a type of pile of loop as "surface texture", whereas another may refer to a "pile type". One manufacturer may refer to "flammability tests", while another may refer to "ASTM test results". Accordingly, the specification data for comparison can take an inordinate amount of time to collect. Moreover, even after the specifications are collected, the comparison may be difficult because the same attributes may be placed in different locations on the document and/or using different nomenclature for the same attribute.

Similar problems may be encountered when comparing physical samples of materials. In particular, the small sample swatches may not adequately reflect the scale of the interior design surface covering, so that the entire pattern and/or repeat may not be visible. These problems also may be encountered when viewing online catalogs. Additional problems may be created in viewing online catalogs from different manufacturers, because the images may be captured under different lighting and/or scaling conditions, and/or different color correction processes may be applied.

In sharp contrast, according to embodiments of the present invention, multiple patterns including attributes are obtained from multiple manufacturers at Block 3810. At Block 3820, the multiple patterns and multiple attributes from multiple manufacturers are converted into a standardized set of representations of patterns and attributes. Then, at Block 3830, the standardized set of representations of patterns and attributes are stored.

Figure 39:
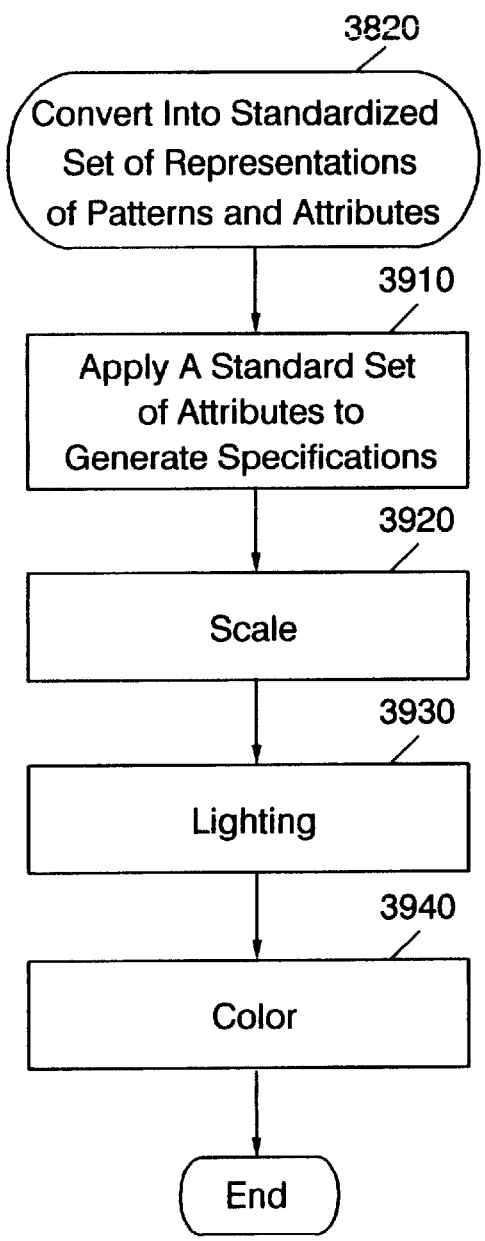
FIG. 39 is a flowchart of converting into a standardized set of representations of patterns and attributes according to an embodiment of the present invention.

FIG. 39 provides details of converting the multiple patterns and attributes into a standardized set of representations of patterns and attributes (Block 3820 of FIG. 38). Referring to Block 3910, a standard set of attributes is used to generate specifications. In particular, a master attribute list may be used that standardizes the language and layout of the specification data in a consistent manner. Since this data may be standardized across multiple product categories, a user (designer) can either search based on specification data or search for a product and obtain the accompanying specification data. Desired information may be found in one convenient location and in one consistent format across multiple product categories and/or manufacturers. A user therefore need not spend hours on the telephone tracking down the specification data from a supplier or need to have file cabinets full of specification data.

Table 2 illustrates an example of one set of standardized attributes that may be used at Block 3910, according to embodiments of the present invention. In Table 2, the terms "BBN" and "BB" have been used to indicate those attributes that are not provided in specification data from suppliers but can be provided as a value-added service by trained interior designers employed by operators of systems, methods and/or computer program products according to embodiments of the invention. The term "R" indicates required fields and the term "O" indicates optional fields.

| Printed On Product Spec | Field/Label Name | Description | Example | Searchable | Supplier Provides | Product Group | Carpet (CAR) | Textile Upholstery (TU) | Textile Wall-covering (TW) | Vinyl Wall-covering (VW) | Vinyl Floor-covering (VF) | Laminate (LAM) | Laminated Wood (LWF) | Drapery (DF) | Vinyl Uphol-stery (VU) |
|---|---|---|---|---|---|---|---|---|---|---|---|---|---|---|---|
| Y | BlueBolt ID | Unique Identifier automatically assigned by BBN Application | | | N | All | BB | BB | BB | BB | BB | BB | BB | BB | BB |
|   | Filename | Name of the corresponding image file (without the .jpg extension) | LC1ABC12345.1 | | N | All | BB | BB | BB | BB | BB | BB | BB | BB | BB |
| Y | Supplier | Official name of company who would receive sample request | Lees Carpet | 10 | Y | All | R | R | R | R | R | R | R | R | R |
|   | Supplier ID | Unique Identifier assigned by BlueBolt | LC1 | | N | All | BB | BB | BB | BB | BB | BB | BB | BB | BB |
|   | Product Type | Primary product type. Unique identifier assigned by BlueBolt | CAR | | N | All | BB | BB | BB | BB | BB | BB | BB | BB | BB |
|   | Application | Secondary product type. Specify one or more similar to the Product Type choices. | Bedding Fabric, Carpet, Ceramic Tile | | Y | All | R | R | R | R | R | R | R | R | R |
|   | End Use | Specify industry to use product. Specify one or more attributes similar to the examples provided | Education, Healthcare - Institutional, Hospitality, Corporate, Residential, Retail, Transportation | 140 | Y | All | O | O | O | O | O | O | O | O | O |
|   | Supplier SKU # | Product SKU (Stock Keeping Units) as defined by the Brand for the primary database entry (referred to elsewhere as Default) | ABC12345 | | Y | All | O | O | O | O | O | O | O | O | O |
| Y | BBN SKU# | Product SKU as defined by the concatenation of Style # and Colorway # for the Default product entry | ABC12345 | | N | All | BB | BB | BB | BB | BB | BB | BB | BB | BB |
| Y | Style # | Style Number or Product Number | D1136 | | Y | All | R | R | R | R | R | R | R | R | R |
| Y | Style Name | Style Name | Rivera | | Y | All | O | O | O | O | O | O | O | O | O |
| Y | Colorway # | Colorway # | 101 | | Y | All | O | O | O | O | O | O | O | O | O |
| Y | Colorway Name | Colorway Name | Ocean | | Y | All | O | O | O | O | O | O | O | O | O |
|   | Overall Style | Design characteristics. Specify one or more attributes similar to the examples provided | Solid, Texture, Small Pattern, Medium Pattern, Large Pattern | | N | All | BB | BB | BB | BB | BB | BB | BB | BB | BB |
|   | Pattern Style | Pattern characteristics. Specify one or more | Abstract, Check, Conversational, Floral, | | N | All | O | O | O | O | O | O | O | O | O |

-continued

| Printed On Product Spec | Field/Label Name | Description | Example | Search-able | Supplier Provides | Product Group | Carpet (CAR) | Textile Uphol-stery (TU) | Textile Wall-covering (TW) | Vinyl Wall-covering (VW) | Vinyl Floor-covering (VF) | Laminate (LAM) | Laminated Wood (LWF) | Drapery (DF) | Vinyl Uphol-stery (VU) |
|---|---|---|---|---|---|---|---|---|---|---|---|---|---|---|---|
| | | attributes similar to the examples provided | Geometric, Plaid, Regional, Stripe, Wavy Stripe | | | | | | | | | | | | |
| | Period Style | Period to which style is associated. Specify one or more attributes similar to the examples provided | Contemporary, Traditional, Transitional, African Influence, Art Deco | | N | All | BB | BB | BB | BB | BB | BB | BB | BB | BB |
| | Motifs - Design Types | BBN Checklist- Cataloged by designer | | 100 | N | All | O | O | O | O | O | O | O | O | O |
| | Patterns - Shapes | BBN Checklist- Cataloged by designer | | 110 | N | All | O | O | O | O | O | O | O | O | O |
| | Dominant Color | BBN Checklist- Cataloged by designer | | 70 | N | All | BB | BB | BB | BB | BB | BB | BB | BB | BB |
| | Accent Color | BBN Checklist- Cataloged by designer | | 80 | N | All | O | O | O | O | O | O | O | O | O |
| | Primary Material | BBN Checklist- Cataloged by designer | | 90 | N | All | BB | BB | BB | BB | BB | BB | BB | BB | BB |
| | Pattern Repeat Scale | BBN - derives data from Repeat field | | 120 | N | All | BB | BB | BB | BB | BB | BB | BB | BB | BB |
| Y | Repeat | Interval of space from beginning to end of pattern Must have an entry or N/A | 18½ in W × 25½ in L. (47 cm × 64.8 cm) | | Y | All | R | R | R | R | R | R | R | R | R |
| | Pattern Layout | Configuration of pattern BBN Checklist | Directional, Non-directional, Allover, Spaced, X-Large Repeat | | N | All | BB | BB | BB | BB | BB | BB | BB | BB | BB |
| Y | Construction - Finishing | Technique used to produce or finish product. BBN Checklist | Carpet Fusion-Bonded, Tufted, Woven Textile/ Wallcovg' Damask, Jacquard, Woven Laminate-Vinyl-Wcovg', Embossed, Gloss, Matte, Textured, Laminated Plank | | Y | All | R | R | R | R | R | R | R | R | R |
| Y | Surface Texture | Pile Type and texture patterning | Textured Loop | 200 | Y | Floors | R | | | | | | | | |
| Y | Dye Method | Process used to dye product. Specify one or more of the examples provided. | Yarn Dyed Uphol-stery Tex-tiles, Walls | 210 | Y | Floors, | O | O | O | | | | | O | O |
| | Collection | Group of related styles | | | Y | All | O | O | O | O | O | O | O | O | O |
| | Designer | Designer of Product | | | Y | All | O | O | O | O | O | O | O | O | O |
| Y | Exact Content | Fiber content or chemical composition and proprietary technology of yarns | 90% Eco Solution Q Nylon/ 10% Yarn Dyed BCF Nylon | | | All | R | R | R | R | R | R | R | R | R |

-continued

| Printed On Product Spec | Field/Label Name | Description | Example | Search-able | Supplier Provides | Product Group | Carpet (CAR) | Textile Uphol-stery (TU) | Textile Wall-covering (TW) | Vinyl Wall-covering (VW) | Vinyl Floor-covering (VF) | Laminate (LAM) | Laminated Wood (LWF) | Drapery (DF) | Vinyl Uphol-stery (VU) |
|---|---|---|---|---|---|---|---|---|---|---|---|---|---|---|---|
| | Package Size | Normal size unit that product is packaged in for shipment | Not Available | | Y | Floors, Upholstery, Textiles, Walls | O | O | O | O | O | O | O | O | O |
| Y | Width | Size across Standard default width. | 12 ft-3 in (3.73 m) | 160 | Y | All | R | R | R | R | R | R | R | R | R |
| Y | Alternate Width | Face product can also be ordered in width other than standard- Provide alternate SKU #'s* | 18 in × 18 in (45.7 cm × 45.7 cm) | 170 | Y | Floors | O | | | | | | | | |
| Y | Field33 Floor Format | Form of the primary database entry. Provide SKU #'s* | Broadloom | 180 | Y | Floors | R | | | | R | | R | | |
| Y | Alt. Floor Format | Alternate form from the primary data-base entry. Provide alternate SKU #'s* | Tile | 190 | Y | Floors | O | | | | | | O | | |
| Y | Face Weight | Weight of pile face | 28 oz/sq yd | 220 | Y | Floors | R | | | | | | | | |
| Y | Alt. Face Weight | Other weights available | 30 oz/sq yd, 42 oz sq/yd | 230 | Y | Floors | O | | | | | | | | |
| Y | Total Weight | Weight of entire product - face to backing | 79.40 oz sq/yd (2692.45 gm), 6 ft roll-336 lb/12 ft roll-483 lb | | Y | Floors, Textiles, Upholstery, Walls | O | O | O | O | O | O | O | O | O |
| Y | Pile Height-Thickness | Height of pile or thickness of tile | .187 avg in, 0.999 in, ⅛ in | | Y | Floors, Surfaces | R | | | | | O | O | | |
| Y | Gauge | Tufted carpet term for number of stitches across the width of carpet per inch | 5/64 in | | Y | Floors | R | | | | | | | | |
| Y | Stitches Per Inch/Rows | SPI - Tufted carpet. Number of yarn tufts per running inch in a single row. Row - for woven carpet | 9.6 per in (37.80/10 cm) | | Y | Floors | R | | | | | | | | |
| Y | Primary Backing | Material to which surface yarns are tufted through | Woven polypropylene | | Y | Floors | O | | | | | | | | |
| Y | Secondary Backing | Material laminated to primary backing. Standard backing default. | ActionBac, Unitary, Thermobond, Fiberglass, Recycled, Moisture Proof, Integrated Pad | | Y | Floors | R | | | | | | | | |
| Y | Alternate Backing | Other combined (broad-loom & tile) secondary | ActionBac, Unitary, Thermobond, Moisture Proof, | | Y | Floors | O | | | | | | | | |

-continued

| Printed On Product Spec | Field/Label Name | Description | Example | Search-able | Supplier Provides | Product Group | Carpet (CAR) | Textile Uphol-stery (TU) | Textile Wall-covering (TW) | Vinyl Wall-covering (VW) | Vinyl Floor-covering (VF) | Laminate (LAM) | Laminated Wood (LWF) | Drapery (DF) | Vinyl Uphol-stery (VU) |
|---|---|---|---|---|---|---|---|---|---|---|---|---|---|---|---|
| | Field45 | backings available. Provide SKU #* if different from default backing product | Recycled, Padded, Fiber-glass Reinforced, Recycled | | | | | | | | | | | | |
| | Field46 | | | | | | | | | | | | | | |
| Y | Match Type | Pattern matching alignment | Full drop, Half drop, Straight | | Y | Floors, Tex-tiles, Uphol-stery, Walls | O | O | O | O | O | O | O | O | O |
| Y | Treatment - Coating | Applied to surface or backing to enhance performance | Antimicrobial, Teflon treated, Scotchguard, Acrylic backing, Fire Retardant, Moisture Proof | | | Floors, Tex-tiles Uphol-stery, Walls | O | O | O | O | O | O | O | O | O |
| Y | Flammability | ASTME Test results include: Radiant Panel Test and Pill Test | Meets NFPA Class 1/ Tested Under ASTM-648 Glue Down | | | Floors, Tex-tiles, Uphol-stery, Walls | R | R | R | R | R | O | R | R | R |
| Y | Smoke Density Test | Test results | Dm corrected < 450 (ASTM-E662) | | Y | Floors, Walls | R | R | R | R | R | R | R | R | R |
| Y | Static Test | 3.0 kv when tested under the Standard Shuffle Test, 70 deg F., 20% RH | (AATCC-134) less than 3 KV | | Y | Floors | R | | | | | | | | |
| Y | Abrasion | Standard for fabric wear - Wyzenbeck Test | 30000 Double Rubs | | Y | Uphol-stery, Walls | | R | O | | | | | O? | R |
| Y | Cleaning Code | Proper method for cleaning | WS, S, Machine Washable | | Y | Tex-tiles, Uphol-stery, Walls | | R | | | | | | R | |
| Y | Colorfastness | Test results | Meets ACT Requirements | | Y | Floors, Tex-tiles, Uphol-stery, Walls | O | R | R | | | | | R | R |

-continued

| Printed On Product Spec | Field/Label Name | Description | Example | Searchable | Supplier Provides | Product Group | Carpet (CAR) | Textile Upholstery (TU) | Textile Wallcovering (TW) | Vinyl Wallcovering (VW) | Vinyl Floorcovering (VF) | Laminate (LAM) | Laminated Wood (LWF) | Drapery (DF) | Vinyl Upholstery (VU) |
|---|---|---|---|---|---|---|---|---|---|---|---|---|---|---|---|
| Y | Lightfastness | Retention of color when exposed to light | Meets ACT Requirements | | Y | Tex-tiles, Uphol-stery, Walls | O | R | R | | | | | R | R |
| Y | Washable Temperature | Temperature for washing that does not affect properties of product | 150 degrees Fahrenheit | | Y | Tex-tiles, Walls | | O | | | | | | O | O |
| Y | Physical Properties | Special Characteristics | Meets ACT Requirements | | Y | Uphol-stery, Walls | | O | O | | | | | O | O |
| Y | Custom Colors Available | Can be ordered in a unique color specified by designer not already offered in standard colorways. | Y or N | | Y | Floors, Tex-tiles, Uphol-stery, Walls | O | O | O | | | | | O | O |
| Y | Shown Railroaded | Digital image is shown crosswise | Y or N | | Y | Uphol-stery | | O | | O | | | | O | O |
| Y | Reversible | Face or back can be used | Y or N | | Y | Tex-tiles, Uphol-stery | | O | | O | | | | O | O |
| Y | Alternate Base Material | Alternate cloth or ground paper available on request | 100% Cotton Polyester | | Y | Tex-tiles, Walls | | O | O | O | | | | O | O |
| Y | Correlate Patterns | Other matching patterns | ColorWorks ™ | | Y | Floors, Tex-tiles, Uphol-stery, Walls | O | O | O | O | O | | | O | O |
| Y | Minimum Order | Yardage minimum (if applicable) | ½ yd | | Y | All | O | O | O | O | O | O | O | O | O |
| Y | Lead Time | Time required to produce the product | 2 weeks | | Y | All | O | O | O | O | O | O | O | O | O |
| Y (Only if Net Price not available.) | Price Range | BBN defines for specific Web searches, in $5 increments Must have an entry or 'Not Available' | $10–15, $16–20, $21–25, $26–30, $31–35, $36–40, $41–45, $46–50, $2.50–$3.50/sq ft for a non-covered installation, Not Available | | Y | All | | | | | | | | | |
| Y | Net Price | Wholesale cost | $44/linear yd | | Y | All | O | O | O | O | O | O | O | O | O |

| Printed On Product Spec | Field/Label Name | Description | Example | Searchable | Supplier Provides | Product Group | Carpet (CAR) | Textile Upholstery (TU) | Textile Wallcovering (TW) | Vinyl Wallcovering (VW) | Vinyl Floorcovering (VF) | Laminate (LAM) | Laminated Wood (LWF) | Drapery (DF) | Vinyl Upholstery (VU) |
|---|---|---|---|---|---|---|---|---|---|---|---|---|---|---|---|
| Y | Warranty | Manufacturer warranty described in detail | See Specific Warranty Category, 10 year commercial limited warranty, 15 year pro-rated | | | All | R | R | R | R | R | R | R | R | R |
| | Backing Warranty | Specific warranty info described in detail | Please inquire about product warranties for specific backing options. | | | Floors | O | | | | | | | O | O |
| | Wear Warranty | Specific warranty info described in detail | Lifetime of Carpet/Not to Exceed 10% Face Yarn Loss by Weight in Normal Use | | | Floors | O | | | | O | | O | | |
| | Static Warranty | Specific warranty info described in detail | Lifetime of Carpet | | Y | Floors | O | | | | | | | | |
| | Edge Ravel Warranty | Specific warranty info described in detail | Lifetime of Carpet/Guaranteed No Edge Ravel/Normal Use | | | Floors | O | | | | | | | | |
| | Delamination Warranty | Specific warranty info described in detail | Lifetime of Carpet/Guaranteed No Delamination in Normal Use | | | Floors | O | | | | | | O | | |
| | Tuft Bind Warranty | Specific warranty info described in detail | Y or N, <specific text> | | Y | Floors | O | | | | | | | | |
| Y | Ends per inch | Number of workthread per inch | 110 cpi | 260 | Y | Textiles, Uphlstry | | O | O | | | | | | |
| Y | Picks per inch | Number of filling threads per inch | 30 ppi | | Y | Textiles, Uphlstry | | O | O | | | | | | |
| Y | Parent Company | Company which owns the subsidiary (which functions as a separate company) | Interface is the Parent Co. for Bentley (orders go to Bentley) | | N | All | O | O | O | O | O | O | O | O | O |
| Y | Status | Current status of product | Available, New, Discontinued, Pending Discontinuation, Temporarily Unavailable | | Y | All | R | R | R | R | R | R | R | R | R |
| Y | Status Date | Date supplier data was updated (format = dd-mon-yy) | 08-Aug-00 | | N | All | BB | BB | BB | BB | BB | BB | BB | BB | BB |
| | Image Source | BBN or brand created image? | BBN or S | | N | All | BB | BB | BB | BB | BB | BB | BB | BB | BB |
| | Sample Size | Size of sample that was photographed | 17½ in × 17½ in | | N | All | BB | BB | BB | BB | BB | BB | BB | BB | BB |
| Y | Sample Quantity | Maximum sample pieces allowed by brand | 5 | | Y | All | O | O | O | O | O | O | O | O | O |
| | Checked Against Sample | ThumbsUp record image was checked with actual sample for color | Yes, No | | N | All | BB | BB | BB | BB | BB | BB | BB | BB | BB |

-continued

| Printed On Product Spec | Field/Label Name | Description | Example | Searchable | Supplier Provides | Product Group | Carpet (CAR) | Textile Uphol-stery (TU) | Textile Wall-covering (TW) | Vinyl Wall-covering (VW) | Vinyl Floor-covering (VF) | Laminate (LAM) | Laminated Wood (LWF) | Drapery (DF) | Vinyl Uphol-stery (VU) |
|---|---|---|---|---|---|---|---|---|---|---|---|---|---|---|---|
| | Green Product | Sustainable design features that make the product environmentally friendly | Made from natural raw materials, Raw material easily renewable, Recycled content, offgas?; Maintenance, Manufacturing | | | All | O | O | O | O | O | O | O | O | O |
| | Installation Guidelines | Instructions for installation of product | Full spread method using Vinyl Bond Adhesive/Use approved cap strip Quarter turn placement. | | | All | O | O | O | O | O | O | O | O | O |
| | Product Advantages | Special features that separate this product from others | Exclusive Reduced Maintenance System (RMS) | | | All | O | O | O | O | O | O | O | O | O |
| | Scale Photo | Room photo showing product used in a room scene, usually with furniture | TYF12345 Eminent (File-name, Assoc Style Name) | | | All | O | O | O | O | O | O | O | O | O |
| | Change Date | Date of last change or update of information originating in BBN (format = dd-mon-yy) | 30-Oct-00 | | N | All | BB | BB | BB | BB | BB | BB | BB | BB | BB |
| Y | International | Product available to other countries | Y or N | 270 | Y | All | O | O | O | O | O | O | O | O | O |
| Y | Quick Ship | Available in stock for quick delivery | Y or N | | Y | TU, TW, VW | | O | O | O | | | | | |
| Y | Pitch | Woven carpet term for number of stitches within 27 inches across the width Rel to gauge is 27:1 (1/10 gauge = 216 pitch) | 270 (for 1/10 gauge) 216 (for 1/8 gauge) | | Y | Floors | O | | | | | | | | |
| | Enlarged View Shown Draped | BBN Checklist:image whose "f" version has been photographed using a draped fabric | Yes, No | N | N | | | O | | | | | | BB/O | BB/O |
| | Field92 | BLANK | | | | | | | | | | | | | |
| | Field93 | BLANK | | | | | | | | | | | | | |
| | Field94 | BLANK | | | | | | | | | | | | | |
| | Field95 | BLANK | | | | | | | | | | | | | |
| | Field96 | BLANK | | | | | | | | | | | | | |
| | Field97 | BLANK | | | | | | | | | | | | | |
| | Field98 | BLANK | | | | | | | | | | | | | |
| | Field99 | BLANK | | | | | | | | | | | | | |

Accordingly, a user (designer) can search and display the images and specification in a consistent manner on-screen, and then can create an archive of the data by printing the product specifications. Product specifications that may be generated by applying the operations of Block 3910 can include a thumbnail view of the product and all the specification data about that product. An example of a product specification is shown in FIG. 40.

Since there may be confusion within the design industry regarding technical and design terms that are used, systems, methods and/or computer program products according to embodiments of the present invention also may include a glossary of industry terms. The glossary may be compiled and approved by experts and may be updated.

Referring again to FIG. 39, standardizing the patterns according to embodiments of the present invention now will be described. Standardizing the patterns may include scaling the plurality of patterns to a common scale (Block 3920), capturing images of the plurality of patterns under common lighting (Block 3930) and color correcting the plurality of patterns (Block 3940). Each of these operations now will be described in detail.

Referring to Block 3920, scaling the plurality of patterns to a common scale according to embodiments of the invention now will be described. Heretofore, designers might only be able to compare real product samples with each other. If a designer reviewed a supplier's online catalog, the designer may only see that supplier's products. It may be difficult to access another supplier's website and compare products to those on the first web site.

In sharp contrast, embodiments of the invention can provide a central location where a designer can compare multiple suppliers' products side-by-side in a consistent manner. When comparing various products of various suppliers, they can be displayed in comparable scale. Thus, if one product has a repeat of 56 inches and another product has a repeat of 2 inches, the views that are seen can show sections that are comparable in terms of scale, so that the user can have the sense that when they view the first sample, they are seeing a section of the whole 56 inch repeat, whereas in the second sample, they are seeing many repeats of the 2 inch repeat. Another view can allow the designer to see a shrunken full repeat view of the first sample's 56 inch repeat. Thus, the designer can obtain a real sense of proportion of one product to another.

If scaling operations of Block 3920 were not performed, digital images that are provided by each supplier generally may be inconsistent with one another, because each supplier may photograph from different distances. In contrast, scaling operations at Block 3920 can create digital images that are consistent with one another. One image can show the full repeat in a large, print quality image, whereas a second view can show the scaled views for comparison. A third view can show the full image thumbnail for quick review. Moreover, when capturing the images, all samples in the collection may be captured in the same orientation or direction for consistency. Finally, if a sample is obtained from a supplier that does not include a full repeat, a second sample may be obtained that does show the full repeat.

Operations for capturing images of the plurality of patterns under common lighting (Block 3930 of FIG. 39), according to embodiments of the invention, now will be described. Heretofore, when comparing images on various suppliers' websites, varying light conditions may have been used so that inconsistent results may be obtained within a single website and from one website to another. It will be understood that the type of lighting used to photograph, color correct and view the samples can impact the appearance of the image when viewed. In sharp contrast, embodiments of the present invention can capture images of a plurality of patterns from a plurality of manufacturers of interior design surface treatments under common lighting. For example, a standardized lighting process for 6500 K daylight may be used during image capturing. Thus, all samples may be shown as if viewed under one consistent light source. Users also may be allowed to calibrate their monitors in order to view the images under the same lighting conditions or in the lighting condition of their choice. Since the input and output for lighting may be standardized, consistent images across multiple product types and suppliers may be obtained.

During image capture, two images may be obtained for reflective textiles. One sample may be imaged flat. A second sample may be imaged that is draped on a form, to allow the reflectivity of the textile to be seen.

Finally, color correcting the plurality of patterns (Block 3940 of FIG. 39) according to embodiments of the invention, now will be described. Color management software and/or processes may be used to allow the color of the sample to be replicated on the user's monitor and to reflect an accurate color rendition of the original physical sample. The color output may be provided in an industry-recognized standard for color. This standard for color input and output may be used across all products and suppliers, so that color accuracy and consistency may be obtained. In one embodiment, images may be altered using Adobe® Photoshop® and the RGB 1998 Color Space. Color corrections may be made by comparing the actual sample to a color-calibrated monitor, using a 6500 K light box to view the sample.

The operations of FIGS. 38 and 39 have been described above in connection with systems, methods and computer program products according to embodiments of the invention that include pattern selection (Block 210), catalog generation (Block 220) and/or storyboard creation (Block 230). However, it will be understood by those having skill in the art that, according to embodiments of the invention, standardization of patterns and attributes may be used to create standardized databases of representations of a plurality of patterns and attributes from a plurality of manufacturers, independent of pattern selection, catalog generation and/or storyboard creation according to embodiments of the present invention. The creation of standardized databases of multiple patterns and attributes from multiple manufacturers may be used independently of the selection of patterns, creation of catalogs and/or creation of storyboards by designers. For example, converting operations of Block 3820 may be used by manufacturers to obtain standardized representations of fabrics and attributes in their online product catalogs. The converting may be performed by a third party or by the manufacturer.

3. Additional Storyboard Embodiments

Referring now to FIG. 41, additional operations that may be performed during and/or after storyboard creation (Block 230 of FIG. 2), according to embodiments of the present invention, now will be described. At Block 4110, one or more of the images of the storyboard may be resized. In particular, when a user combines patterns to generate a storyboard at Block 202 of FIG. 2, the image may be displayed as a small thumbnail. The user then can pull the image as if expanding the image in a conventional windowing operation, and a larger view may be displayed until an entire 8"×8" to-scale image is shown. Accordingly, an image can be displayed on the storyboard and resized without distorting the image.

Resizing without distortion may be accomplished, according to embodiments of the invention, by a obtaining a large image, rather than the thumbnail, from the stored set of patterns for interior design surface coverings (Block 202), and only displaying a small portion of this image on the storyboard at Block 234. The portion may be taken from the center of the image. The size of the portion that is displayed may be increased or decreased in the vertical and/or horizontal direction, to obtain a size that is desired for display on the storyboard. Notwithstanding the increase and/or decrease in the vertical and/or horizontal direction, distortion may not occur because the scale of the pattern being displayed need not change.

Figure 42A:
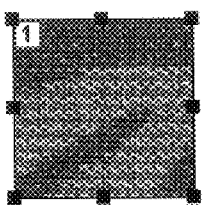
FIGS. 42A–42C illustrate an example of a thumbnail image, an image that has been increased in the vertical and horizontal directions, and a large image that may be obtained from a database, according to an embodiment of the present invention.
Figure 42B:
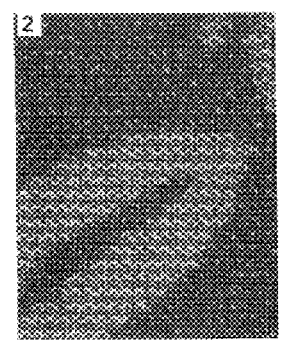
Figure 42C:
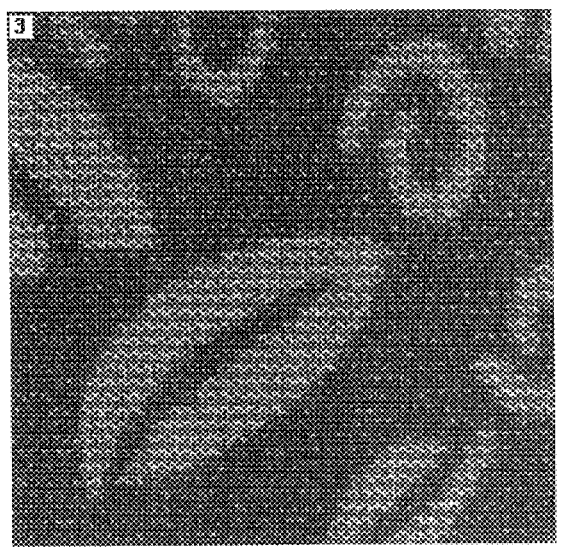

FIGS. 42A, 42B and 42C illustrate an example of a thumbnail image, an image that has been increased in the vertical and horizontal directions and the large image that is obtained from the database, respectively. Thus, various displays may be obtained on the storyboard without distorting the image.

A number of viewing options may be provided for samples on the storyboard, according to embodiments of the invention. In particular, an enlarged view may be provided with all samples shown in relative scale to one another. Alternatively, a full repeat view may be provided where each sample displays a full repeat. In yet another alternative, a draped view may be provided in which a sample may be shown with folds to illustrate a metallic or undercut quality. Finally, an actual size view may be available for printing purposes. A measuring device may be provided for the user to determine actual size of the samples.

Figure 43:
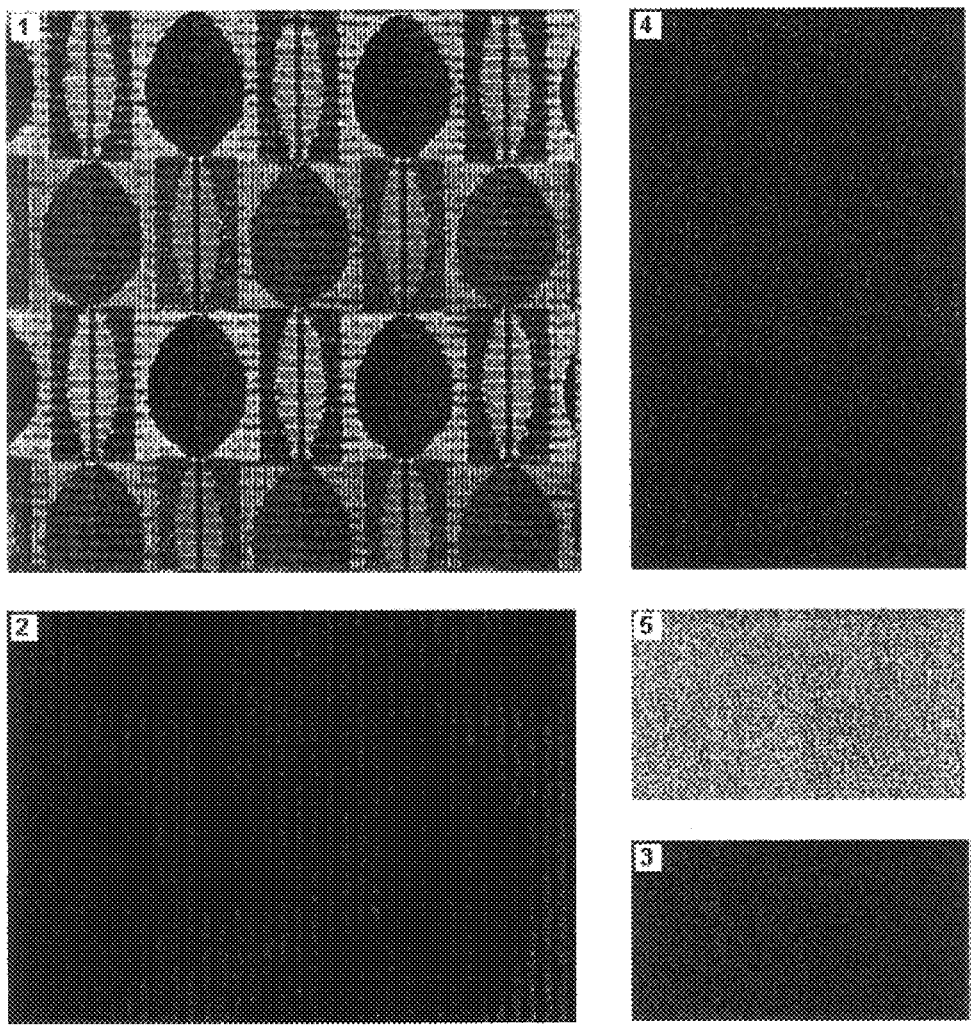
FIG. 43 illustrates an example of a storyboard including resized images with legends added according to an embodiment of the present invention.

Referring again to FIG. 41 at Block 4120, one or more of the images may be rotated on the storyboard, according to embodiments of the invention. Rotation may be accomplished by specifying a degree of rotation and/or by using other conventional rotation techniques. At Block 4130, legends may be added to the storyboard. In particular, as each image is added to the storyboard, it may be numbered. A legend automatically may be added at the foot of the storyboard with selected attributes, for example supplier name, style name, style number, colorway name and colorway number. FIG. 43 is an example of a storyboard including resized images with legends added.

Referring now to Block 4140 of FIG. 41, additional information may be imported into a storyboard, according to embodiments of the invention. In particular, graphics, logos, scanned files such as furniture images, drawings and/or other decorative items may be imported into a storyboard. Moreover, font size and/or type may be selected to personalize the storyboard and make it a unique design for presentation purposes. Finally, referring to Block 4150 of FIG. 41, the storyboard and/or catalog selections may be exported into other applications such as AutoCAD, to complete project requirements.

4. Additional User Search Criteria

Referring back to FIG. 2, pattern selection 210 according to embodiments of the invention may include accepting user search criteria (Block 212) and searching a set of patterns based on the criteria (Block 214). Referring now to FIG. 44, details of accepting user search criteria, according to embodiments of the invention, now will be described. As shown in Block 4410, a search may be based on attributes that were described extensively above. Moreover, as shown at Block 4420, and as was described extensively above, a search may be based on user selection of a pattern. Pattern matching searches may be performed to search the stored set of patterns to generate at least one of a plurality of arrays of patterns that are similar to the user selection of a pattern. Thus, the search may be based on attributes and/or based on the pattern itself.

Referring now to Block 4430, a "custom products" attribute may be provided to allow a search for custom products. It will be understood that as used herein, the term "custom products" refers to products that may be customized in color and/or other manner, and that is generally not available in a manufacturer's regular product line. A "custom products" attribute can enable a search to be made for custom products. These products may have different price points, lead times and/or availability compared to other products that are in the open line of the manufacturer. The custom variations that are available to the designer may be represented in the product specification, both on-screen and in printed format. Moreover, custom products that are created by the supplier for a specific user also may be displayed as being generally available, for widespread exposure and sale, if desired.

Moreover, systems, methods and/or computer program products according to embodiments of the present invention can allow a user to inform a manufacturer of details, including the visual characteristics, of a proposed custom variation of a product. This variation may use the images and/or specifications of an existing product in the stored set of patterns of Block 202 as a starting point. For example, a user may find a product of interest based on the pattern selection Block 210 of FIG. 2. Then, by using a color selector that is tied to specific colors in a supplier-specific and/or an industry-standard color palette, a user can modify the existing sample to reflect a new custom variation. The user then can email that custom variation to the manufacturer. The manufacturer can create either a digital file representation and/or a physical sample of the custom variation.

Referring now to Block 4440 of FIG. 44, one or more attributes may be added for collections, correlates and/or related materials, so that these attributes may be used as search criteria in Block 212. More particularly, a product pattern may be labeled as having other materials that the user may desire to consider. The user may be able to select these related materials by means of an icon, command and/or attribute selection.

The related materials may include collections, correlates and/or related marketing materials. In particular, if a supplier has created a related collection, the user may desire to see the entire collection to find other patterns of interest by a certain designer and/or based on a particular theme. Moreover, the supplier may suggest correlates, i.e. products that work together to create a unified color theme. The user may select suggested patterns from the supplier suggestions and/or independent designers may create suggestions for products that work together for a coordinating effect. Finally, if the supplier provides related marketing materials such as prints, advertisements or materials shown in a room scene, the user can select that option to pull up other materials that may enhance the user's presentation to a client.

5. Discontinued Products

Referring now to FIG. 45, handling of discontinued products according to embodiments of the present invention now will be described. As shown in FIG. 45, when a search of a set of patterns is performed (Block 214 of FIG. 2) and a discontinued product is found in the results of the search at Block 4510, the discontinued product may not be included in the search results, at Block 4520. Thus, if a product has been discontinued, a search may not return the images of those products. If the product is not discontinued at Block 4510, an attribute may specify an "availability", for example a lead time to receive a shipment.

Referring to Block 4530, if a user specifies an exact search where a specific style name and number are entered, the sample may be returned but may be labeled as discontinued, at Block 4540. The date when the sample was discontinued also may be displayed. It may be useful for both a designer and a supplier for a discontinued product to be shown in this way. For example, the supplier may be able to sell inventory of discontinued product that may be difficult to sell otherwise. For a designer, the discontinued product may be available at a very competitive price.

Referring again to Block 4530, if a product has been saved in a catalog and/or in a storyboard, and later is discontinued, that product may be flagged as being discontinued at Block 4540 when the user retrieves the catalog and/or storyboard. For example, a visible symbol may be displayed in the image of the pattern. Since the specification information accompanies the sample in the catalog and/or storyboard, the user may be able to search for a replacement that has a similar design and/or technical specifications to the discontinued sample.

6. Locators

Systems, methods and/or computer program products for locating suppliers and/or service providers according to embodiments of the present invention now will be described. These systems, methods and/or computer program products may be used by a user to locate a service provider, for example an installer or dealer, and/or to locate a local representative of a manufacturer or supplier.

Figure 46:
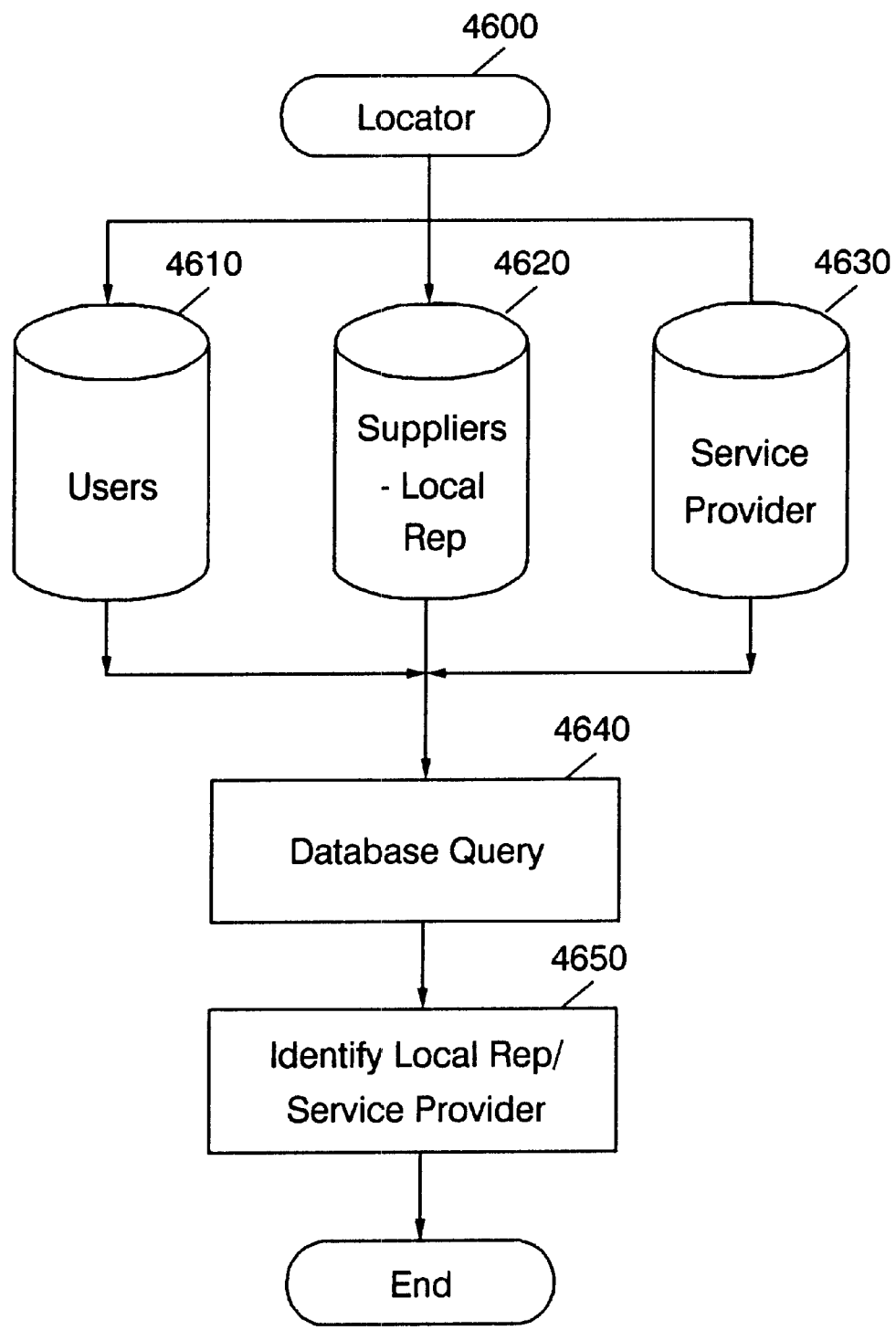
FIG. 46 is a flowchart of locator systems, methods and computer program products according to an embodiment of the present invention.

In particular, referring to FIG. 46, as part of and/or in addition to the databases that have been described above, systems, methods and/or computer program products according to embodiments of the present invention may include a "users" database 4610, a "suppliers" database 4620 and a "service providers" database 4630. The users database 4610 may include identification of users. In addition to conventional names, addresses and telephone numbers, information also may be included as to the type of designer (such as commercial or residential) and/or the industry on which the designer focuses (such as healthcare, general corporate, hospitality, etc.). Information also may be provided as to existing accounts with suppliers. The suppliers database 4620 may include general identifying information, as well as a listing of local representatives of the supplier. The service providers database 4630 may include service provider information including data on accounts, such as names, numbers and geographic location, and contact names. Inputs to the databases 4610, 4620 and/or 4630 may be provided manually and/or automatically.

Referring now to Block 4640, a database query may be input by a user, supplier and/or service provider. For example, a user may query as to a local service provider, such as an installer or dealer. In response, the user profile information in the user database 4610 may be accessed, and a match or matches may be made to an appropriate service provider from the service provider database 4630, for example by location or by other designation such as industry focus. This information then may be furnished to the user. In another example, a user may inquire as to a local sales representative for a particular supplier. The user database 4610 may be accessed to identify the user's geographical location, industry focus and/or other information and the supplier database 4620 may be queried for an appropriate match. The results of the database query are provided to the user at Block 4650.

Systems, methods and/or computer program products of FIG. 46 also may be used by service providers to target advertising for users or suppliers, and by suppliers to target advertising or sales leads to service providers or users. Moreover, suppliers may be able to provide personalized pricing that can be varied by geographic region, channels of distribution and/or the identity of the user or size of the user's firm. Locator embodiments of the present invention also may be provided independent of systems, methods and/or computer program products for generating a storyboard of interior design surface treatments for an interior space according to embodiments of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of coordinating patterns of interior design surface treatments for an interior space, comprising the following steps that are performed on a computer system:

displaying a plurality of arrays of patterns that correspond to user search criteria, from a stored set of patterns for interior design surface treatments, each array of patterns corresponding to a surface treatment product type;

generating a plurality of subarrays of patterns, each subarray corresponding to a surface treatment product type, in response to user selection from the corresponding array of patterns for the corresponding surface treatment type; and combining at least one pattern from at least two of the subarrays of patterns.

2. A method according to claim 1 wherein the step of displaying is preceded by the step of:

storing a set of patterns for interior design surface treatments.

3. A method according to claim 2 wherein the storing step comprises the step of storing a set of patterns for interior design surface treatments, each pattern including a plurality of pattern attributes.

4. A method according to claim 3 wherein the following steps are performed between the step of storing and the step of displaying:

accepting at least one user selected attribute for at least one of the surface treatment product types to define the user search criteria; and searching the stored pattern attributes for the at least one of the surface treatment product types to generate at least one of the plurality of arrays of patterns that meet the user search criteria.

5. A method according to claim 4 wherein the displaying step further comprises the step of displaying with each pattern an indicator of an extent that the pattern matches the user search criteria.

6. A method according to claim 1 wherein the surface treatment product types comprise at least one of floor treatments, wall treatments, fabrics and countertop materials.

7. A method according to claim 1 wherein the surface treatment product types comprise at least one of tile floor treatments, carpet floor treatments and carpet floor treatments.

8. A method according to claim 1 wherein the pattern attributes include at least one of an identification of a manufacturer, an identification of a primary color and an identification of an overall style.

9. A method according to claim 1 wherein the following step is performed between the steps of generating and combining:

displaying the plurality of subarrays of patterns to create a catalog.

10. A method according to claim 1 wherein the combining step is followed by the step of displaying the at least one pattern from at least two of the subarrays of patterns that are combined.

11. A method according to claim 10 wherein the displaying step is followed by the step of:

annotating the at least one pattern from at least two of the subarrays of patterns that are combined in response to user input.

12. A method according to claim 10 wherein the displaying step is followed by the step of:

emailing the at least one pattern from at least two of the subarrays of patterns that are combined.

13. A method according to claim 10 wherein the displaying step is followed by the step of:

electronically ordering samples of the interior design surface treatments that are contained in the at least one pattern from at least two of the subarrays of patterns that are combined.

14. A method according to claim 10 wherein the displaying step is followed by the step of:

electronically ordering sufficient quantities of the interior design surface treatments that are contained in the at least one pattern from at least two of the subarrays of patterns that are combined, for the interior space.

15. A method according to claim 9 wherein the step of displaying a plurality of arrays of patterns is performed in a first window on a display and wherein the step of displaying the plurality of subarrays of patterns is performed in a second window on the display.

16. A method according to claim 15 wherein the combining step is followed by the step of displaying the at least one pattern from at least two of the subarrays of patterns that are combined in a third window on the display.

17. A method according to claim 4 wherein the steps of displaying and combining are performed on a client that is connected to a server via a network and wherein the steps of storing and searching are performed on the server.

18. A method of coordinating patterns of interior design surface treatments for an interior space, comprising the following steps that are performed on a computer system:

displaying a plurality of arrays of patterns that correspond to user search criteria, from a stored set of patterns for interior design surface treatments, each array of patterns corresponding to a surface treatment product type; and combining at least one pattern from at least two of the arrays of patterns.

19. A method according to claim 18 wherein the step of displaying is preceded by the step of:

storing a set of patterns for interior design surface treatments.

20. A method according to claim 19 wherein the storing step comprises the step of storing a set of patterns for interior design surface treatments, each pattern including a plurality of pattern attributes.

21. A method according to claim 20 wherein the following steps are performed between the step of storing and the step of displaying:

accepting at least one user selected attribute for at least one of the surface treatment product types to define the user search criteria; and searching the stored pattern attributes for the at least one of the surface treatment product types to generate at least one of the plurality of arrays of patterns that meet the user search criteria.

22. A method according to claim 21 wherein the displaying step further comprises the step of displaying with each pattern an indicator of an extent that the pattern matches the user search criteria.

23. A method according to claim 18 wherein the surface treatment product types comprise at least one of floor treatments, wall treatments, fabrics and countertop materials.

24. A method according to claim 18 wherein the surface treatment product types comprise at least one of tile floor treatments, carpet floor treatments and carpet floor treatments.

25. A method according to claim 18 wherein the pattern attributes include at least one of an identification of a manufacturer, an identification of a primary color and an identification of an overall style.

26. A method according to claim 18 wherein the combining step is followed by the step of displaying the at least one pattern from at least two of the arrays of patterns that are combined.

27. A method according to claim 26 wherein the displaying step is followed by the step of:

annotating the at least one pattern from at least two of the arrays of patterns that are combined in response to user input.

28. A method according to claim 26 wherein the displaying step is followed by the step of:

emailing the at least one pattern from at least two of the arrays of patterns that are combined.

29. A method according to claim 26 wherein the displaying step is followed by the step of:

electronically ordering samples of the interior design surface treatments that are contained in the at least one pattern from at least two of the arrays of patterns that are combined.

30. A method according to claim 26 wherein the displaying step is followed by the step of:

electronically ordering sufficient quantities of the interior design surface treatments that are contained in the at least one pattern from at least two of the arrays of patterns that are combined, for the interior space.

31. A method according to claim 26 wherein the step of displaying a plurality of arrays of patterns is performed in a first window on a display and wherein the step of displaying the at least one pattern from at least two of the arrays of patterns that are combined is performed in a second window on the display.

32. A method according to claim 21 wherein the steps of displaying and combining are performed on a client that is connected to a server via a network and wherein the steps of storing and searching are perfornmed on the server.

33. A method of coordinating patterns of interior design surface treatments for an interior space, comprising the following steps that are performed on a computer system:

displaying in a first window on a display, a plurality of arrays of patterns that correspond to user search criteria, from a stored set of patterns for interior design surface treatments, each array of patterns corresponding to a surface treatment product type;

displaying in a second window on the display a plurality of subarrays of patterns, each subarray corresponding to a surface treatment product type, in response to user selection from the corresponding array of patterns for the corresponding surface treatment type that is displayed in the first window; and displaying in a third window on the display, at least one pattern from at least two of the subarrays of patterns in the second window.

34. A method according to claim 33 wherein the step of displaying in a first window is preceded by the step of:

storing a set of patterns for interior design surface treatments.

35. A method according to claim 34 wherein the storing step comprises the step of storing a set of patterns for interior design surface treatments, each pattern including a plurality of pattern attributes.

36. A method according to claim 35 wherein the following steps are performed between the step of storing and the step of displaying in a first window:

accepting at least one user selected attribute for at least one of the surface treatment product types to define the user search criteria; and searching the stored pattern attributes for the at least one of the surface treatment product types to generate at least one of the plurality of arrays of patterns that meet the user search criteria.

37. A method according to claim 36 wherein the step of displaying in a first window further comprises the step of displaying with each pattern in the first window an indicator of an extent that the pattern matches the user search criteria.

38. A method according to claim 33 wherein the step of displaying in a third window is followed by the step of:

annotating the third window in response to user input.

39. A method according to claim 33 wherein the step of displaying in a third window is followed by the step of:

emailing the third window.

40. A method according to claim 33 wherein the step of displaying in a third window is followed by the step of:

electronically ordering samples of the interior design surface treatments that are contained in the third window.

41. A method according to claim 33 wherein the step of displaying in a third window is followed by the step of:

electronically ordering sufficient quantities of the interior design surface treatments that are contained in the third window, for the interior space.

42. A method according to claim 36 wherein the steps of displaying in a first window, displaying in a second window and displaying in a third window are performed on a client that is connected to a server via a network and wherein the steps of storing and searching are performed on the server.

43. A method of coordinating patterns of interior design surface treatments for an interior space, comprising the following steps that are performed on a computer system:

generating a plurality of arrays of patterns that correspond to user search criteria, from a stored set of patterns for interior design surface treatments, each array of patterns corresponding to a surface treatment product type;

generating a plurality of subarrays of patterns, each subarray corresponding to a surface treatment product type, in response to user selection from the corresponding array of patterns for the corresponding surface treatment type; and combining at least one pattern from at least two of the subarrays of patterns.

44. A method according to claim 43 wherein the step of generating a plurality of arrays is preceded by the step of:

storing a set of patterns for interior design surface treatments.

45. A method according to claim 44 wherein the storing step comprises the step of storing a set of patterns for interior design surface treatments, each pattern including a plurality of pattern attributes.

46. A method according to claim 45 wherein the following steps are performed between the step of storing and the step of generating a plurality of arrays:

accepting at least one user selected attribute for at least one of the surface treatment product types to define the user search criteria; and searching the stored pattern attributes for the at least one of the surface treatment product types to generate at least one of the plurality of arrays of patterns that meet the user search criteria.

47. A method according to claim 46 wherein the step of generating a plurality of arrays further comprises the step of generating for each pattern, an indicator of an extent that the pattern matches the user search criteria.

48. A method according to claim 43 wherein the combining step is followed by the step of:

annotating the at least one pattern from at least two of the subarrays of patterns that are combined in response to user input.

49. A method according to claim 43 wherein the combining step is followed by the step of:

emailing the at least one pattern from at least two of the subarrays of patterns that are combined.

50. A method according to claim 43 wherein the combining step is followed by the step of:

electronically ordering samples of the interior design surface treatments that are contained in the at least one pattern from at least two of the subarrays of patterns that are combined.

51. A method according to claim 43 wherein the combining step is followed by the step of:

electronically ordering sufficient quantities of the interior design surface treatments that are contained in the at least one pattern from at least two of the subarrays of patterns that are combined, for the interior space.

52. A server method of coordinating patterns of interior design surface treatments for an interior space, comprising the following steps that are performed at a server that is connected to a client by a network:

storing a set of patterns for a plurality of surface treatment product types, each pattern including a plurality of pattern attributes;

accepting from the client over the network at least one user selected attribute for at least one of the surface treatment product types;

searching the stored pattern attributes for the at least one of the surface treatment product types to generate a plurality of arrays of patterns that meet the at least one user selected attribute;

transmitting the plurality of arrays of patterns that meet the at least one user selected attribute to the client over the network;

receiving from the client over the network a file of interior design surface treatments for an interior space that represents at least one pattern from at least two of the arrays of patterns; and storing the received file.

53. A method according to claim 52 wherein the searching step further comprises the step of generating for each pattern, an indicator of an extent that the pattern matches the user search criteria.

54. A client method of coordinating patterns of interior design surface treatments for an interior space, comprising the following steps that are performed at a client that is connected to a server by a network:

accepting at least one user selected attribute for at least one of a plurality of surface treatment product types to define a user search criteria;

transmitting the user search criteria to the server over the network;

receiving from the server over the network, a plurality of arrays of patterns that correspond to the user search criteria, each array of patterns corresponding to a surface treatment product type;

displaying the plurality of arrays of patterns;

accepting at least one user selection from at least one of the plurality of arrays of patterns;

generating a plurality of subarrays of patterns, each subarray corresponding to a surface treatment product type, in response to the at least one user selection from the corresponding array of patterns for the corresponding surface treatment type;

displaying the plurality of subarrays of patterns;

combining at least one pattern from at least two of the subarrays of patterns; and displaying the at least one pattern from at least two of the subarrays of patterns that are combined.

55. A method according to claim 54 wherein the step of displaying the plurality of arrays of patterns further comprises the step of displaying with each pattern an indicator of an extent that the pattern matches the user search criteria.

56. A method according to claim 54 wherein the step of displaying the at least one pattern from at least two of the subarrays of patterns that are combined is followed by the step of:

annotating the at least one pattern from at least two of the subarrays of patterns that are combined in response to user input.

57. A method according to claim 54 wherein the step of displaying the at least one pattern from at least two of the subarrays of patterns that are combined is followed by the step of:

emailing the at least one pattern from at least two of the subarrays of patterns that are combined.

58. A method according to claim 54 wherein the step of displaying the at least one pattern from at least two of the subarrays of patterns that are combined is followed by the step of:

electronically ordering samples of the interior design surface treatments that are contained in the at least one pattern from at least two of the subarrays of patterns that are combined.

59. A method according to claim 54 wherein the step of displaying the at least one pattern from at least two of the subarrays of patterns that are combined is followed by the step of:

electronically ordering sufficient quantities of the interior design surface treatments that are contained in the at least one pattern from at least two of the subarrays of patterns that are combined, for the interior space.

60. A method according to claim 59 wherein the step of displaying the plurality of arrays of patterns is performed in a first window on a display and wherein the step of displaying the plurality of subarrays of patterns is performed in a second window on the display.

61. A method according to claim 60 wherein the step of displaying the at least one pattern from at least two of the subarrays of patterns that are combined is performed in a third window on the display.

62. A computer program product for coordinating patterns of interior design surface treatments for an interior space, the computer program product comprising a computer usable storage medium having computer readable program code embodied in the medium, the computer readable program code comprising:

computer readable program code that displays a plurality of arrays of patterns that correspond to user search criteria, from a stored set of patterns for interior design surface treatments, each array of patterns corresponding to a surface treatment product type;

computer readable program code that generates a plurality of subarrays of patterns, each subarray corresponding to a surface treatment product type, in response to user selection from the corresponding array of patterns for the corresponding surface treatment type; and computer readable program code that combines at least one pattern from at least two of the subarrays of patterns.

63. A computer program product according to claim 62 further comprising:

computer readable program code that stores a set of patterns for interior design surface treatments.

64. A computer program product according to claim 63 wherein the computer readable program code that stores comprises computer readable program code that stores a set of patterns for interior design surface treatments, each pattern including a plurality of pattern attributes.

65. A computer program product according to claim 64 further comprising:

computer readable program code that accepts at least one user selected attribute for at least one of the surface treatment product types to define the user search criteria; and computer readable program code that searches the stored pattern attributes for the at least one of the surface treatment product types to generate at least one of the plurality of arrays of patterns that meet the user search criteria.

66. A computer program product according to claim 65 wherein the computer readable program code that displays further comprises computer readable program code that displays with each pattern an indicator of an extent that the pattern matches the user search criteria.

67. A computer program product according to claim 62 further comprising:

computer readable program code that displays the plurality of subarrays of patterns to create a catalog.

68. A computer program product according to claim 62 further comprising:

computer readable program code that displays the at least one pattern from at least two of the subarrays of patterns that are combined.

69. A computer program product according to claim 68 further comprising:

computer readable program code that annotates the at least one pattern from at least two of the subarrays of patterns that are combined in response to user input.

70. A computer program product according to claim 68 further comprising:

computer readable program code that emails the at least one pattern from at least two of the subarrays of patterns that are combined.

71. A computer program product according to claim 68 further comprising:

computer readable program code that electronically orders samples of the interior design surface treatments that are contained in the at least one pattern from at least two of the subarrays of patterns that are combined.

72. A computer program product according to claim 68 further comprising:

computer readable program code that electronically orders sufficient quantities of the interior design surface treatments that are contained in the at least one pattern from at least two of the subarrays of patterns that are combined, for the interior space.

73. A computer program product according to claim 67 wherein the computer readable program code displays a plurality of arrays of patterns in a first window on a display and wherein the computer readable program code displays the plurality of subarrays of patterns in a second window on the display.

74. A computer program product according to claim 73 further comprising:

computer readable program code that displays the at least one pattern from at least two of the subarrays of patterns that are combined in a third window on the display.

75. A computer program product according to claim 65 wherein the computer readable program code that displays and the computer readable program code that combines execute on a client that is connected to a server via a network and wherein the computer readable program code that stores and the computer readable program code that searches executes on the server.

76. A computer program product for coordinating patterns of interior design surface treatments for an interior space, the computer program product comprising a computer storage medium having computer readable program code embodied in the medium, the computer readable program code comprising:

computer readable program code that displays a plurality of arrays of patterns that correspond to user search criteria, from a stored set of patterns for interior design surface treatments, each array of patterns corresponding to a surface treatment product type; and computer readable program code that combines at least one pattern from at least two of the arrays of patterns.

77. A computer program product according to claim 76 further comprising:

computer readable program code that stores a set of patterns for interior design surface treatments.

78. A computer program product according to claim 77 wherein the computer readable program code that stores comprises computer readable program code that stores a set of patterns for interior design surface treatments, each pattern including a plurality of pattern attributes.

79. A computer program product according to claim 78 further comprising:

computer readable program code that accepts at least one user selected attribute for at least one of the surface treatment product types to define the user search criteria; and computer readable program code that searches the stored pattern attributes for the at least one of the surface treatment product types to generate at least one of the plurality of arrays of patterns that meet the user search criteria.

80. A computer program product according to claim 79 wherein the computer readable program code that displays further comprises computer readable program code that displays with each pattern an indicator of an extent that the pattern matches the user search criteria.

81. A computer program product according to claim 76 further comprising:

computer readable program code that displays the at least one pattern from at least two of the arrays of patterns that are combined.

82. A computer program product according to claim 81 further comprising:

computer readable program code that annotates the at least one pattern from at least two of the arrays of patterns that are combined in response to user input.

83. A computer program product according to claim 81 further comprising:

computer readable program code that emails the at least one pattern from at least two of the arrays of patterns that are combined.

84. A computer program product according to claim 81 further comprising:

computer readable program code that electronically orders samples of the interior design surface treatments that are contained in the at least one pattern from at least two of the arrays of patterns that are combined.

85. A computer program product according to claim 81 further comprising:

computer readable program code that electronically orders sufficient quantities of the interior design surface treatments that are contained in the at least one pattern from at least two of the arrays of patterns that are combined, for the interior space.

86. A computer program product according to claim 81 wherein the computer readable program code displays a plurality of arrays of patterns in a first window on a display and wherein the computer readable program code displays the at least one pattern from at least two of the arrays of patterns that are combined in a second window on the display.

87. A computer program product according to claim 79 wherein the computer readable program code that displays and the computer readable program code that combines execute on a client that is connected to a server via a network and wherein computer readable program code that stores and the computer readable program code that searches execute on the server.

88. A computer program product for coordinating patterns of interior design surface treatments for an interior space, the computer program product comprising a computer usable storage medium having computer readable program code embodied in the medium, the computer readable program code comprising:

computer readable program code that displays in a first window on a display, a plurality of arrays of patterns that correspond to user search criteria, from a stored set of patterns for interior design surface treatments, each array of patterns corresponding to a surface treatment product type;

computer readable program code that displays in a second window on the display a plurality of subarrays of patterns, each subarray corresponding to a surface treatment product type, in response to user selection from the corresponding array of patterns for the corresponding surface treatment type that is displayed in the first window; and computer readable program code that displays in a third window on the display, at least one pattern from at least two of the subarrays of patterns in the second window.

89. A computer program product according to claim 88 further comprising:

computer readable program code that stores a set of patterns for interior design surface treatments.

90. A computer program product according to claim 89 wherein the computer readable program code that stores comprises computer readable program code that stores a set of patterns for interior design surface treatments, each pattern including a plurality of pattern attributes.

91. A computer program product according to claim 90 further comprising:

computer readable program code that accepts at least one user selected attribute for at least one of the surface treatment product types to define the user search criteria; and computer readable program code that searches the stored pattern attributes for the at least one of the surface treatment product types to generate at least one of the plurality of arrays of patterns that meet the user search criteria.

92. A computer program product according to claim 91 wherein the computer readable program code that displays in a first window further comprises computer readable program code that displays with each pattern in the first window an indicator of an extent that the pattern matches the user search criteria.

93. A computer program product according to claim 88 further comprising:

computer readable program code that annotates the third window in response to user input.

94. A computer program product according to claim 88 further comprising:

computer readable program code that emails the third window.

95. A computer program product according to claim 88 further comprising:

computer readable program code that electronically orders samples of the interior design surface treatments that are contained in the third window.

96. A computer program product according to claim 88 further comprising:

computer readable program code that electronically orders sufficient quantities of the interior design surface treatments that are contained in the third window, for the interior space.

97. A computer program product according to claim 91 wherein the computer readable program code that displays in a first window, the computer readable program code that displays in a second window and the computer readable program code that displays in a third window execute on a client that is connected to a server via a network and wherein the computer readable program code that stores and the computer readable program code that searches execute on the server.

98. A computer program product for coordinating patterns of interior design surface treatments for an interior space, the computer program product comprising a computer usable storage medium having computer readable program code embodied in the medium, the computer readable program code comprising:

computer readable program code that generates a plurality of arrays of patterns that correspond to user search criteria, from a stored set of patterns for interior design surface treatments, each array of patterns corresponding to a surface treatment product type;

computer readable program code that generates a plurality of subarrays of patterns, each subarray corresponding to a surface treatment product type, in response to user selection from the corresponding array of patterns for the corresponding surface treatment type; and computer readable program code that combines at least one pattern from at least two of the subarrays of patterns.

99. A computer program product according to claim 98 further comprising:

computer readable program code that stores a set of patterns for interior design surface treatments.

100. A computer program product according to claim 99 wherein the computer readable program code that stores comprises computer readable program code that stores a set of patterns for interior design surface treatments, each pattern including a plurality of pattern attributes.

101. A computer program product according to claim 100 further comprising:

computer readable program code that accepts at least one user selected attribute for at least one of the surface treatment product types to define the user search criteria; and computer readable program code that searches the stored pattern attributes for the at least one of the surface treatment product types to generate at least one of the plurality of arrays of patterns that meet the user search criteria.

102. A computer program product according to claim 101 wherein the computer readable program code that generates a plurality of arrays further comprises computer readable program code that generates for each pattern, an indicator of an extent that the pattern matches the user search criteria.

103. A computer program product according to claim 98 further comprising:

computer readable program code that annotates the at least one pattern from at least two of the subarrays of patterns that are combined in response to user input.

104. A computer program product according to claim 98 further comprising:

computer readable program code that emails the at least one pattern from at least two of the subarrays of patterns that are combined.

105. A computer program product according to claim 98 further comprising:

computer readable program code that electronically orders samples of the interior design surface treatments that are contained in the at least one pattern from at least two of the subarrays of patterns that are combined.

106. A computer program product according to claim 98 further comprising:

computer readable program code that electronically orders sufficient quantities of the interior design surface treatments that are contained in the at least one pattern from at least two of the subarrays of patterns that are combined, for the interior space.

107. A computer program product that executes on a server that is connected to a client over a network, for coordinating patterns of interior design surface treatments for an interior space, the computer program product comprising a computer usable storage medium having computer readable program code embodied in the medium, the computer readable program code comprising:

computer readable program code that stores a set of patterns for a plurality of surface treatment product types, each pattern including a plurality of pattern attributes;

computer readable program code that accepts from the client over the network at least one user selected attribute for at least one of the surface treatment product types;

computer readable program code that searches the stored pattern attributes for the at least one of the surface treatment product types to generate a plurality of arrays of patterns that meet the at least one user selected attribute;

computer readable program code that transmits the plurality of arrays of patterns that meet the at least one user selected attribute to the client over the network;

computer readable program code that receives from the client over the network a file of interior design surface treatments for an interior space that represents at least one pattern from at least two of the arrays of patterns; and computer readable program code that stores the received file.

108. A computer program product according to claim 107 wherein the computer readable program code that searches further comprises computer readable program code that generates for each pattern, an indicator of an extent that the pattern matches the user search criteria.

109. A computer program product that executes on a client that is connected to a server over a network, for coordinating patterns of interior design surface treatments for an interior space, the computer program product comprising a computer usable storage medium having computer readable program code embodied in the medium, the computer readable program code comprising:

computer readable program code that accepts at least one user selected attribute for at least one of a plurality of surface treatment product types to define a user search criteria;

computer readable program code that transmits the user search criteria to the server over the network;

computer readable program code that receives from the server over the network, a plurality of arrays of patterns that correspond to the user search criteria, each array of patterns corresponding to a surface treatment product type;

computer readable program code that displays the plurality of arrays of patterns;

computer readable program code that accepts at least one user selection from at least one of the plurality of arrays of patterns;

computer readable program code that generates a plurality of subarrays of patterns, each subarray corresponding to a surface treatment product type, in response to the at least one user selection from the corresponding array of patterns for the corresponding surface treatment type;

computer readable program code that displays the plurality of subarrays of patterns;

computer readable program code that combines at least one pattern from at least two of the subarrays of patterns; and computer readable program code that displays the at least one pattern from at least two of the subarrays of patterns that are combined.

110. A computer program product according to claim 109 wherein the computer readable program code that displays the plurality of arrays of patterns further comprises computer readable program code that displays with each pattern an indicator of an extent that the pattern matches the user search criteria.

111. A computer program product according to claim 109 further comprising:

computer readable program code that annotates at least one pattern from at least two of the subarrays of patterns that are combined in response to user input.

112. A computer program product according to claim 109 further comprising:

computer readable program code that emails the at least one pattern from at least two of the subarrays of patterns that are combined.

113. A computer program product according to claim 109 further comprising:

computer readable program code that electronically orders samples of the interior design surface treatments that are contained in the at least one pattern from at least two of the subarrays of patterns that are combined.

114. A computer program product according to claim 109 further comprising:

computer readable program code that electronically orders sufficient quantities of the interior design surface treatments that are contained in the at least one pattern from at least two of the subarrays of patterns that are combined, for the interior space.

115. A computer program product according to claim 114 wherein the computer readable program code displays the plurality of arrays of patterns in a first window on a display and wherein the computer readable program code displays the plurality of subarrays of patterns in a second window on the display.

116. A computer program product according to claim 115 wherein the computer readable program code displays the at least one pattern from at least two of the subarrays of patterns that are combined in a third window on the display.

117. A system for coordinating patterns of interior design surface treatments for an interior space, comprising:

a computer display that displays a plurality of arrays of patterns that correspond to user search criteria, from a stored set of patterns for interior design surface treatments, each array of patterns corresponding to a surface treatment product type;

a computer that generates a plurality of subarrays of patterns, each subarray corresponding to a surface treatment product type, in response to user selection from the corresponding array of patterns for the corresponding surface treatment type, and that combines at least one pattern from at least two of the subarrays of patterns.

118. A system for coordinating patterns of interior design surface treatments for an interior space, comprising:

a computer display that displays a plurality of arrays of patterns that correspond to user search criteria, from a stored set of patterns for interior design surface treatments, each array of patterns corresponding to a surface treatment product type; and a computer that combines at least one pattern from at least two of the arrays of patterns.

119. A system for coordinating patterns of interior design surface treatments for an interior space, comprising:

a computer display that displays in a first window on a display, a plurality of arrays of patterns that correspond to user search criteria, from a stored set of patterns for interior design surface treatments, each array of patterns corresponding to a surface treatment product type;

the computer display also displaying in a second window on the display a plurality of subarrays of patterns, each subarray corresponding to a surface treatment product type, in response to user selection from the corresponding array of patterns for the corresponding surface treatment type that is displayed in the first window; and the computer display also displaying in a third window on the display, at least one pattern from at least two of the subarrays of patterns in the second window.

120. A system for coordinating patterns of interior design surface treatments for an interior space, comprising:

a computer that generates a plurality of arrays of patterns that correspond to user search criteria, from a stored set of patterns for interior design surface treatments, each array of patterns corresponding to a surface treatment product type;

the computer also generating a plurality of subarrays of patterns, each subarray corresponding to a surface treatment product type, in response to user selection from the corresponding array of patterns for the corresponding surface treatment type; and the computer also combining at least one pattern from at least two of the subarrays of patterns.

121. A server that coordinates patterns of interior design surface treatments for an interior space, comprising:

a server computer that stores a set of patterns for a plurality of surface treatment product types, each pattern including a plurality of pattern attributes;

the server computer also accepting from a client over a network at least one user selected attribute for at least one of the surface treatment product types;

the server computer also searching the stored pattern attributes for the at least one of the surface treatment product types to generate a plurality of arrays of patterns that meet the at least one user selected attribute;

the server computer also transmitting the plurality of arrays of patterns that meet the at least one user selected attribute to the client over the network;

the server computer also receiving from the client over the network a file that represents at least one pattern from at least two of the arrays of patterns; and the server computer also storing the received file.

122. A client that coordinates patterns of interior design surface treatments for an interior space, comprising:

a client computer that accepts at least one user selected attribute for at least one of a plurality of surface treatment product types to define a user search criteria;

the client computer also transmitting the user search criteria to a server over a network;

the client computer also receiving from the server over the network, a plurality of arrays of patterns that correspond to the user search criteria, each array of patterns corresponding to a surface treatment product type;

the client computer also displaying the plurality of arrays of patterns;

the client computer also accepting at least one user selection from at least one of the plurality of arrays of patterns;

the client computer also generating a plurality of subarrays of patterns, each subarray corresponding to a surface treatment product type, in response to the at least one user selection from the corresponding array of patterns for the corresponding surface treatment type;

the client computer also displaying the plurality of subarrays of patterns;

the client computer also combining at least one pattern from at least two of the subarrays of patterns; and the client computer also displaying the at least one pattern from at least two of the subarrays of patterns that are combined.

123. A method according to claim 1 further comprising the steps of:

storing data related to the plurality of arrays of patterns that correspond to user search criteria, data related to the plurality of subarrays of patterns and/or data related to the at least one pattern from at least two of the subarrays of patterns that are combined in a database; and mining the database to extract information related to projects of a user and/or products of a manufacturer of the interior design surface treatments.

124. A method according to claim 123 wherein the mining step comprises mining the database to extract information related to search criteria of a user, patterns that are frequently selected by a user, combinations of interior design surface treatments that are used by a user, samples of interior design surface treatments that have been ordered by a user or quantities of interior design surface treatments that have been ordered by a user.

125. A method according to claim 123 wherein the mining step comprises mining the database to extract information related to past projects of a user, work in progress projects of a user or future projects of a user.

126. A method according to claim 123 wherein the mining step comprises mining the database to extract information related to products, product categories and/or attributes of a manufacturer of the interior design surface treatments that are selected in response to user search criteria, that are selected from the corresponding array of patterns or that are included in the at least one pattern from at least two of the subarrays of patterns that are combined.

127. A method according to claim 126 further comprising the step of using the information related to products and product categories of a manufacturer of the interior design surface treatments that are selected in response to user search criteria, that are selected from the corresponding array of patterns or that are included in the at least one pattern from at least two of the subarrays of patterns that are combined to generate sales leads, to design new patterns, to direct marketing or to manufacture interior design surface treatments.

128. A method according to claim 2 wherein the step of storing a set of patterns for interior design surface treatments is preceded by the steps of:

obtaining a plurality of patterns for interior design surface treatments from a plurality of manufacturers of interior design surface treatments;

converting the plurality of patterns for interior design surface treatments from the plurality of manufacturers of interior design surface treatments into a standardized set of representations of the plurality of patterns for interior design surface treatments from the plurality of manufacturers of interior design surface treatments; and wherein the step of storing comprises storing the standardized set of representations of the plurality of patterns for interior design surface treatments from the plurality of manufacturers of interior design surface treatments.

129. A method according to claim 3 wherein the step of storing a set of patterns for interior design surface treatments, each pattern including a plurality of pattern attributes, is preceded by the steps of:

obtaining a plurality of patterns for interior design surface treatments from a plurality of manufacturers of interior design surface treatments, each pattern including a plurality of pattern attributes;

converting the plurality of patterns and the plurality of pattern attributes for interior design surface treatments from the plurality of manufacturers of interior design surface treatments into a standardized set of representations of the plurality of patterns and the plurality of attributes for interior design surface treatments from the plurality of manufacturers of interior design surface treatments; and wherein the step of storing comprises storing the standardized set of representations of the plurality of patterns and the plurality of attributes for interior design surface treatments from the plurality of manufacturers of interior design surface treatments.

130. A method according to claim 128 wherein the step of converting the plurality of patterns for interior design surface treatments from the plurality of manufacturers of interior design surface treatments into a standardized set of representations of the plurality of patterns for interior design surface treatments from the plurality of manufacturers of interior design surface treatments comprises the steps of:

scaling the plurality of patterns to a common scale;

capturing images of the plurality of patterns under common lighting; and color correcting the plurality of patterns.

131. A method according to claim 129 wherein the step of converting the plurality of patterns and the plurality of pattern attributes for interior design surface treatments from the plurality of manufacturers of interior design surface treatments into a standardized set of representations of the plurality of patterns and the plurality of attributes for interior design surface treatments from the plurality of manufacturers of interior design surface treatments comprises the steps of:

generating specifications for the plurality of patterns from a standard set of attributes and attribute values;

scaling the plurality of patterns to a common scale;

capturing images of the plurality of patterns under common lighting; and color correcting the plurality of patterns.

132. A method according to claim 1 further comprising the step of displaying a product specification that is associated with a selected pattern in the plurality of arrays of patterns that correspond to the user search criteria.

133. A method according to claim 9 further comprising the step of displaying a product specification that is associated with a selected pattern in the plurality of subarrays of patterns in the catalog.

134. A method according to claim 10 further comprising the step of displaying a product specification that is associated with a selected interior design surface treatment in the at least one pattern from at least two of the subarrays of patterns that are combined.

135. A method according to claim 10 further comprising the step of resizing at least one of the images of the patterns that is displayed on the at least one pattern from at least two of the subarrays of patterns that are combined, without resizing the pattern, in response to user input.

136. A method according to claim 10 further comprising the step of rotating at least one of the patterns on the at least one pattern from at least two of the subarrays of patterns that are combined in response to user input.

137. A method according to claim 10 further comprising the step of adding legends to the at least one pattern from at least two of the subarrays of patterns that are combined that identify selected attributes of the patterns on the at least one pattern from at least two of the subarrays of patterns that are combined.

138. A method according to claim 1 further comprising the step of importing images, graphics or text into the at least one pattern from at least two of the subarrays of patterns that are combined.

139. A method according to claim 1 further comprising exporting the at least one pattern from at least two of the subarrays of patterns that are combined.

140. A method according to claim 1 wherein the displaying step is preceded by:

accepting a user selection of a pattern; and searching the stored set of patterns to generate at least one of the plurality of arrays of patterns that are similar to the user selection of a pattern.

141. A method according to claim 4 wherein the at least one user selected attribute is a custom product attribute.

142. A method according to claim 4 wherein the at least one user selected attribute is a collection, correlate or related material attribute.

143. A method according to claim 1 wherein the step of displaying comprises displaying a plurality of patterns that correspond to user search criteria and that are not flagged as being discontinued.

144. A method according to claim 9 wherein the step of displaying the plurality of subarrays of patterns to create a catalog comprises the step of displaying the plurality of subarrays of patterns, including a flag of those patterns which are discontinued, to create the catalog.

145. A method according to claim 10 wherein the step of displaying the at least one pattern from at least two of the subarrays of patterns that are combined comprises the steps of displaying the at least one pattern from at least two of the subarrays of patterns that are combined, including a flag of those interior design surface treatments that are discontinued.

146. A method according to claim 1 further comprising identifying a service provider for at least one of the interior design treatments in the at least one pattern from at least two of the subarrays of patterns that are combined in response to a user query.

147. A method according to claim 1 further comprising identifying a manufacturer's representative for at least one of the interior design treatments in the at least one pattern from at least two of the subarrays of patterns that are combined in response to a user query.

148. A method according to claim 4 wherein the at least one user-selected attribute is an availability attribute.

149. A method according to claim 18 further comprising the steps of:

storing data related to the plurality of arrays of patterns that correspond to user search criteria and/or data related to the at least one pattern from at least two of the arrays of patterns that are combined in a database; and mining the database to extract information related to projects of a user and/or products of a manufacturer of the interior design surface treatments.

150. A method according to claim 149 wherein the mining step comprises mining the database to extract information related to search criteria of a user, patterns that are frequently selected by a user, combinations of interior design surface treatments that are used by a user, samples of interior design surface treatments that have been ordered by a user or quantities of interior design surface treatments that have been ordered by a user.

151. A method according to claim 149 wherein the mining step comprises mining the database to extract information related to past projects of a user, work in progress projects of a user or future projects of a user.

152. A method according to claim 149 wherein the mining step comprises mining the database to extract information related to products, product categories and/or attributes of a manufacturer of the interior design surface treatments that are selected in response to user search criteria or that are included in the at least one pattern from at least two of the arrays of patterns that are combined.

153. A method according to claim 152 further comprising the step of using the information related to products and product categories of a manufacturer of the interior design surface treatments that are selected in response to user search criteria or that are included in the at least one pattern from at least two of the arrays of patterns that are combined to generate sales leads, to design new patterns, to direct marketing or to manufacture interior design surface treatments.

154. A method according to claim 19 wherein the step of storing a set of patterns for interior design surface treatments is preceded by the steps of:
  obtaining a plurality of patterns for interior design surface treatments from a plurality of manufacturers of interior design surface treatments;
  converting the plurality of patterns for interior design surface treatments from the plurality of manufacturers of interior design surface treatments into a standardized set of representations of the plurality of patterns for interior design surface treatments from the plurality of manufacturers of interior design surface treatments; and
  wherein the step of storing comprises storing the standardized set of representations of the plurality of patterns for interior design surface treatments from the plurality of manufacturers of interior design surface treatments.

155. A method according to claim 20 wherein the step of storing a set of patterns for interior design surface treatments, each pattern including a plurality of pattern attributes, is preceded by the steps of:
  obtaining a plurality of patterns for interior design surface treatments from a plurality of manufacturers of interior design surface treatments, each pattern including a plurality of pattern attributes;
  converting the plurality of patterns and the plurality of pattern attributes for interior design surface treatments from the plurality of manufacturers of interior design surface treatments into a standardized set of representations of the plurality of patterns and the plurality of attributes for interior design surface treatments from the plurality of manufacturers of interior design surface treatments; and
  wherein the step of storing comprises storing the standardized set of representations of the plurality of patterns and the plurality of attributes for interior design surface treatments from the plurality of manufacturers of interior design surface treatments.

156. A method according to claim 154 wherein the step of converting the plurality of patterns for interior design surface treatments from the plurality of manufacturers of interior design surface treatments into a standardized set of representations of the plurality of patterns for interior design surface treatments from the plurality of manufacturers of interior design surface treatments comprises the steps of:
  scaling the plurality of patterns to a common scale;
  capturing images of the plurality of patterns under common lighting; and
  color correcting the plurality of patterns.

157. A method according to claim 155 wherein the step of converting the plurality of patterns and the plurality of pattern attributes for interior design surface treatments from the plurality of manufacturers of interior design surface treatments into a standardized set of representations of the plurality of patterns and the plurality of attributes for interior design surface treatments from the plurality of manufacturers of interior design surface treatments comprises the steps of:
  generating specifications for the plurality of patterns from a standard set of attributes and attribute values;
  scaling the plurality of patterns to a common scale;
  capturing images of the plurality of patterns under common lighting; and
  color correcting the plurality of patterns.

158. A method according to claim 18 further comprising the step of displaying a product specification that is associated with a selected pattern in the plurality of arrays of patterns that correspond to the user search criteria.

159. A method according to claim 26 further comprising the step of displaying a product specification that is associated with a selected interior design surface treatment in the at least one pattern from at least two of the arrays of patterns that are combined.

160. A method according to claim 26 further comprising the step of resizing at least one of the images of the patterns that is displayed on the at least one pattern from at least two of the arrays of patterns that are combined, without resizing the pattern, in response to user input.

161. A method according to claim 26 further comprising the step of rotating at least one of the patterns on the at least one pattern from at least two of the arrays of patterns that are combined in response to user input.

162. A method according to claim 26 further comprising the step of adding legends to the at least one pattern from at least two of the arrays of patterns that are combined that identify selected attributes of the patterns on the at least one pattern from at least two of the arrays of patterns that are combined.

163. A method according to claim 18 further comprising the step of importing images, graphics or text into the at least one pattern from at least two of the arrays of patterns that are combined.

164. A method according to claim 18 further comprising exporting the at least one pattern from at least two of the arrays of patterns that are combined.

165. A method according to claim 18 wherein the displaying step is preceded by:
  accepting a user selection of a pattern; and
  searching the stored set of patterns to generate at least one of the plurality of arrays of patterns that are similar to the user selection of a pattern.

166. A method according to claim 21 wherein the at least one user selected attribute is a custom product attribute.

167. A method according to claim 21 wherein the at least one user selected attribute is a collection, correlate or related material attribute.

168. A method according to claim 18 wherein the step of displaying comprises displaying a plurality of patterns that correspond to user search criteria and that are not flagged as being discontinued.

169. A method according to claim 26 wherein the step of displaying the at least one pattern from at least two of the arrays of patterns that are combined comprises the steps of displaying the at least one pattern from at least two of the arrays of patterns that are combined, including a flag of those interior design surface treatments that are discontinued.

170. A method according to claim 18 further comprising identifying a service provider for at least one of the interior design treatments in the at least one pattern from at least two of the arrays of patterns that are combined in response to a user query.

171. A method according to claim 18 further comprising identifying a manufacturer's representative for at least one of the interior design treatments in the at least one pattern from at least two of the arrays of patterns that are combined in response to a user query.

172. A method according to claim 21 wherein the at least one user-selected attribute is an availability attribute.

\* \* \* \* \*